US012181826B2

(12) United States Patent
Tokiwa et al.

(10) Patent No.: US 12,181,826 B2
(45) Date of Patent: Dec. 31, 2024

(54) IMAGE FORMING APPARATUS

(71) Applicant: CANON KABUSHIKI KAISHA, Tokyo (JP)

(72) Inventors: Shuhei Tokiwa, Tokyo (JP); Takayoshi Kihara, Shizuoka (JP); Takayuki Kanazawa, Kanagawa (JP); Taichi Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/969,140

(22) Filed: Oct. 19, 2022

(65) Prior Publication Data

US 2023/0125722 A1 Apr. 27, 2023

(30) Foreign Application Priority Data

Oct. 21, 2021 (JP) ................................ 2021-172210
Oct. 21, 2021 (JP) ................................ 2021-172211

(51) Int. Cl.

*G03G 21/00* (2006.01)
*G03G 15/02* (2006.01)
*G03G 15/16* (2006.01)

(52) U.S. Cl.

CPC ..... *G03G 21/0064* (2013.01); *G03G 15/0216* (2013.01); *G03G 15/0266* (2013.01); *G03G 15/1675* (2013.01)

(58) Field of Classification Search

CPC . G03G 21/0064; G03G 15/0216–0233; G03G 15/0266; G03G 15/065
See application file for complete search history.

(56) References Cited

U.S. PATENT DOCUMENTS

2004/0086297 A1* 5/2004 Watanabe .......... G03G 21/0064 399/129
2020/0110348 A1 4/2020 Morioka
2023/0195007 A1* 6/2023 Hara .................. G03G 15/0815

FOREIGN PATENT DOCUMENTS

JP 59-133573 A 7/1984
JP 7-253693 A 10/1995
JP 11-52640 A 2/1999
JP 2001-188405 A 7/2001
JP 2004-012583 A 1/2004
JP 2005-345915 A 12/2005
JP 2017-049405 A 3/2017
JP 2020-060656 A 4/2020

* cited by examiner

*Primary Examiner* — Carla J Therrien
(74) *Attorney, Agent, or Firm* — Venable LLP

(57) ABSTRACT

An image forming apparatus includes a rotatable image bearing member, a charging member, a developing member, a transfer member, an exposure unit, and a controller. The controller executes a preparatory operation in which, before an image forming operation, rotation of the image bearing member is started and a charging voltage and a developing voltage are increased stepwisely. In the preparatory operation, the controller carries out control so as to start application of the charging voltage at a voltage value not less than a discharge start voltage of the charging member before a surface region of the image bearing member positioned in a developing portion at a time of a start of the rotation of the image bearing member reaches a charging portion in a state in which a surface of the image bearing member is exposed to light by the exposure unit.

12 Claims, 37 Drawing Sheets

EMB. 1 (t3)

COMP. EX. 1 (t3)

(a)

(b)

IMAGE FORMING APPARATUS

FIELD OF THE INVENTION AND RELATED ART

The present invention relates to an image forming apparatus for forming an image on a recording material.

In an image forming apparatus of an electrophotographic type, a surface of an image bearing member such as a photosensitive drum is electrically charged uniformly by a charging member, and is exposed to light by an exposure unit, so that an electrostatic latent image is formed (written) and then is developed into a toner image with use of toner (developer) by a developing member. Here, a phenomenon that the toner is thinly deposited on a region of the surface of the image bearing member where an image is not originally formed is called a fog. In order to suppress the fog, a potential difference (back contrast, fog-removing contrast) between the developing member and the image bearing member in a developing portion where the image bearing member and the developing member oppose each other is controlled to a proper range.

In Japanese Laid-Open Patent Application (JP-A) 2005-345915, suppression of an occurrence of the fog during actuation by applying a voltage of an opposite polarity to a normal charge polarity of the toner to the developing member simultaneously with actuation of a motor for driving the image bearing member is disclosed. In JP-A Hei 7-253693, it is disclosed that a potential difference between a developing sleeve and a photosensitive member in a developing portion is maintained within a predetermined range, in which deposition of the toner on the photosensitive member in a large amount can be suppressed, by stepwise increasing a voltage applied to a charging device and a voltage applied to the developing sleeve during a start of rotation of the photosensitive member.

On the other hand, in JP-A Sho59-133573, an image forming apparatus of a cleaner-less type in which transfer residual toner remaining on the image bearing member without being transferred after the toner image on the image bearing member is transferred onto the recording material is not collected by a cleaning member but is collected by the developing member and then is utilized again is disclosed.

However, even when the constitutions disclosed in JP-A 2005-345915 and JP-A Hei7-253693 are used, in the case where an image forming operation is executed after the image forming apparatus stands by for a long time (stand-by state), the fog occurred in some instances. That is, when electric charges of the toner carried on the developing member during a rest (stop) period over a long term are attenuated and thus an electric charge amount becomes very small, the toner is non-electrostatically deposited on the image bearing member almost without being influenced by the potential difference between the developing member and the image bearing member in the developing portion, so that the fog occurs. Similarly, even in the case where the image forming operation is executed after the image forming apparatus is left standing for a long time after a jam occurred, a state in which an electric charge amount of the toner (image) remaining on the image bearing member is attenuated is formed.

Here, in the image forming apparatus of the cleaner-less type, there was a possibility that the toner deposited on the image bearing member reaches the charging member without being removed by the cleaning member and is deposited on the charging member and thus uniform charging by the charging member is hindered and an image defect occurs. In the case where the image forming operation is executed after the image forming apparatus stands by for the long time, the fog occurred in some instances. That is, when the electric charges of the toner carried on the developing member during the rest period over the long term are attenuated and thus the electric charge amount becomes very small, the toner is non-electrostatically deposited on the image bearing member almost without being influenced by the potential difference between the developing member and the image bearing member in the developing portion, so that the fog occurs.

Further, in the image forming apparatus of the cleaner-less type, when the fog toner deposited on the image bearing member cannot be sufficiently collected before a start of the image forming operation, there was a possibility that an image defect (white background contamination) such that the toner image is deposited on a region of the recording material where the image is not originally formed occurred.

SUMMARY OF THE INVENTION

A principal object of the present invention is to provide an image forming apparatus capable of suppressing an occurrence of an image defect due to deposition of toner, attenuated in electric charge amount, on a charging member and to provide an image forming apparatus capable of suppressing an image defect due to improper collection of the toner.

According to an aspect of the present invention, there is provided an image forming apparatus for executing an image forming operation for forming an image on a recording material, the image forming apparatus comprising: a rotatable image bearing member; a charging member configured to electrically charge a surface of the image bearing member at a charging portion where the charging member is provided in contact with the image bearing member; a developing member configured to form a toner image on the image bearing member by supplying a developer to a developing portion where the developing member is provided in contact with the image bearing member; a transfer member configured to transfer the toner image from the image bearing member onto a transfer-receiving material in a transfer portion; an exposure unit configured to expose, to light, the surface of the image bearing member in a position downstream of the transfer portion and upstream of the charging portion with respect to a rotational direction of the image bearing member; and a controller configured to control a charging voltage applied to the charging member and a developing voltage applied to the developing member, wherein during execution of the image forming operation, toner remaining on the surface of the image bearing member without being transferred by the transfer portion is collected by the developing member, wherein the controller executes a preparatory operation in which before the image forming operation, rotation of the image bearing member is started and the charging voltage and the developing voltage are increased stepwise, and wherein in the preparatory operation, the controller carries out control so as to start application of the charging voltage at a voltage value not less than a discharge start voltage of the charging member before a surface region of the image bearing member positioned in the developing portion at a time of a start of the rotation of the image bearing member reaches the charging portion in a state in which the surface of the image bearing member is exposed to the light by the exposure unit.

Further features of the present invention will become apparent from the following description of exemplary embodiments with reference to the attached drawings.

Figure 26:
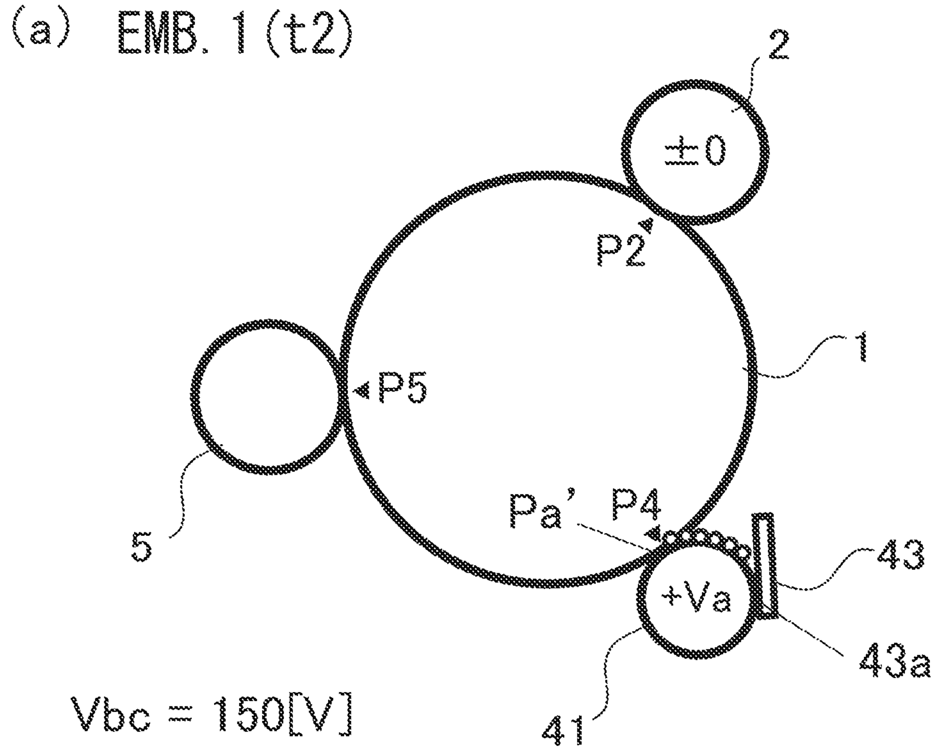
Figure 26:
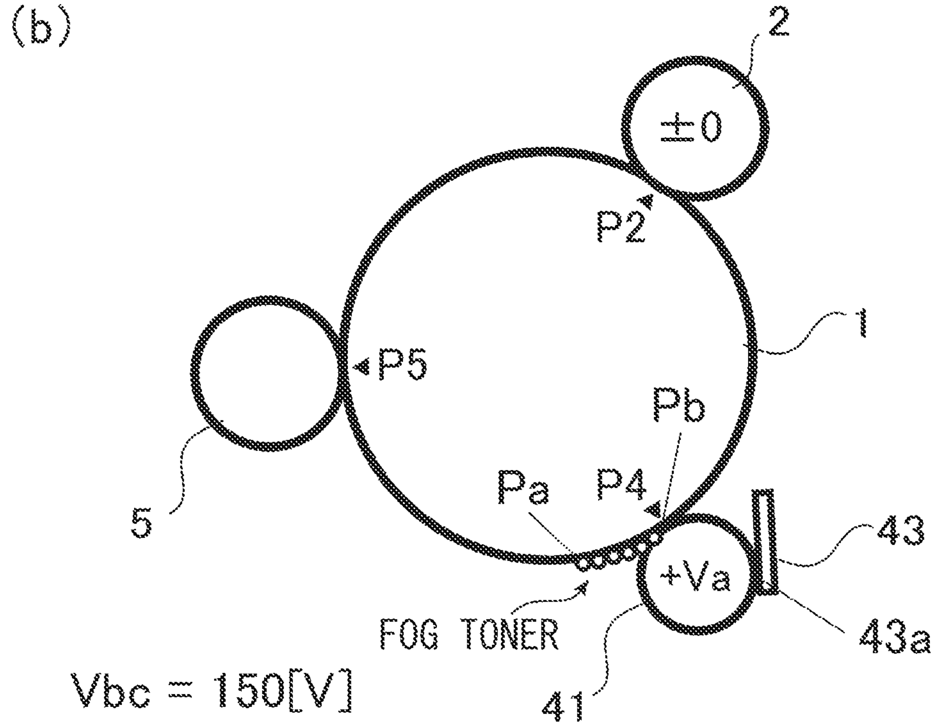

Parts (a) and (b) of FIG. 26 are schematic views each showing a state of the image forming apparatus during the pre-rotation operation in the embodiment 4.

Figure 27:
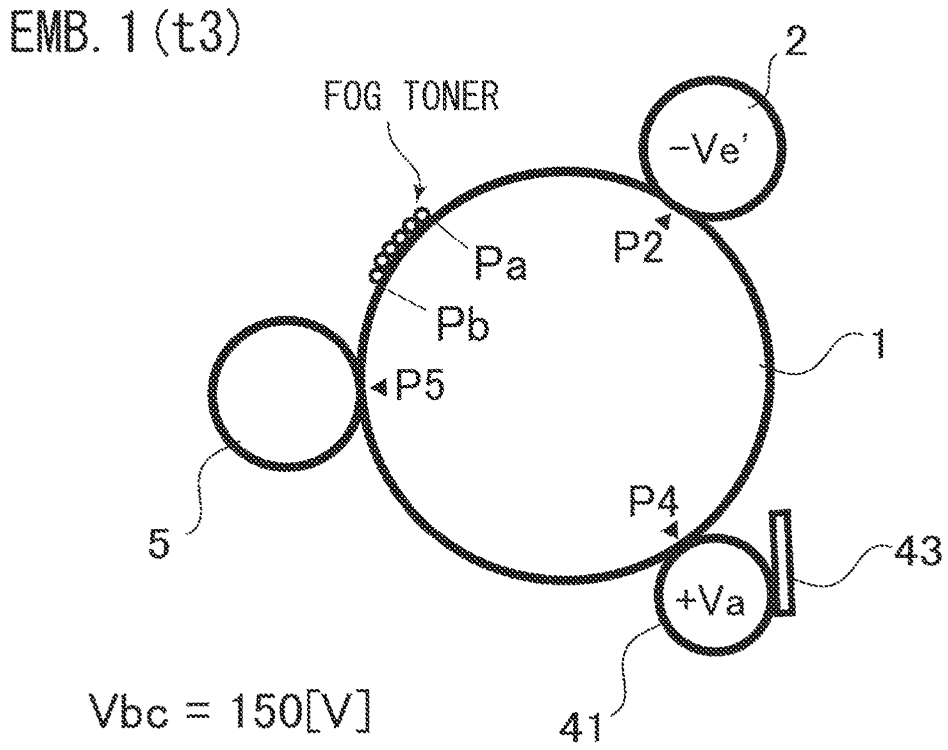

FIG. 27 is a schematic view showing a state of the image forming apparatus at a time t3 during the pre-rotation operation in the embodiment 4.

Figure 28:
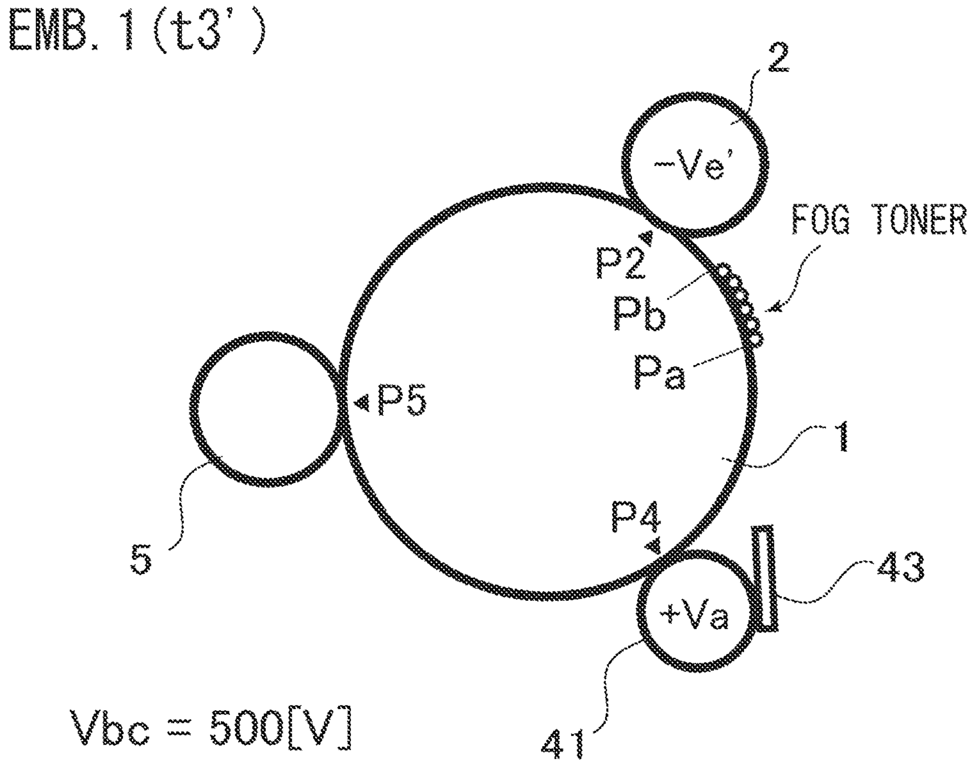

FIG. 28 is a schematic view showing a state of the image forming apparatus at a time t3' during the pre-rotation operation in the embodiment 4.

Figure 29:
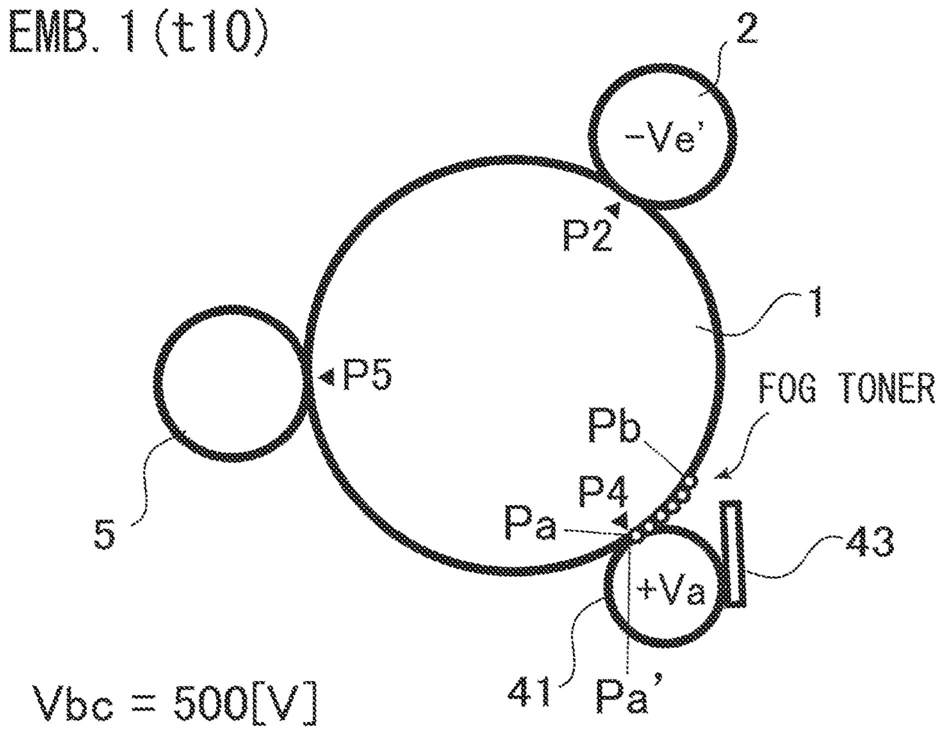

FIG. 29 is a schematic view showing a state of the image forming apparatus at a time t10 during the pre-rotation operation in the embodiment 4.

Figure 30:
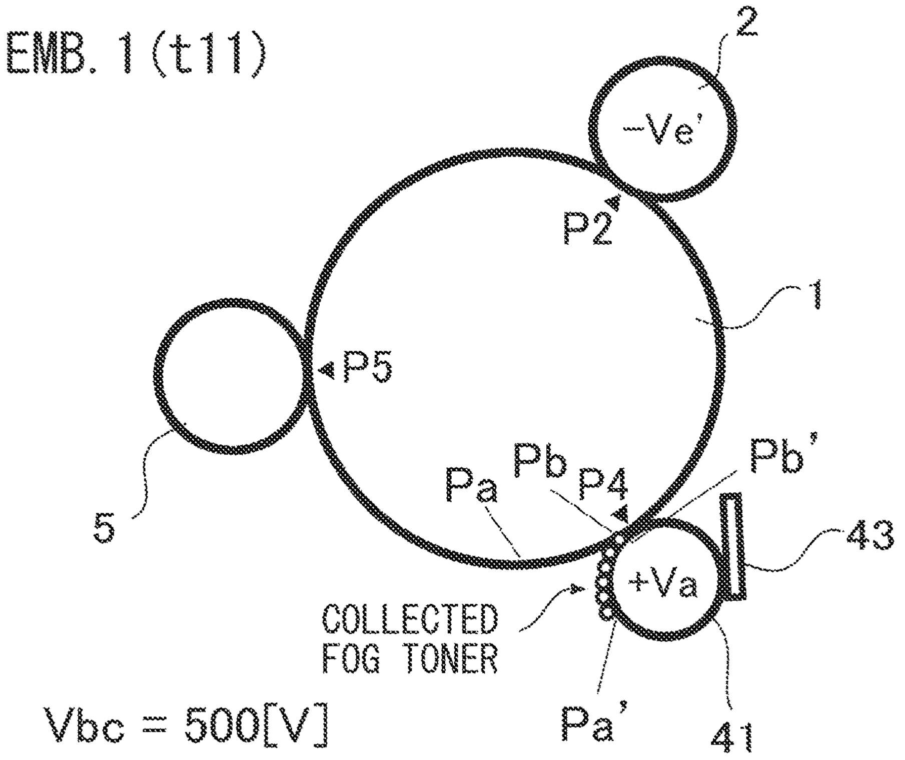

FIG. 30 is a schematic view showing a state of the image forming apparatus at a time t11 during the pre-rotation operation in the embodiment 4.

Figure 31:
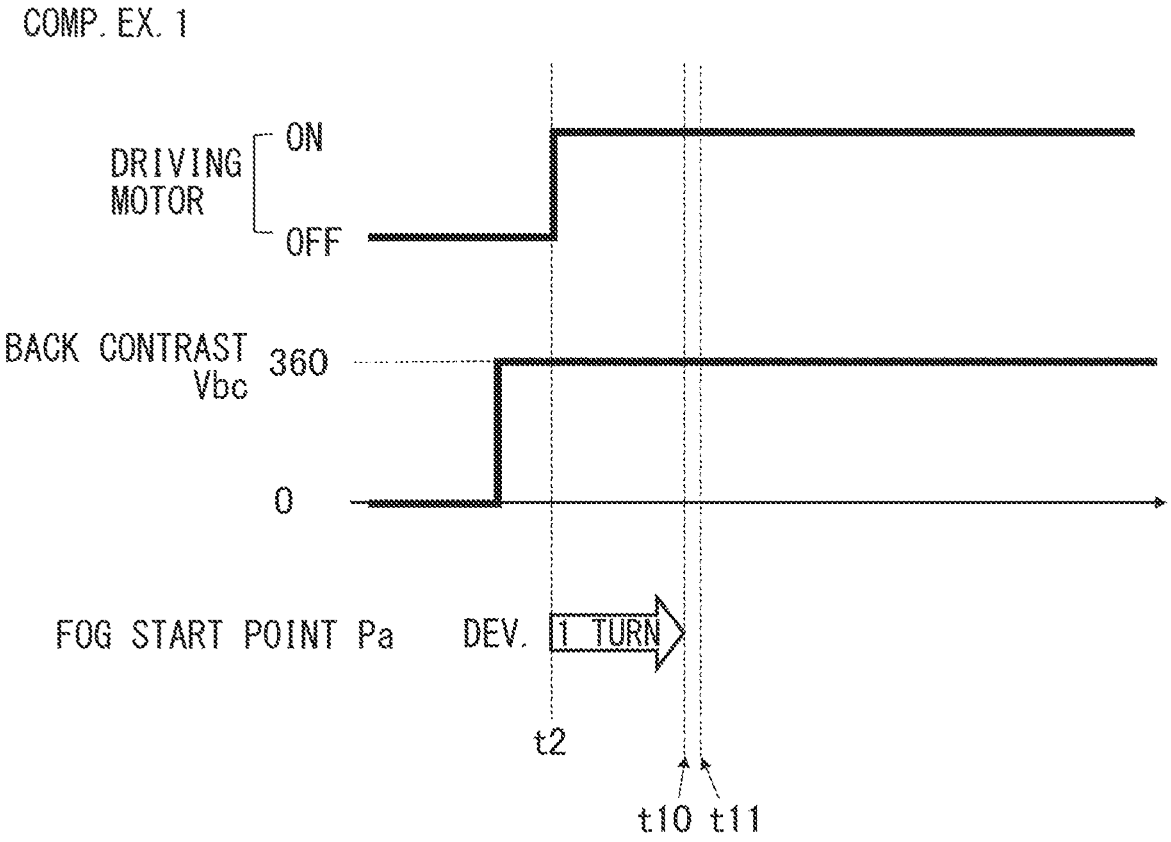

FIG. 31 is a timing chart of a driving motor and a back contrast in a pre-rotation operation of an image forming apparatus in a comparison example 4.

Figure 32:
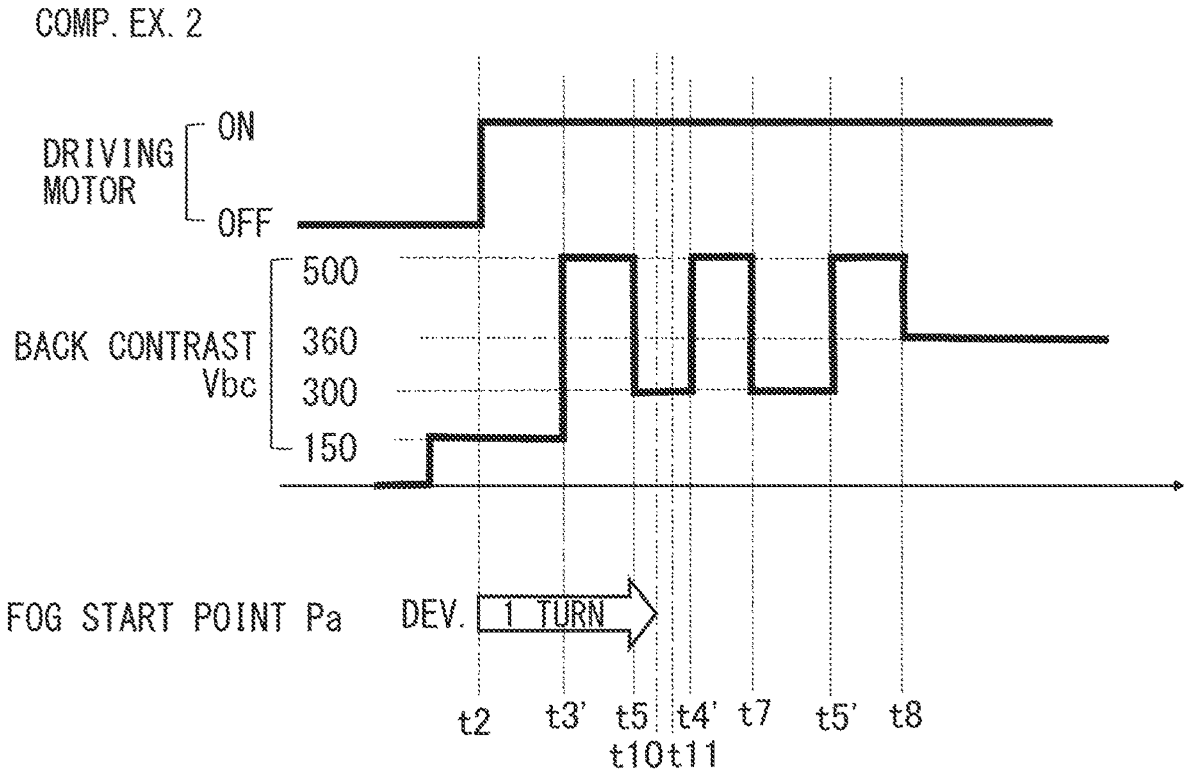

FIG. 32 is a timing chart of a driving motor and a back contrast in a pre-rotation operation of an image forming apparatus in a comparison example 5.

Figure 33:
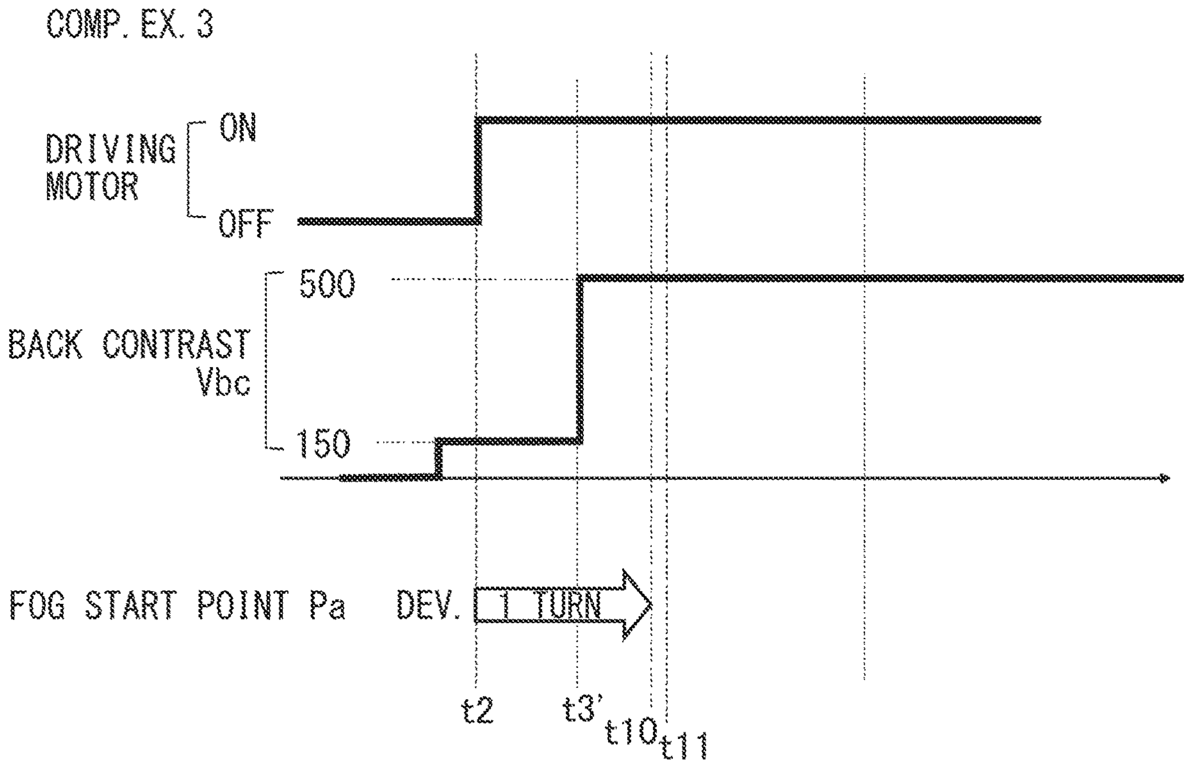

FIG. 33 is a timing chart of a driving motor and a back contrast in a pre-rotation operation of an image forming apparatus in a comparison example 6.

Figure 34:
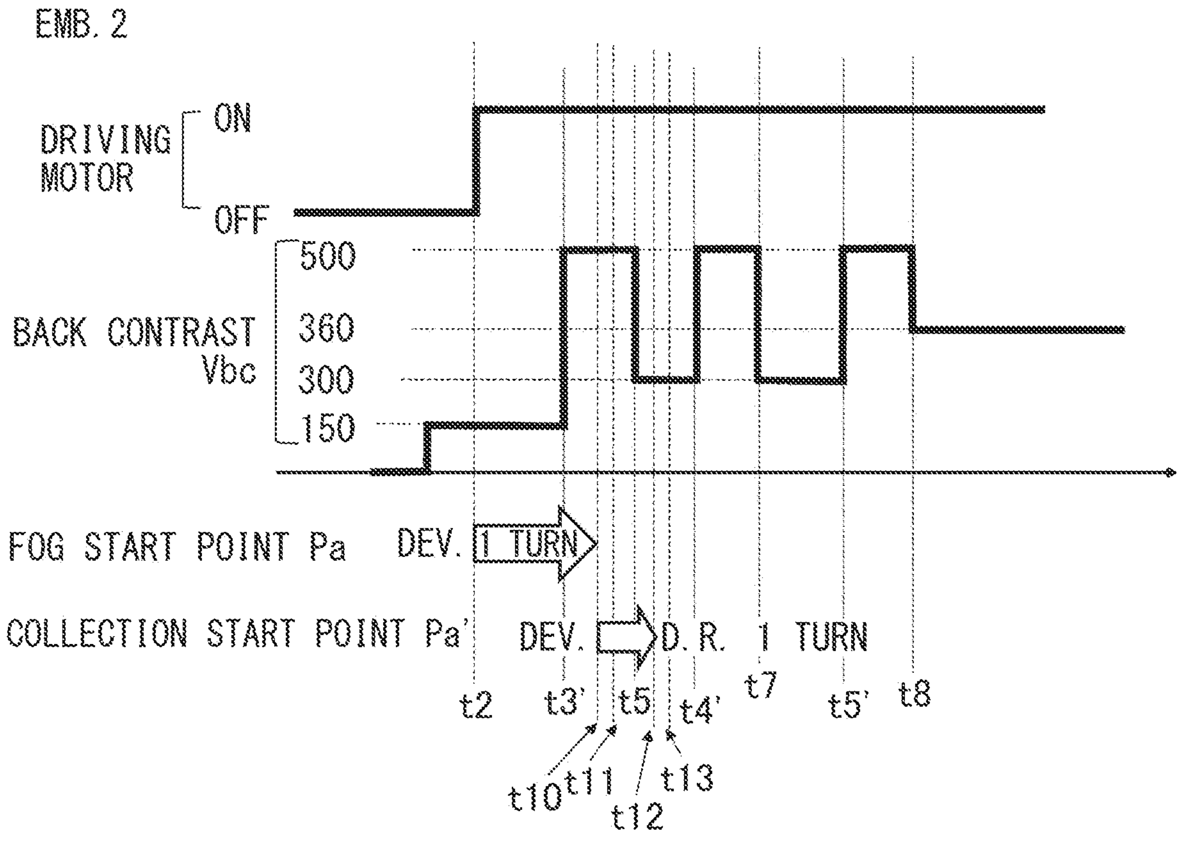

FIG. 34 is a timing chart of a driving motor and a back contrast in a pre-rotation operation of an image forming apparatus in an embodiment 5.

Figure 35:
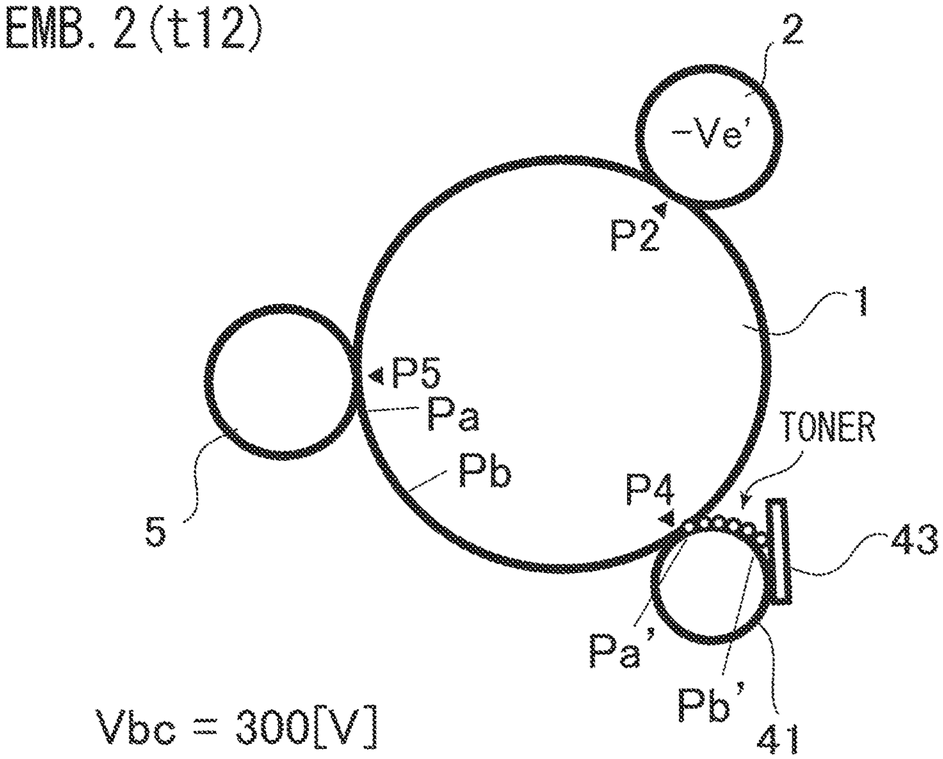

FIG. 35 is a schematic view showing a state of the image forming apparatus at a time t12 during the pre-rotation operation in the embodiment 5.

Figure 36:
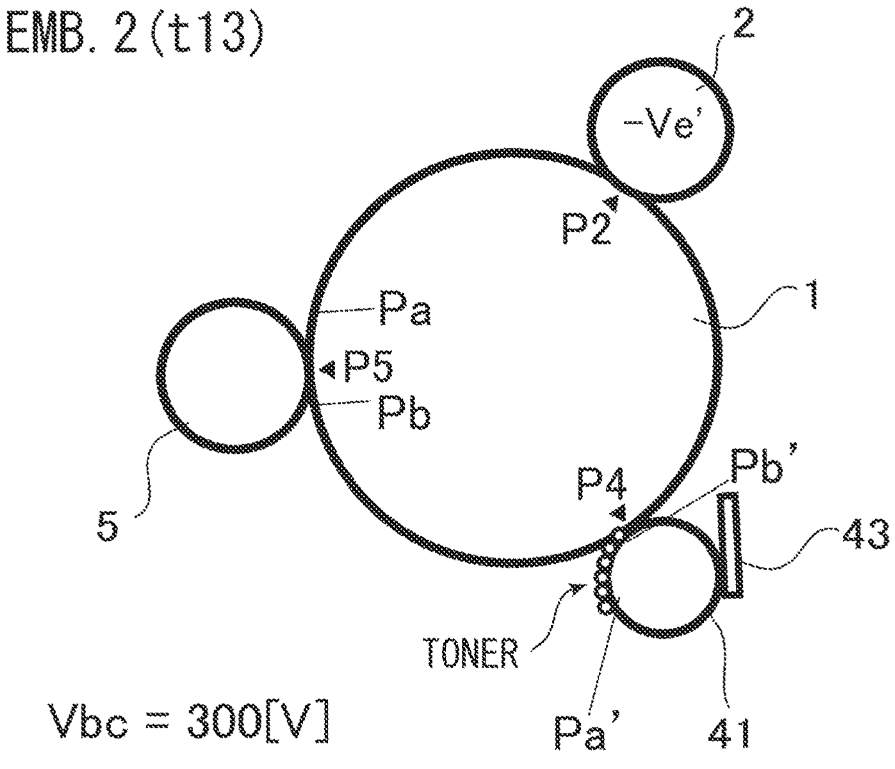

FIG. 36 is a schematic view showing a state of the image forming apparatus at a time t13 during the pre-rotation operation.

Figure 37:
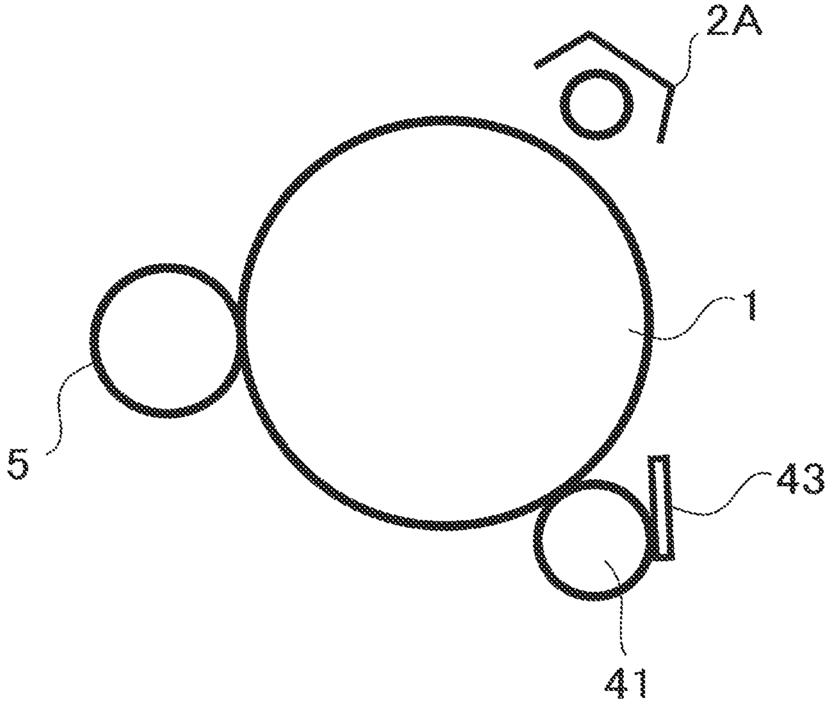
Figure 37:
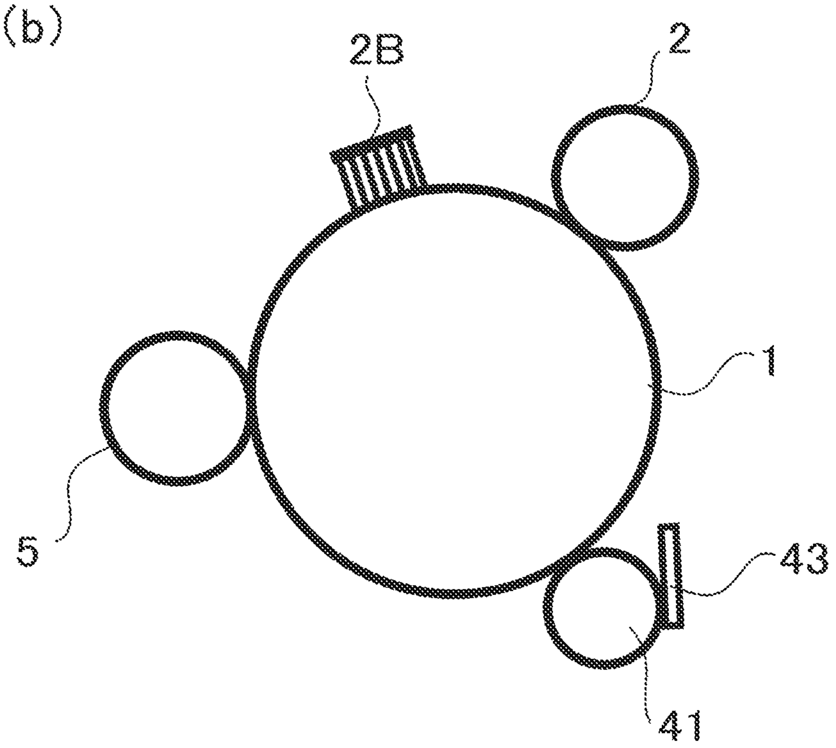

Parts (a) and (b) of FIG. 37 are schematic views each showing a modified embodiment of the image forming apparatus.

Figure 38:
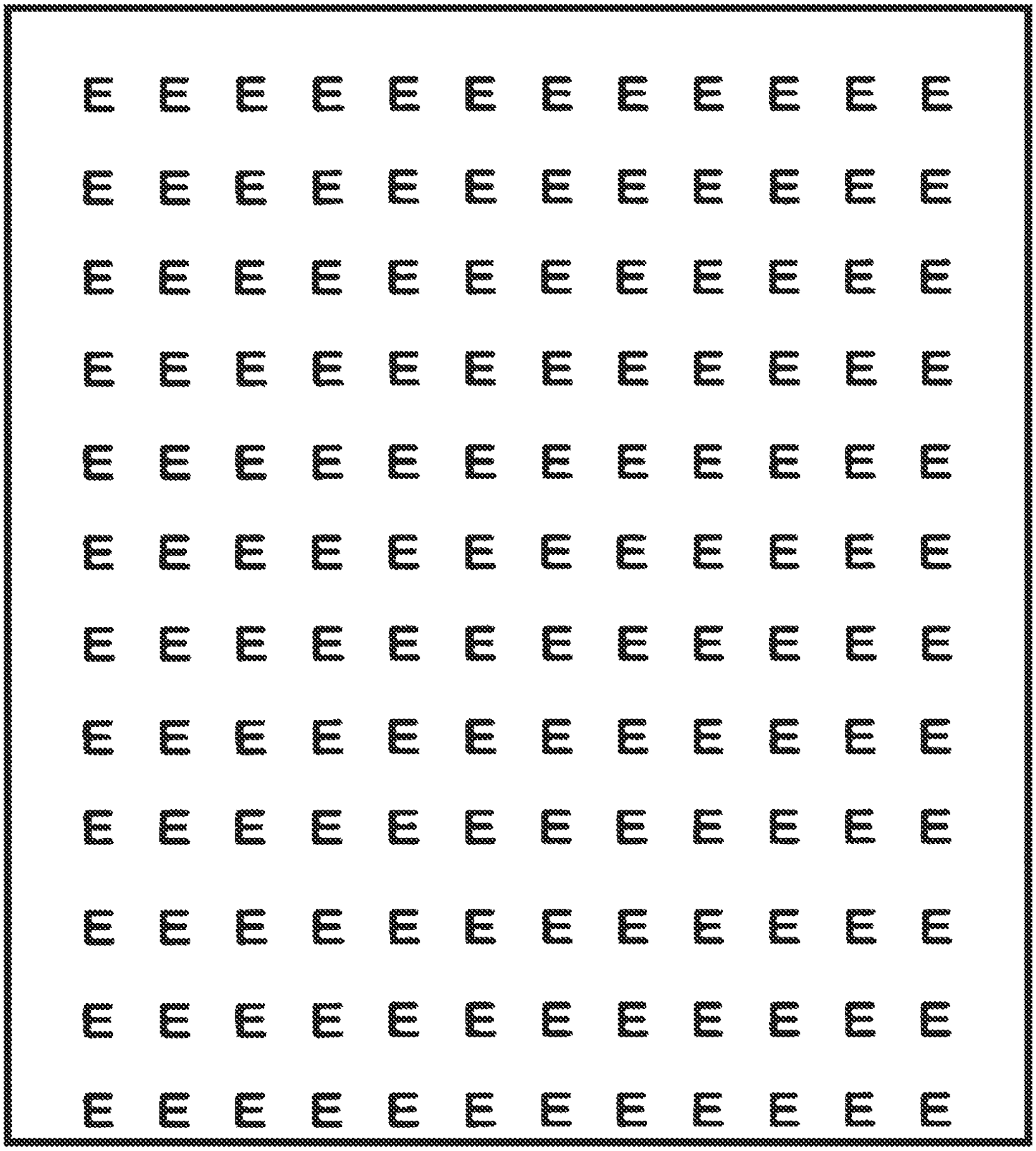

FIG. 38 is a schematic view showing an evaluation image for E-character evaluation.

Figure 39:
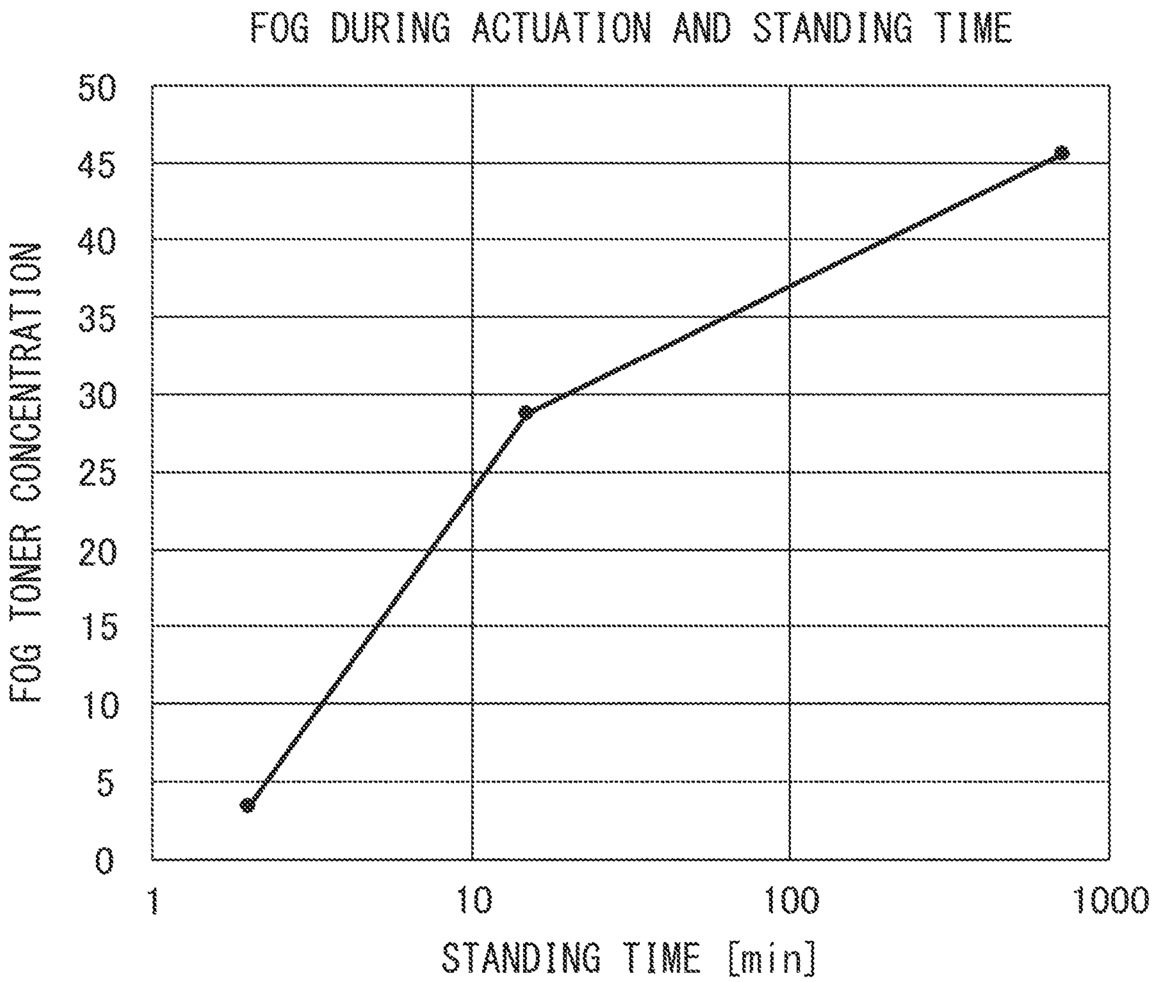

FIG. 39 is a graph showing a relationship between a standing time and a toner concentration of a fog during actuation.

Figure 40:
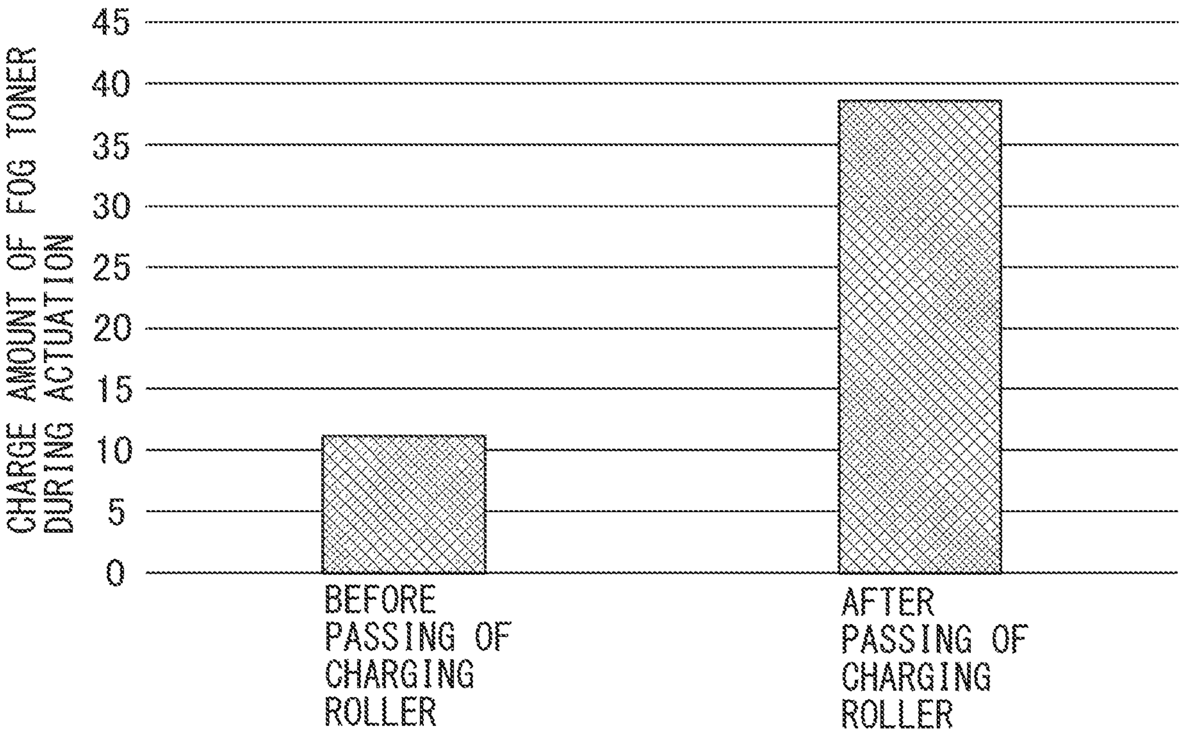

FIG. 40 is a graph showing a change in electric charge amount of fog toner before and after passing of a charging roller.

Figure 41:
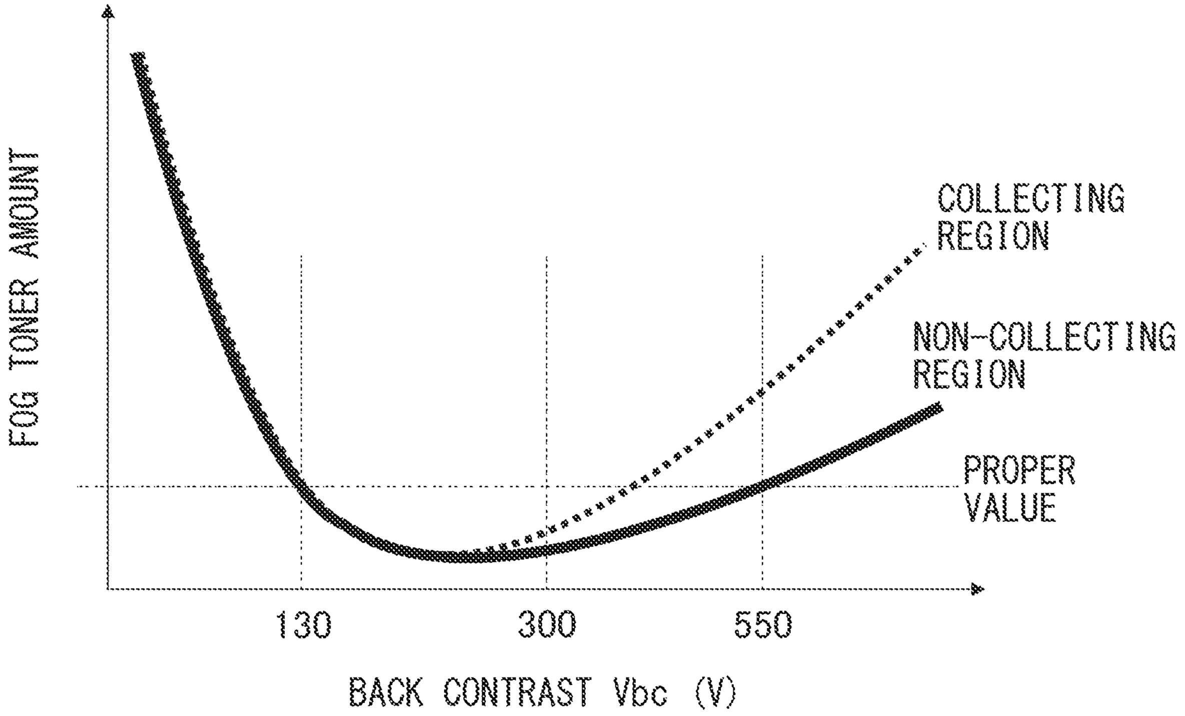

FIG. 41 is a graph showing a difference in characteristic of toner deposited on a developing roller between a collecting region and a non-collecting region.

DESCRIPTION OF THE EMBODIMENTS

In the following, embodiments according to the present invention will be described while making reference to the drawings.

Figure 1:
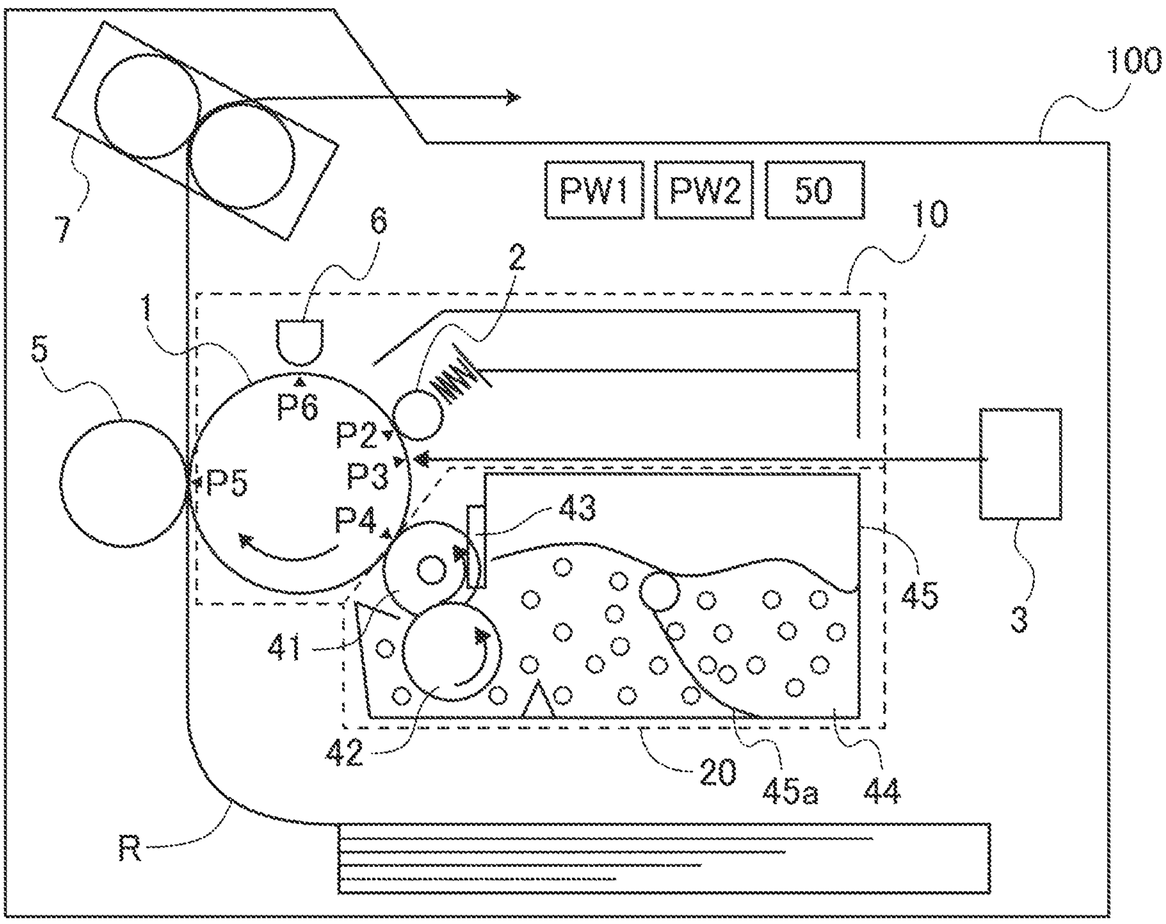
FIG. 1 is a schematic view of an image forming apparatus according to a first embodiment.

With reference to FIG. 1, a general structure of an image forming apparatus will be described. FIG. 1 is a schematic view showing a cross-sectional constitution of an image forming apparatus 100 according to an embodiment. The image forming apparatus 100 is a monochromatic laser (beam) printer for forming an image on a recording material (recording medium) R on the basis of image information received from an external computer. As the recording material R, it is possible to use paper such as plain paper, thick paper, and the like; a plastic film; a cloth; a surface-treated sheet material such as coated paper; special-shaped sheet materials such as an envelope and index paper; and various sheet materials different in size and material.

The image forming apparatus includes a process cartridge 10 as an image forming unit. The process cartridge 10 includes a photosensitive drum 1 as an image bearing member, a charging roller 2 as a charging member, a developing device 20, and a pre-exposure LED 6 as a pre-exposure device (discharging device). Further, the image forming apparatus 100 includes an exposure unit 3 as an exposure device, a transfer roller 5 as a transfer means, the pre-exposure LED 6 as the pre-exposure device, a fixing device 7 as a fixing means, and a controller 50 as a control means for controlling the image forming apparatus 100.

In the following, in this embodiment, description will be made by using, as a developer, toner 44 of which normal charge polarity is a negative polarity and by employing a reverse development type, but a charge polarity of each of the members is changeable depending on the normal charge polarity of the toner and the development type.

The photosensitive drum 1 is an electrophotographic photosensitive member molded in a cylindrical shape. In a specific example of the photosensitive drum 1, the photosensitive drum 1 includes a drum-like base material molded with aluminum and a photosensitive layer formed on the base material by a negatively-chargeable organic photosensitive member. Further, the photosensitive drum 1 is driven by a driving motor as a driving source mounted in the image forming apparatus 100, so that the photosensitive drum 1 is rotatable in arrow direction (clockwise direction) in FIG. 1.

In this embodiment, the photosensitive drum 1 is 24 mm in diameter and is rotational driven at a peripheral speed of 139 mm/sec. Further, a distance from a developing portion P4 to a charging portion P2 with respect to a circumferential direction of the photosensitive drum 1 is 54 mm.

The charging roller 2 is a contact charging-type charging member disposed in contact with the photosensitive drum 1 and for forming the charging portion P2 (contact portion between the charging roller 2 and the photosensitive drum 1) between itself and the photosensitive drum 1. The charging roller 2 in this embodiment is urged by an urging means such as a spring member and thus is press-contacted to the photosensitive drum 1 at a predetermined pressing force. The charging roller 2 generates proximity electric discharge in the charging portion P2 under application of a predetermined charging voltage (charging bias) from a charging power source PW1 which is a voltage generating circuit mounted in the image forming apparatus 100. Incidentally, the "charging roller 2 disposed in contact with the photosensitive drum 1" is not limited to the case where surfaces of the photosensitive drum 1 and the charging roller 2 are in direct contact with each other, but includes the case where these surfaces have a small gap therebetween in which these surfaces are capable of contacting each other through toner 44 carried on one of the photosensitive drum 1 and the charging roller 2.

The exposure unit 3 irradiates the surface of the photosensitive drum 1 with laser light in an exposure portion P3 positioned downstream of the charging portion P2 and upstream of a developing portion P4 (described later) with respect to a rotational direction of the photosensitive drum 1. The exposure unit 3 irradiates the photosensitive drum 1 with the laser light via a polygonal mirror or the like on the basis of an image signal (video signal) transmitted from the controller 50 of the image forming apparatus 100, so that the surface of the photosensitive drum 1 is subjected to scanning exposure. Incidentally, the exposure unit 3 is not limited to a laser scanner device, but may employ, for example, an LED exposure device including an LED array in which a plurality of LEDs are arranged along a longitudinal direction (rotational axis direction, main scan direction).

The developing device 20 includes a developing roller 41 as a developing member or a developer carrying member, a supplying roller 42 as a developer supplying member, a regulating blade 43 as a regulating member, and a developer container 45 as an accommodating portion for accommodating the developer. The developing roller 41 and the supplying roller 42 are rotatably supported by the developing container 45 constituting a frame of the developing device 20. Further, the developing roller 41 is disposed at an opening of the developing container 45 so as to oppose the photosensitive drum 1.

The developing roller 41 is disposed in contact with the photosensitive drum 1 and forms the developing portion P4 (contact portion between the developing roller 41 and the photosensitive drum 1, developing region) between itself and the photosensitive drum 1. Incidentally, the "developing roller 41 disposed in contact with the photosensitive drum 1" is not limited to the case where surfaces of the photosensitive drum 1 and the developing roller 41 are in direct contact with each other, but may include the case where these surfaces have a small gap therebetween in which these surfaces are capable of contacting each other through the toner 44 carried on one of the photosensitive drum 1 and the developing roller 41. The developing roller 41 rotates while carrying the toner 44, and supplies the toner 44 to the developing portion P4. In this embodiment, the developing roller 41 rotates at a rotational speed (peripheral speed) which is 1.4 times the rotational speed (peripheral speed) of the photosensitive drum 1.

The developing device 20 uses the contact development type as a development type. That is, a layer of the toner 44 carried on the developing roller 41 contacts the photosensitive drum 1 in the developing portion P4. To the developing roller 41, a predetermined developing voltage (developing bias) is applied from a developing power source PW2 which is a voltage generating circuit mounted in the image forming apparatus 100. In this embodiment, a DC developing voltage is used.

The developing roller 41 always contacts the photosensitive drum 1 at least during a period of an image forming operation, and a pre-rotation operation and a post-rotation operation which are prior to and subsequent to the image forming operation, respectively, in a state in which the process cartridge 10 is mounted in the image forming apparatus 100. A constitution in which the image forming apparatus 100 is not provided with a contact and separation mechanism for moving the developing roller 41 toward and away from the photosensitive drum 1 may be employed.

The supplying roller 42 is disposed in contact with the developing roller 41 and is rotated in a direction (direction in which peripheral surface movement directions of these rollers are opposite to each other in an opposing portion therebetween) against rotation of the developing roller 41.

Incidentally, when a constitution in which the toner can be sufficiently supplied to the developing roller 41 is employed, the supplying roller 42 is not necessarily needed.

Further, in this embodiment, the toner 44 is 6 μm in average particle size and has a negative polarity as a normal charge polarity. As the toner 44, for example, a polymerization toner formed by a polymerization method is used. The toner 44 is a so-called non-magnetic one-component developer which does not contain a magnetic component and which is carried on the developing roller 41 principally by an intermolecular force or an electrostatic force (mirror (image) force). However, instead of the toner 44, a one-component developer containing the magnetic component may be used. Further, the one-component developer contains, in addition to toner particles, an additive (for example, a wax or silica fine particles) for adjusting flowability or chargeability of the toner in some cases. Further, as the developer, a two-component developer constituted by non-magnetic toner and a magnetic carrier may be used. In the case where the magnetic developer is used, as the developing member (developer carrying member), for example, a cylindrical developing sleeve in which a magnet is provided is used.

The regulating blade 43 is an elastic member and is disposed in contact with the developing roller 41 in a state in which the regulating blade 43 is flexed against a reaction force received from the developing roller 41. The regulating blade 43 not only regulates a layer thickness of the toner 44 carried on the developing roller 41 but also triboelectrically charges the toner 44 by friction with the toner 44 passing through a space between the regulating blade 43 and the developing roller 41.

Inside the developing container 45, a stirring member **45*a* as a stirring means is provided. The stirring member 45*a* is driven by a driving motor and is rotated in interrelation with rotation of the developing roller 41, so that the stirring member 45*a* not only stirs the toner 44 in the developing container 45 but also sends the toner 44 toward the developing roller 41 and the supplying roller 42. Incidentally, the stirring member 45*a*** is not limited to a rotating form. For example, a stirring member in a swingable form may be employed.

The transfer roller 5 is disposed opposed to the photosensitive drum 1 in a transfer portion P5 (transfer position) positioned downstream of the developing portion P4 and upstream of a pre-exposure portion P6 (described later) with respect to the rotational direction of the photosensitive drum 1. As a nip between the transfer roller 5 and the photosensitive drum 1, a transfer nip where the toner image is transferred from the image bearing member onto the recording material R (hereinafter, this transfer nip is also referred to as the transfer portion P5) is formed. To the transfer roller 5, a predetermined transfer voltage (transfer bias) is applied from a transfer power source, which is a voltage generating circuit mounted in the image forming apparatus 100.

Incidentally, instead of the constitution in which the transfer voltage is applied to the transfer roller 5 (transfer member), an electric field for transferring the toner image in the transfer portion may be formed by another voltage applying means. For example, the transfer roller 5 is connected to a ground potential, and by the voltage applied to the photosensitive drum 1 by the charging roller 2, to which the voltage of the same polarity as the normal charge polarity of the toner 44 is applied, such an electric field is formed in the transfer portion.

The pre-exposure LED 6 is disposed opposed to the photosensitive drum 1 in the pre-exposure portion P6 positioned downstream of the transfer portion P5 and upstream of the charging portion P2 with respect to the rotational direction of the photosensitive drum 1. The pre-exposure LED 6 irradiates, with light, a region of the surface of the photosensitive drum 1 that has passed through the transfer portion P5.

The fixing device 7 has a constitution of a heat fixing type in which image fixing is performed by heating and melting the toner on the recording material R. The fixing device 7 includes, for example, a cylindrical fixing film having flexibility, a heater such as a ceramic heater for heating the fixing film, a thermistor for measuring a temperature of the heater, and a pressing roller press-contacted to the heater via the fixing film. The controller 50 of the image forming apparatus 100 controls energization to the heater on the basis of a detecting signal of the thermistor. The fixing device 7 is not limited thereto, but for example, a roller pair may be used as a rotatable member pair rotating while nipping the recording material, and a halogen lamp or an induction heating mechanism may be used instead of the ceramic heater as a heating means.

The controller 50 includes at least one processor and a non-transient storing medium readable by a computer in which a program for controlling an operation of the image forming apparatus 100 is stored. The controller 50 includes, for example, a non-volatile memory in which the program is stored, a CPU for executing the program by reading the program from the memory, and a volatile memory which is a working place during execution of the program. Further, the controller 50 includes a driving circuit for driving an actuator (driving motor or the like) for the image forming apparatus 100, and a network interface or the like for connecting the controller 50 to the external computer. The CPU is connected to another element of the controller 50 via a bus, and realizes an operation such as an image forming operation by the image forming apparatus 100 by providing an instruction to the driving circuit or the like in accordance with the program.

(Image Forming Operation)

Next, the image forming operation of the image forming apparatus 100 will be described. When an instruction (print job) of image formation is inputted to the image forming apparatus 100, an image forming process is started in the process cartridge 1B on the basis of image information inputted from the external computer connected to the image forming apparatus 100 or from a reading device.

First, the charging roller 2 uniformly charges the surface of the rotating photosensitive drum 1 to the same polarity (negative polarity in this embodiment) as the normal charge polarity in the charging portion P2. The exposure unit 3 irradiates the exposing portion P3 of the photosensitive drum 1 with the laser light modulated depending on an image signal generated on the basis of the inputted image information. By this, the electrostatic latent image is formed on the photosensitive drum 1. When the electrostatic latent image reaches the developing portion P4, the toner 44 supplied from the developing roller 41 is deposited on the photosensitive drum 1 depending on a potential distribution on the photosensitive drum 1, so that the electrostatic latent image is developed (visualized) as the toner image.

In parallel to preparation of the toner image on the photosensitive drum 1, recording materials R are supplied one by one from a stacking portion of the recording materials R provided at a lower portion of the image forming apparatus 100. The recording material R is conveyed to the transfer portion P5 so that a timing when a leading end of the toner image is caused to reach the transfer portion P5 by an unshown registration roller pair and a timing when a leading end of the recording material R enters the transfer portion P5 become substantially the same. Then, in the transfer portion P5, by the transfer roller 5 to which the transfer voltage is applied, the toner image carried on the photosensitive drum 1 is transferred onto the recording material R.

The recording material R passed through the transfer portion P5 is conveyed to the fixing device 7. The fixing device 7 heats and presses the toner image on the recording material R by the fixing film heated by the heater while nipping and feeding the recording material R in the nip (fixing nip) between the fixing film and the pressing roller. By this, the toner particles are melted and then fixed, so that the toner image is fixed on the recording material R. The recording material R passed through the fixing device 7 is discharged to an outside of the image forming apparatus 100 by a discharging roller pair as a discharging means, so that the recording material R is stacked on a discharge tray as a stacking portion formed at an upper portion of a printer main assembly.

Incidentally, when a surface region of the photosensitive drum 1 passed through the transfer portion P5 reaches the pre-exposure portion P6, the electrostatic latent image on the photosensitive drum 1 is erased by light emitted from the pre-exposure device 6. By this, the surface region is in a state in which the surface region is usable again in the image forming process.

(Cleaner-Less Type)

Next, a cleaner-less type employed in this embodiment will be described. The cleaner-less type is a type such that the developer remaining on the image bearing member without being transferred from the image bearing member onto a transfer-receiving material (the recording material or the intermediary transfer member) in the transfer portion P5 is collected and re-utilized by the developing member without being collected by the cleaning device. In this embodiment, transfer residual toner deposited on the photosensitive drum 1 even passed through the transfer portion P5 is collected into the developing device 20 by the developing roller 41 when the transfer residual toner reaches the developing portion P4 via the pre-exposure portion P6, the charging portion P2, and the exposure portion P3.

During execution of the image forming operation, the transfer residual toner is removed in the following step in general. The transfer residual toner includes toner charged to a positive polarity opposite to the normal charge polarity of the toner and toner which is charged to a negative polarity but which does not have a sufficient electric charge in mixture. Therefore, the transfer residual toner is charged to the negative polarity again by removing the electric charges from the photosensitive drum 1 after the transfer by the pre-exposure device 6 and then by causing the uniform electric discharge by the charging roller 2. The transfer residual toner charged to the negative polarity again in the charging portion P2 reaches the developing portion P4 with rotation of the photosensitive drum 1. Then, the surface region passed through the charging portion P2 is exposed to light by the exposure unit 3 while the transfer residual toner is deposited on the surface of the photosensitive drum 1, so that the electrostatic latent image is formed (written) on the surface region of the photosensitive drum 1.

Here, behavior of the transfer residual toner that has reached the developing portion P4 will be described by dividing the surface region of the photosensitive drum 1 into an exposure region (light-portion region) and a non-exposure region (dark-portion region). The transfer residual toner deposited on the non-exposure region of the photosensitive drum 1 is transferred onto the developing roller 41 by a potential difference between a potential (dark-portion potential) of the non-exposure region of the photosensitive drum 1 and the developing voltage, and then is collected into the developing container 45.

This is because in the case where the normal charge polarity of the toner 44 is the negative polarity, the developing voltage applied to the developing roller 41 is set so as to have the positive polarity relative to the polarity of the potential of the non-exposure region. Incidentally, the toner collected in the developing container 45 is stirred with the toner in the developing container 45 by the stirring member **45*a* and is uniformized by the stirring member 45*a*, and then is carried on the developing roller 41**, so that the toner is used again in the developing step.

On the other hand, the transfer residual toner deposited on the exposure region of the photosensitive drum 1 remains on the drum surface without being transferred from the photosensitive drum 1 onto the developing roller 41. This is because in the case where the normal charge polarity of the toner 44 is the negative polarity, the developing voltage applied to the developing roller 41 becomes a potential higher in absolute value on the negative polarity side than the potential (light-portion potential) of the exposure region. That is, in the case where the surface region of the photosensitive drum 1 on which the transfer residual toner is deposited becomes the exposure region in the exposure portion P3, the transfer residual toner constitutes a new toner image in a cooperation with another toner transferred from the developing roller 41 onto the exposure region, and the toner image is transferred onto the recording material R in the transfer portion P5.

By employing such a cleaner-less type, an installation space for the cleaning member and the collecting container which are used for collecting the transfer residual toner or the like is not needed, so that the image forming apparatus 100 can be further downsized. Further, the transfer residual toner is utilized again for subsequent image formation and later image formation, so that it is also possible to realize reduction (suppression of toner consumption) in operational cost of the image forming apparatus 100.

(1. Voltage Setting During Image Formation)

Next, a potential difference between the photosensitive drum 1 and its peripheral member during execution of the image forming operation in an embodiment (embodiment 1) will be described.

During the image forming operation, the charging voltage of −1240 V is applied to the charging roller 2, so that the surface of the photosensitive drum 1 is charged to a uniform charge potential Vd (dark-portion potential: −680 V) by electric discharge in the charging portion P2. On the surface of the photosensitive drum 1 charged to the charging potential Vd, the exposure region exposed to light by the exposure unit 3 has a potential which changes to a post-exposure potential V1 (light-portion potential: −50 V). In this embodiment, an exposure amount E0 for forming V1 was 0.35 $\mu J/cm^2$. To the developing roller 41, a developing voltage Vdc (developing potential: −380 V) is applied. Incidentally, the exposure region (image forming region) and the non-exposure region (non-image forming region) are formed within an image formable region on the surface of the photosensitive drum 1. The image formable region is a region, with respect to a main scan direction, in which the toner 44 can be supplied from the developing roller 41 to the surface of the photosensitive drum 1. The image formable region can be said to be a region in which the toner 44 can be carried on the surface of the developing roller 41.

By the above-described constitution, a developing contrast Vcont which is a potential difference between the light-portion potential and the developing voltage Vdc on the photosensitive drum 1 is 330 V, and a back contrast Vbc which is a potential difference between the dark-portion potential and the developing voltage Vdc on the photosensitive drum 1 is 300 V. By such a potential setting, it becomes possible to appropriately output images such as a solid black image, a half-tone image, and a solid-white character (letter).

Here, the developing contrast Vcont and the back contrast Vbc are defined by the surface potential of the photosensitive drum 1 in the developing portion P4 and the developing voltage Vdc applied to the developing roller 41. If the image forming operation is performed without making a proper potential setting, an image defect occurs on the recording material R. Specifically, when the developing contrast Vcont is excessively small, the toner amount of the toner deposited on the exposure region (image forming region) of the photosensitive drum 1 becomes small, so that there is a possibility that an image defect (poor image density) such that an image density becomes thin (poor) occurs. Further, when the developing contrast Vcont is excessively large, the toner amount of the toner deposited on the exposure region (image forming region) of the photosensitive drum 1 becomes large, so that there is a possibility that improper transfer such that the toner is not sufficiently melted in the fixing step and thus fixing of the toner (image) on the recording material R becomes insufficient occurs. For that reason, there is a need that the developing contrast Vcont is appropriately adjusted in view of these phenomena.

Further, the voltages in this embodiment are expressed as a potential difference between an associated one of the voltages and a ground (earth) potential (0 V). Accordingly, the developing voltage Vdc=−380 V means that the potential difference between the developing voltage, applied to the core metal of the developing roller 41, and the ground potential is −380 V. This is true for the charging voltage and the like.

(2. Back Contrast and Fog)

Next, the reason why the back contrast Vbc is controlled will be described. By appropriately controlling the back contrast Vbc, it is possible to suppress excessive toner deposited on the non-image forming region (white background portion) which is the surface region of the photosensitive drum 1 where the image is not formed. This excessive toner is referred to as fog toner, and a phenomenon such that the fog toner occurs is referred to as fog.

When the fog occurs, the toner is deposited on the non-image forming region of the photosensitive drum 1 and is transferred onto the recording material R, so that a color tint is caused in a region (white background region) where the image is not originally formed on the recording material R, and therefore, there is a possibility that a quality of a resultant product desired by a user cannot be obtained. Further, in the case where the fog occurs at a time other than during image formation, in the cleaner-less constitution, the cleaning member does not exist in a section from the transfer portion P5 to the charging portion P2, and therefore, the fog toner reaches the charging portion P2 without being removed by the cleaning member. Then, a part of the fog toner that has reached the charging portion P2 is deposited on the charging roller 2, and the fog toner causes charging non-uniformity. The charging non-uniformity is a phenomenon that the surface potential of the photosensitive drum 1 after the charging by the charging roller 2 becomes non-uniform. In a state in which the charging non-uniformity occurs, there is a possibility that an image defect such that image density non-uniformity appears in the half-tone region or the like of the image occurs.

In the case where the back contrast Vbc is excessively small, an electric field for retaining, on the developing roller 41, the toner 44 charged to the negative polarity which is the normal charge polarity in this embodiment is weakened, so that such toner 44 is liable to be deposited as the fog toner on the photosensitive drum 1 in the non-image forming region. On the other hand, if the back contrast Vbc is excessively large, the fog such that the toner 44 on the developing between 41 charged to the positive polarity which is the opposite polarity to the normal charge polarity is deposited on the photosensitive drum 1 in the non-image forming region is liable to occur.

The fog such that the toner 44 charged to the normal charge polarity is deposited on the non-image forming region of the photosensitive drum 1 is referred to as normal fog. Further, the fog such that the toner 44 charged to the opposite polarity to the normal charge polarity is deposited on the non-image forming region of the photosensitive drum 1 is referred to as reverse fog. Accordingly, in order to suppress the normal fog and the reverse fog at the same time, the back contrast Vbc may only be required to be set at a proper range.

Further, in the cleaner-less constitution, in order to efficiently collect the fog toner and the transfer residual toner in the developing portion P4, it is required that a sufficient back contrast Vbc be set. This is because most of the fog toner and the transfer residual toner is charged to the normal charge polarity. When the fog toner and the transfer residual toner which are more charged to the negative polarity have reached the developing portion P4 in a state in which these toners were deposited in the non-image forming region (dark-portion potential), in order to transfer (clean) these toners from the photosensitive drum 1 onto the developing roller 41 by the electric field, it is required that the back contrast Vbc be at a certain level or more. In the case where the collection of the toner in the developing portion P4 is not sufficiently performed, there is a possibility that the fog toner passes through the developing portion P4 while being deposited on the photosensitive drum 1 and results in the image defect in the transfer portion P5 by being transferred onto the recording material R.

Further, it is known that a one-dot density and a line width change depending on settings of the back contrast Vbc and the developing contrast Vcont. Therefore, while setting the back contrast Vbc suitable for suppressing the fog, the developing contrast suitable for the one-dot density and the line width is set. In order to satisfy this condition, output voltages of the charging power source PW1 and the developing power source PW2 and exposure intensity of the exposure unit 3 are set.

Figure 2:
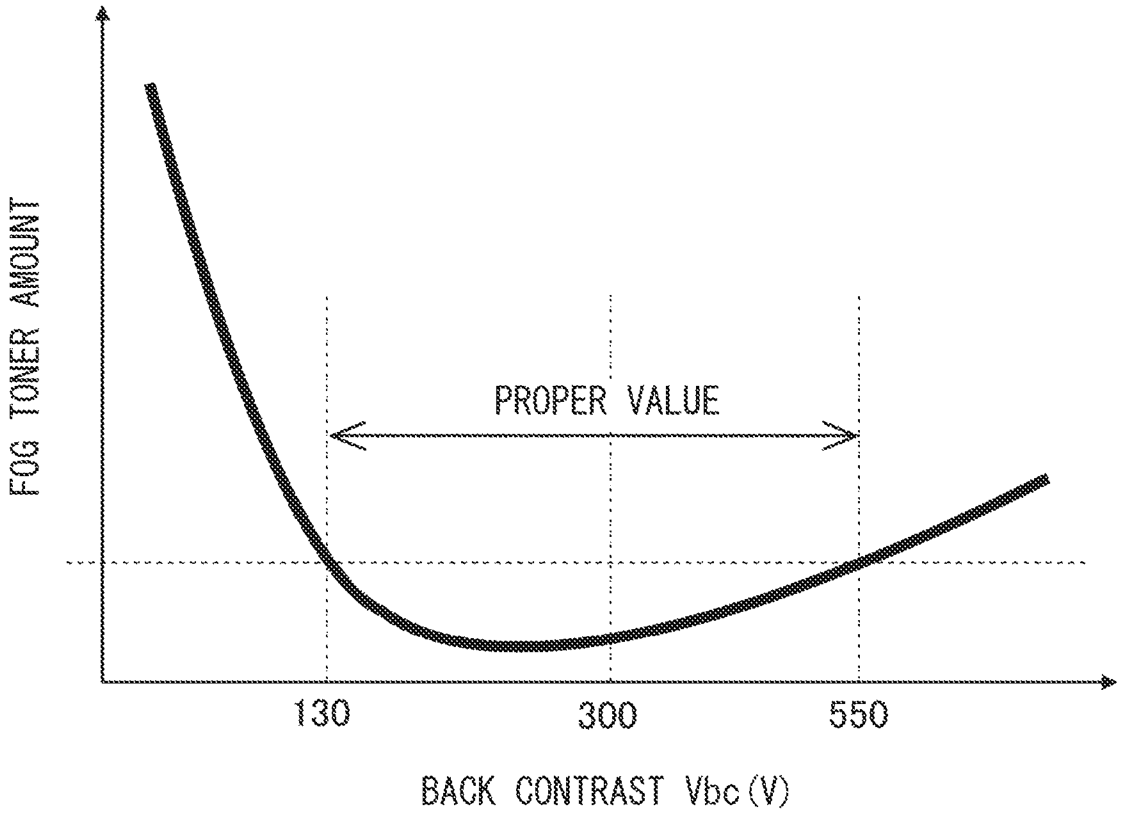
FIG. 2 is a schematic view showing a relationship between a back contrast and a fog toner amount in the embodiment 1.

In FIG. 2, a relationship between the back contrast Vbc and the fog toner amount is shown. In FIG. 2, the abscissa represents the back contrast Vbc, and the ordinate represents the fog toner amount. The fog toner amount was measured in a manner such that the toner on the photosensitive drum 1 was removed by Mylar tape and the Mylar tape was applied onto reference paper, and density thereof was measured using a reflection densitometer ("TC-6DS/A", manufactured by Tokyo Denshoku, Co., Ltd.). A calculating method of the fog toner amount is as follows. The image forming operation was performed using the image forming apparatus 100. The calculation was made from the toner amount of the toner deposited on the photosensitive drum 1 in the surface region passed through the developing portion P4 when the developing step was executed by changing the back contrast Vbc without using the recording material R.

The fog toner is not visually observed when the fog toner amount is not more than a certain value, and therefore, there is no problem in terms of an image quality. However, when the fog toner amount increases, the fog toner can be visually observed and results in the image defect. A range which is below a threshold which the fog toner can be visually recognized is a range of a proper value of the back contrast Vbc.

In this embodiment, employing the cleaner-less type, as described above, it is desired that suppression of the charging non-uniformity due to the deposition of the fog toner on the charging roller 2 and suppression of improper collection of the fog toner in the developing portion P4 are realized by controlling the back contrast Vbc so as to fall within the proper range.

In this embodiment, as shown in FIG. 2, when the back contrast Vbc is set at a range of 130 V or more and 550 V or less, the fog toner amount is in a state in which the fog toner cannot be visually recognized and toner consumption during non-image formation is suppressed, and therefore, such setting is preferable. However, the back contrast Vbc is represented as a positive (+) value when the potential difference results in the polarity of the potential on the photosensitive drum 1 side being the negative polarity. In this embodiment, the back contrast Vbc is set at 300 V, which is a value within the above-described range, whereby the fog during the image formation cannot be visually recognized and the toner consumption during the non-image formation is suppressed.

(3. Operation Steps of Image Forming Apparatus)

Figure 3:
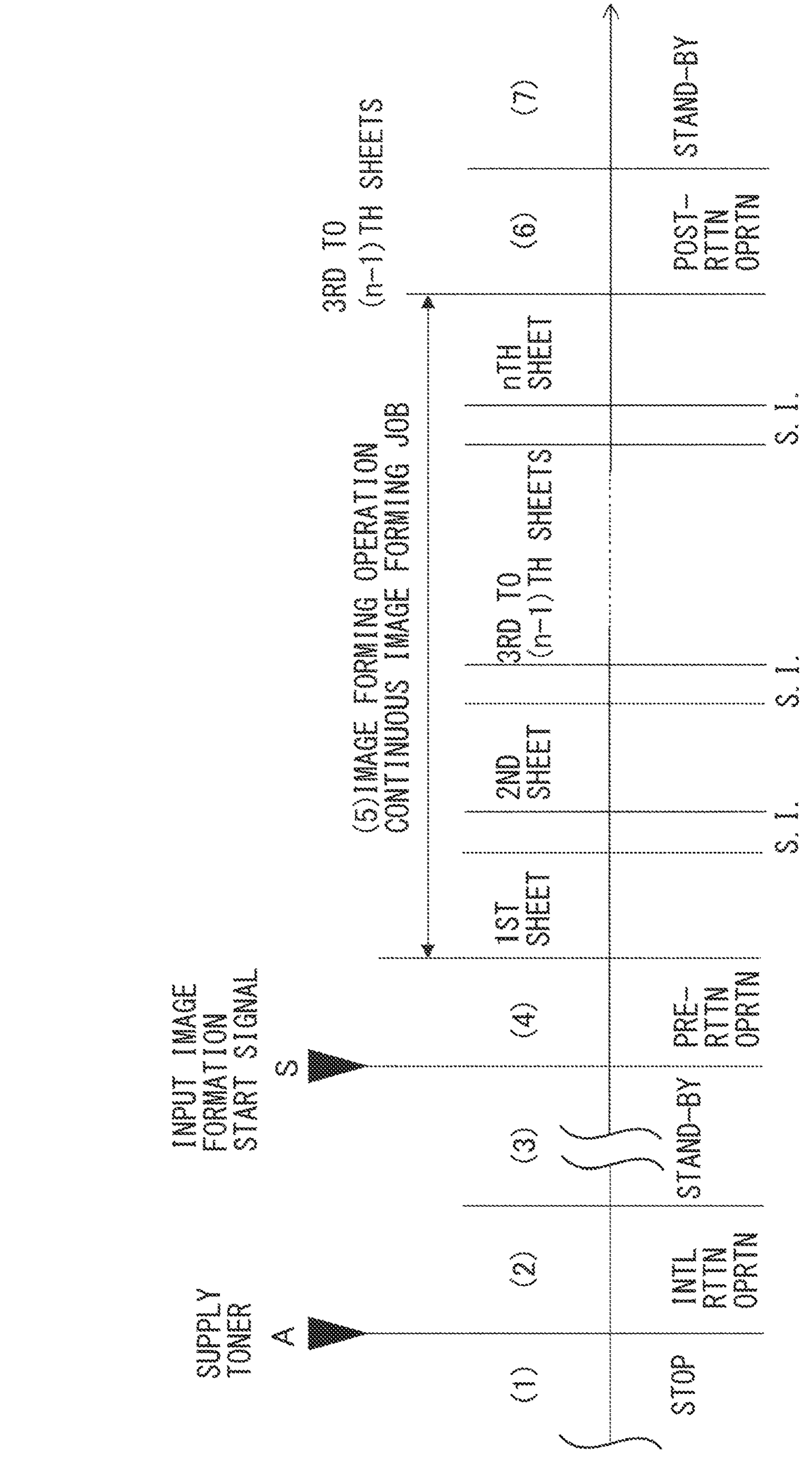
FIG. 3 is an operation step diagram of an image forming operation in the embodiment 1.
Figure 4:
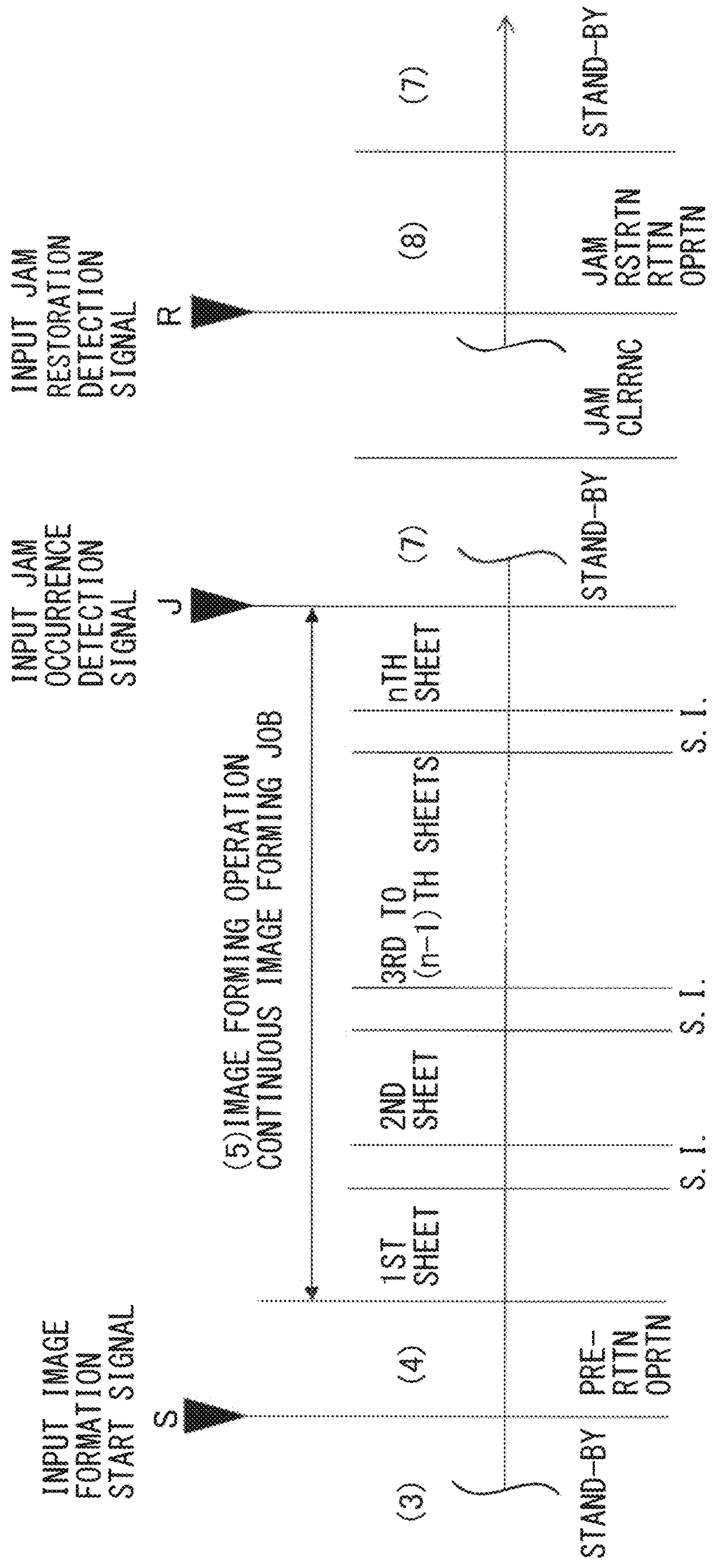
FIG. 4 is an operation step diagram of a jam restoration rotation operation in the embodiment 1.

Subsequently, an operation of the image forming apparatus 100 including steps before and after the image forming operation will be described. FIG. 3 is an operation step diagram of the image forming apparatus 100 from a power OFF state to an end of the image formation. FIG. 4 is an operation step diagram of the image forming apparatus 100 from a stand-by state before a start of the image forming operation to an end of jam restoration in the case where a jam occurs during execution of the image forming operation.

First, the operation steps from the power OFF state to the end of the image formation will be sequentially described with reference to FIG. 3.

(1) Stop (Rest) State

When the power source for the image forming apparatus 100 is turned off (a main power source switch is turned of) or when a door is opened and a door switch is turned off electric power supply to a main control circuit of the image forming apparatus 100 is cut off, so that the image forming apparatus 100 is held in a stop (rest) state in which the image forming apparatus 100 is incapable of executing the image forming operation.

(2) Initial Rotation Operation (Pre-Multi-Rotation Operation)

An initial rotation operation is an operation during actuation executed when the electric power is inputted to the image forming apparatus 100 (the power source is turned on) ("A" in FIG. 3). That is, the initial rotation operation is an operation such that a driving motor is actuated when the power source for the image forming apparatus 100 is turned on, and warming (warm-up) of a plurality of process devices with rotational drive of the photosensitive drum 1 is carried out.

The timing-on of the image forming apparatus 100 refers to that in a state in which a door switch is turned on (state in which the door is closed), the main power source switch is operated from OFF to ON or that in a state in which the main power source switch is turned on, the door switch is operated from OFF to ON. In either case, electric power supply to the main control circuit is started, and the image forming apparatus 100 is maintained in a state in which the image forming operation is capable of being executed. Incidentally, the door switch is a switch or a sensor for detecting open/close of the door openably provided on a front side of an apparatus main assembly of the image forming apparatus 100 for permitting access to an inside of the image forming apparatus 100.

The initial rotation operation is a preparatory operation for causing the image forming apparatus 100 to execute stable image formation. For example, a state of the process cartridge is detected, and depending on the state, the controller 50 carries out control for determining settings of proper values of the charging voltage, the developing voltage, and the transfer voltage. Or, process control such that in order to uniformize the surface potential of the photosensitive drum 1, a certain charging voltage is applied by the charging power source or the photosensitive drum 1 is irradiated with the laser light by the exposure unit 3.

(3) Stand-by (Waiting)

After the initial rotation operation is ended, the drive of the driving motor is stopped, and the image forming apparatus 100 is maintained in a stand-by state until an image formation start signal S is inputted.

(4) Pre-Rotation Operation

On the basis of the input of the image formation start signal S, the driving motor is driven again, and a predetermined pre-image forming operation with rotational drive of the photosensitive drum 1 is executed. Specifically, preparation for executing a subsequent "(5) Image forming operation" in a procedure of (a) the controller 50 receives the image formation start signal S. (b) the image is developed by a formatter, and (c) a pre-rotation operation is started.

The pre-rotation operation is a preparatory operation executed immediately before the image forming operation in the case where an image formation execution instruction (job) is inputted to the image forming apparatus 100. The pre-rotation operation includes rise control such that rotation of the image bearing member is started, and then, the charging voltage and the developing voltage are increased stepwise or continuously up to voltage values in the image forming operation. In the rise operation in this embodiment, in order to suppress the occurrence of the fog in the developing portion P4 during execution of the pre-rotation operation, control for increasing the charging voltage and the developing voltage stepwise or continuously is carried out. Details of the rise control will be described later.

Incidentally, the above-described step (b) is changed in development time depending on an image data amount and a processing speed of the formatter. In the case where the image formation start signal S is inputted during the above-described "(2) Initial rotation operation", after the initial rotation operation the "(4) Pre-rotation operation" is subsequently executed without entering the "(3) Stand-by".

(5) Image Forming Operation

When the pre-rotation operation is ended, subsequently, an image forming operation (mono-printing) for outputting an image on a single sheet or an image forming operation (continuous image forming job multi-printing) for continuously outputting images on a predetermined number of a plurality of sheets are performed, so that the single recording material R on which the image is formed or the plurality of recording materials R on which the images are formed are outputted. In FIG. 3, the image forming operation for continuously outputting the images on N sheets is represented. Further, a sheet interval ("S.I.") shown in FIG. 3 represents an interval from passing of a trailing end of a recording material R through the transfer portion P5 until a leading end of a subsequent recording material R reaches the transfer portion P5 in the continuous image forming job.

(6) Post-Rotation Operation

In a post-rotation operation, even after the image forming operation for the single sheet or the predetermined number of sheets is ended, subsequently, the driving motor is driven for a predetermined time and a predetermined end operation with the rotational drive of the photosensitive drum 1 is executed.

(7) Stand-by

When the post-rotation operation is ended, the drive of the driving motor is stopped, and the image forming apparatus 100 is maintained in the stand-by state until a subsequent image formation start signal S is inputted. When the subsequent image formation start signal S is inputted, the operation goes to the above-described "(4) Pre-rotation operation".

Then, operation steps from the image formation to an end of a jam restoration rotation operation will be described with reference to FIG. 4. The "(3) Stand-by", the "(4) Pre-rotation operation", and the "(5) Image forming operation" are the same as those described using FIG. 3, and therefore, will be omitted from description.

It is assumed that a jam occurrence detection signal J is issued during execution of the image forming operation for forming the image on an N-th sheet. The job occurrence detection signal J is issued in the case where on the basis of a detection signal of a sensor provided along a recording material feeding passage in the image forming apparatus 100, the controller 50 discriminated that abnormality in feeding of the recording material S occurred. When the jam occurrence detection signal J is used, the drive of the driving motor is stopped, so that the image forming operation is interrupted. At this time, a fact that the jam occurred is stored in the non-volatile storing device provided in the image forming apparatus 100.

In parallel to the interruption of the image forming operation, the controller 50 notifies the user of the occurrence of the jam by notification through an operating portion (liquid crystal panel or the like) of the image forming apparatus 100 or by notification to the external computer. On the basis of information from the image forming apparatus 100, the user performs an operation for removing the recording material R remaining inside the image forming apparatus 100 (jam clearance).

(8) Jam Restoration Rotation Operation

The jam restoration rotation operation is an operation during actuation executed when the power source for the image forming apparatus 100 is turned on ("R" of FIG. 4) in a state in which the jam clearance is properly made after the jam occurrence is detected (recorded) and thus there is no recording material remaining inside the image forming apparatus 100. The turning-on of the power source for the image forming apparatus 100 is performed similarly as in the case described in the above-described "(2) initial rotation operation".

Here, the contents of the jam restoration rotation operation are common to the above-described "(4) Pre-rotation operation" and this "(8) Jam restoration rotation operation". That is, the actuation of the driving motor and the stepwise increases in charging voltage and the developing voltage which are performed in the pre-rotation operation are also executed in the jam restoration rotation operation. Accordingly, in each of embodiments described later, the jam restoration rotation operation is executed substantially in the same procedure as the pre-rotation operation except that a trigger for a start of the operation is different.

At a point of time when the power source for the image forming apparatus 100 is turned on after the jam occurrence, a part of the toner image during the image formation when the jam occurred remains on the surface of the photosensitive drum 1. In the jam restoration rotation operation, the driving motor is actuated and required process control with the rotational drive of the photosensitive drum 1 is carried out, so that the toner image remaining on the photosensitive drum 1 during the jam occurrence is properly treated (removed). In this embodiment, the toner image remaining on the photosensitive drum 1 is collected in the developing container 45 in the developing portion P4 by the jam restoration rotation operation. By this, it is possible to prevent the image defect due to the residual toner from occurring in a subsequent image forming operation.

(4. Rise Control in Pre-Rotation Operation)

Figure 5:
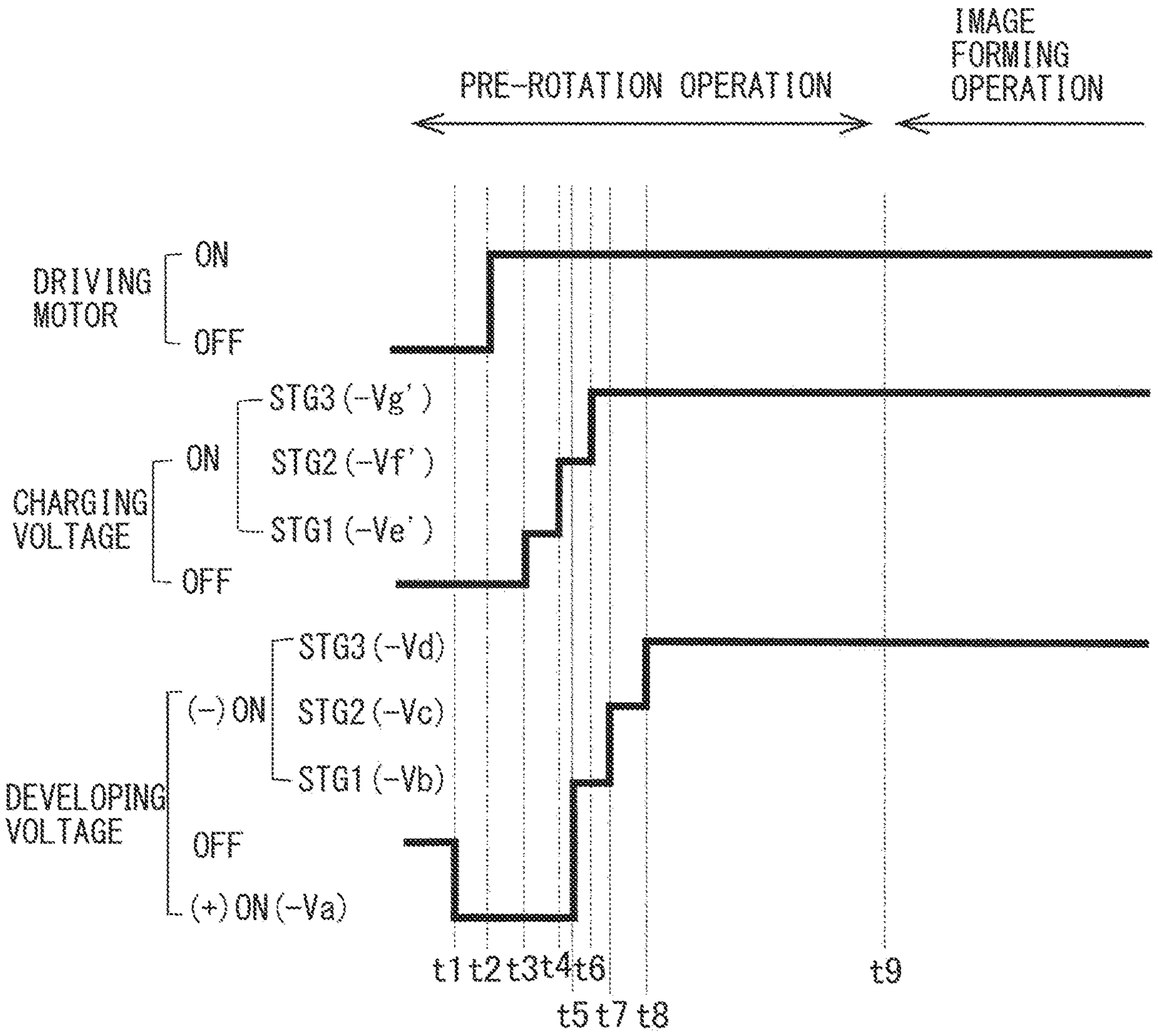
FIG. 5 is a timing chart of a pre-rotation operation in the embodiment 1.
Figure 6:
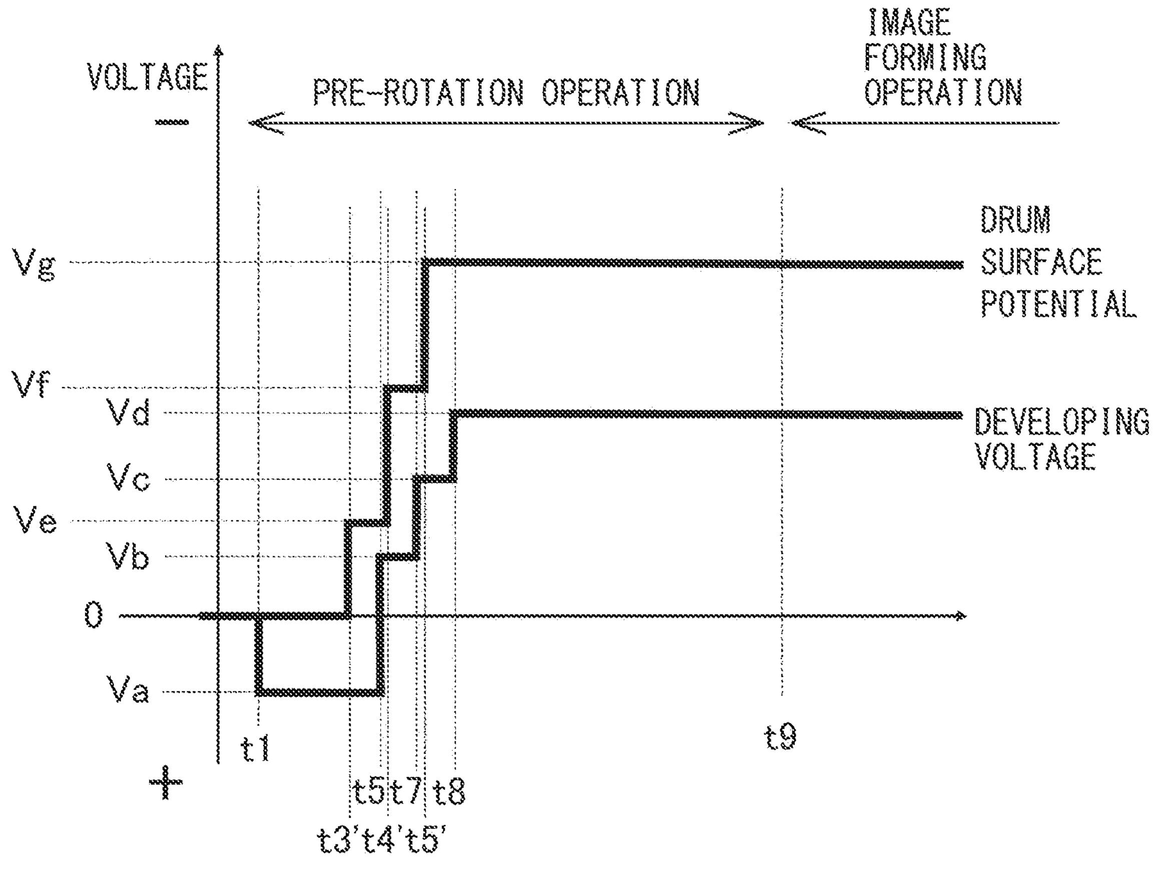
FIG. 6 is a schematic view showing progression of a photosensitive drum surface potential and a developing potential during the pre-rotation operation in the embodiment 1.

Using FIGS. 5 and 6, the pre-rotation operation and the rise control of the charging voltage and the developing voltage performed in the pre-rotation operation in the embodiment 1 will be specifically described. FIG. 5 is a timing chart of the driving motor, the charging voltage, and the developing voltage in the pre-rotation operation. FIG. 6 is progression of the surface potential of the photosensitive drum 1 in the developing portion P4 and the developing voltage in the pre-rotation operation. Incidentally, between FIG. 5 and FIG. 6, correspondingly to a required time for movement of a point on the photosensitive drum 1 from the charging portion P2 to the developing portion P4, a waveform of the surface potential of the photosensitive drum 1 in FIG. 6 is delayed (shifted rightward in the figure) from a waveform of the charging voltage in FIG. 5.

In the following, the developing voltage and the surface potential of the photosensitive drum 1 are represented by adding a sign indicating the polarity of the voltage (potential) to each of variables (Va to Vg) showing absolute values of the voltages (potentials).

When the image formation start signal S is inputted at a time (point of time) t1 shown in FIGS. 5 and 6, the controller 50 causes the developing power source PW2 to start application of the developing voltage of the positive polarity to the developing roller 41. At this time, the surface potential of the photosensitive drum 1 is substantially 0 V, and therefore, in the developing portion P4, the back contrast Vbc (=+Va) which is the same value as the value of the developing voltage is formed. For this reason, as regards the developing voltage Va of the positive polarity, the back contrast Vbc is set at a value falling within a proper range (see FIG. 2) relative to the surface potential of 0 V. In this embodiment, the developing voltage (+Va) of the positive polarity used in an initial stage of the pre-rotation operation was set at +150 V.

Thereafter, at a time t2, the controller 50 causes the driving motor to start rotation ("ON"). When the driving motor is turned on, both the photosensitive drum 1 and the developing roller 41 start rotation thereof.

Subsequently, as shown in FIG. 5, at a time t3, the controller 50 causes the charging power source PW1 to start application of the charging voltage to the charging roller 2. The charging voltage applied at this time is a value (−Ve') set so that the surface potential of the photosensitive drum 1 becomes −Ve. Thereafter, at a time t4, the controller 50 switches the voltage applied to the charging roller 2 by the charging power source PW1 from a value (stage (level) 1, –Ve') at which the surface potential of the photosensitive drum 1 is –Ve to a value (stage 2, –Vf') at which the surface potential of the photosensitive drum 1 becomes –Vf higher than –Ve. Further, at a time t6, the controller switches the voltage applied to the charging roller 2 by the charging power source PW1 from a value (stage 2, –Vf) at which the surface potential of the photosensitive drum 1 is –Vf to a value (stage 3, –Vg') at which the surface potential of the photosensitive drum 1 becomes –Vg higher than –Vf. The charging voltage (corresponding to the surface potential –Vg of the photosensitive drum 1) in a final stage (stage 3) in the rise control is equal to the charging voltage in the image forming operation.

In parallel to such stepwise rise of the charging voltage, as shown in FIG. 6, the controller 50 increases the developing voltage stepwise. That is, at a time t5 subsequent to a time t3' at which the surface region of the photosensitive drum 1 charged to the surface potential –Ve by the charging voltage in the stage 1 reaches the developing portion P4, the controller 50 switches the developing voltage from a voltage +Va of the positive polarity to a voltage –Vb (stage 1) of the negative polarity. Further, at a time t7 subsequent to a time t4' at which the surface region of the photosensitive drum 1 charged to the surface potential –Vf by the charging voltage in the stage 2 reaches the developing portion P4, the controller 50 switches the developing voltage from the voltage –Vb of the negative polarity to a voltage –Vc (stage 2) which is of the negative polarity and which is higher than the voltage –Vb. Further, at a time t8 subsequent to a time t5' at which the surface region of the photosensitive drum 1 charged to the surface potential –Vg by the charging voltage in the stage 3 reaches the developing portion P4, the controller 50 switches the developing voltage from the voltage –Vc of the negative polarity to a voltage –Vd (stage 3) which is of the negative polarity and which is higher than the voltage –Vc. The developing voltage (–Vd) in the final stage (stage 3) in the rise control is equal to the developing voltage in the image forming operation.

When pre-heating in the fixing device 7 is completed at a time t9, the controller 50 discriminates that the pre-rotation operation is completed, and the operation goes to the image forming operation.

Here, timings when the developing voltages are switched from Va to Vb, Vb to Vc, and Vc to Vd at the times t5, t7, and t8, respectively, are set so that the surface potential of the photosensitive drum 1 in the developing portion P4 is increased to and stabilized at Ve, Vf, and Vg, respectively. Similarly, timings when the charging voltages are switched from 0 V to Ve', Ve' to Vf' and Vf' to Vg' at the times t3, t4, and t6, respectively, are set so that the surface potentials of the photosensitive drum 1 in the developing portion P4 are switched to Ve. Vf, and Vg, respectively, after the developing voltage is switched to an associated stage and the resultant voltage value is stabilized. Specifically, in response to a voltage value switching instruction, the timings are set in consideration of rise characteristics (response times) of the charging power source PW1 and the developing power source PW2, a required time for moving a point of the surface of the photosensitive drum 1 from the charging portion P2 to the developing portion P4, and the like.

Further, the charging voltages and the developing voltages are set so that in the stages (stages 1 to 3), the surface potentials (Ve to Vg) of the photosensitive drum 1 formed by the charging voltages have the negative polarity relative to the developing voltages (Vb to Vd), respectively. For this reason, as shown in FIG. 6, at each of the times (point of times) from the time t1 at which the application of the developing voltage (Va) of the positive polarity is started before the rotation of the photosensitive drum 1 is started to the time t9 at which the pre-rotation operation is completed, the back contrast Vbc at which the polarity on the photosensitive drum 1 side is the negative polarity is formed in the developing portion P4. That is, an electric field for electrostatically retaining the normally charged toner on the developing roller 41 is continuously formed in the developing portion P4 by that the polarity on the photosensitive drum 1 side is the same polarity as the normal charge polarity of the toner 44 and the polarity on the developing roller 41 side is the opposite polarity to the normal charge polarity of the toner 44.

Particularly, values of the respective stages of the charging voltages and the developing voltages in the rise control are set so as to satisfy a condition such that the values of the back contrast Vbc formed in the developing portion P4 in a period from the time t1 to the time t9 are not deviated from the proper (predetermined) range (FIG. 2) for suppression of the fog. Specifically, progression of the values of the back contrast Vbc from the time t1 to the time t9 in this embodiment is Va (t1 to t3'), Va-Ve (t3' to t5), Vb-Ve (t5 to t4'), Vb-Vf (t4' to t7), Vc-Vf (t7 to t5'), Vc-Vg (t5' to t8), and Vd-Vg (t8 and later). Here, Va to Vg are positive values (absolute values of the surface potentials and the developing voltages), and the back contrast Vbc is represented by a positive potential difference when the polarity on the photosensitive drum 1 side is the negative polarity. The values (Va to Vd, Ve' to Vg') of the charging voltages and the developing voltages in the respective stages in the rise control may desirably be set so that all the positive values of the back contrast Vbc fall within the proper range of the back contrast Vbc shown in FIG. 2. In other words, the controller 50 may desirably control the charging voltage and the developing voltage so that during a period of the pre-rotation operation (preparatory operation before the image forming operation), the polarity of the surface potential of the image bearing member in the developing portion is the same as the normal charge polarity of the toner relative to the developing voltage and the potential difference between the developing voltage and the surface potential of the image bearing member is maintained in the predetermined range.

By this, at least, it is possible to suppress the occurrence of the fog due to the electrostatic deposition of the toner particles, charged to the negative polarity on the developing roller 41, on the photosensitive drum 1 during the pre-rotation operation. Further, it is possible to suppress toner consumption due to the occurrence of the fog during the pre-rotation operation.

Incidentally, in this embodiment, three-stage control such that the charging voltage and the developing voltage are increased to voltage values (stage 3) which are the same as the voltage values during the image formation through two intermediary values (stages 1 and 2) is carried out, but the number of the stages may be less than three or larger than three, further, the charging voltage and the developing voltage in the final stage in the rise control during the pre-rotation operation may be different from the voltage values in the image forming operation. For example, in the rise control, the charging voltage and/or the developing voltage may be increased to a voltage value lower (in absolute value) than the voltage value for the image formation and then may be increased to the voltage value for the image formation in the case where the image forming operation is started. Further, the charging voltage and/or the developing voltage may be increased to a voltage value higher (in absolute value) than the voltage value for the image formation and then may be lowered to the voltage value for the image formation in the case where the image forming operation is started.

(5. State of Apparatus During Pre-Rotation Operation)

Figure 7:
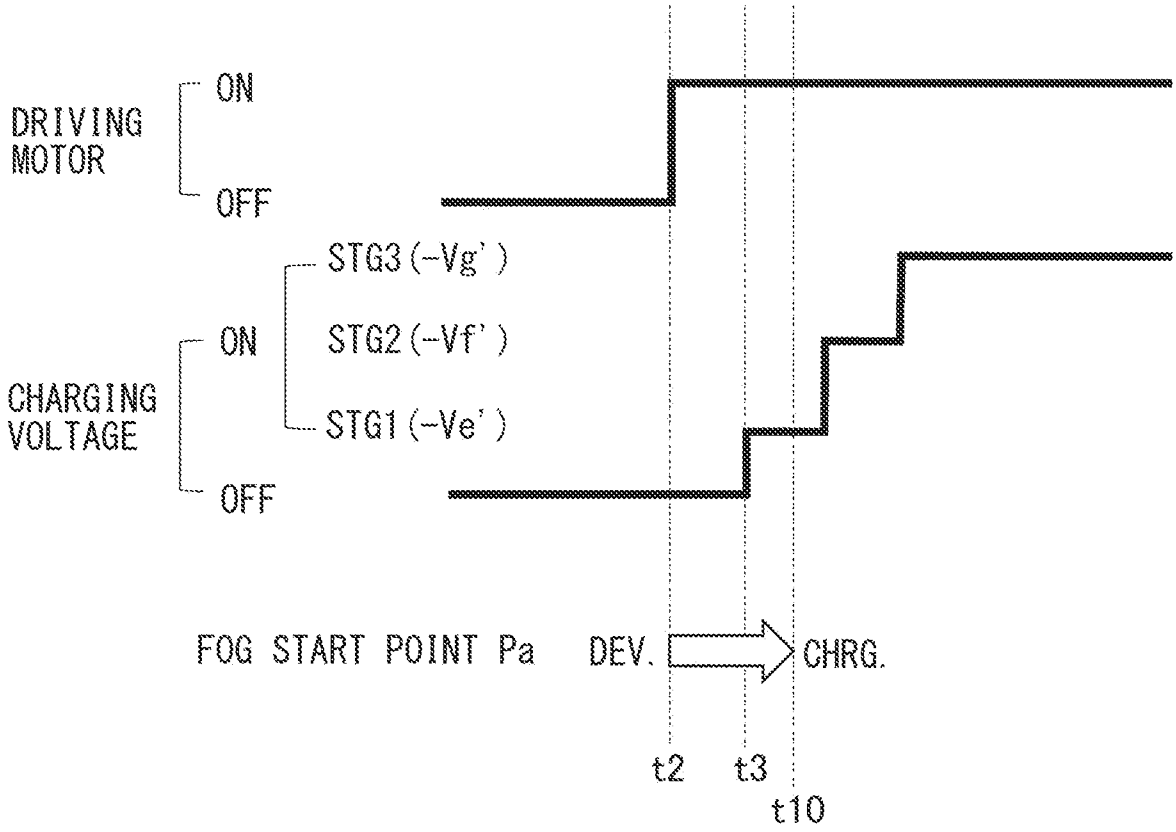
FIG. 7 is a timing chart of a driving motor and a charging voltage in the pre-rotation operation of the image forming apparatus in the embodiment 1.
Figure 8:
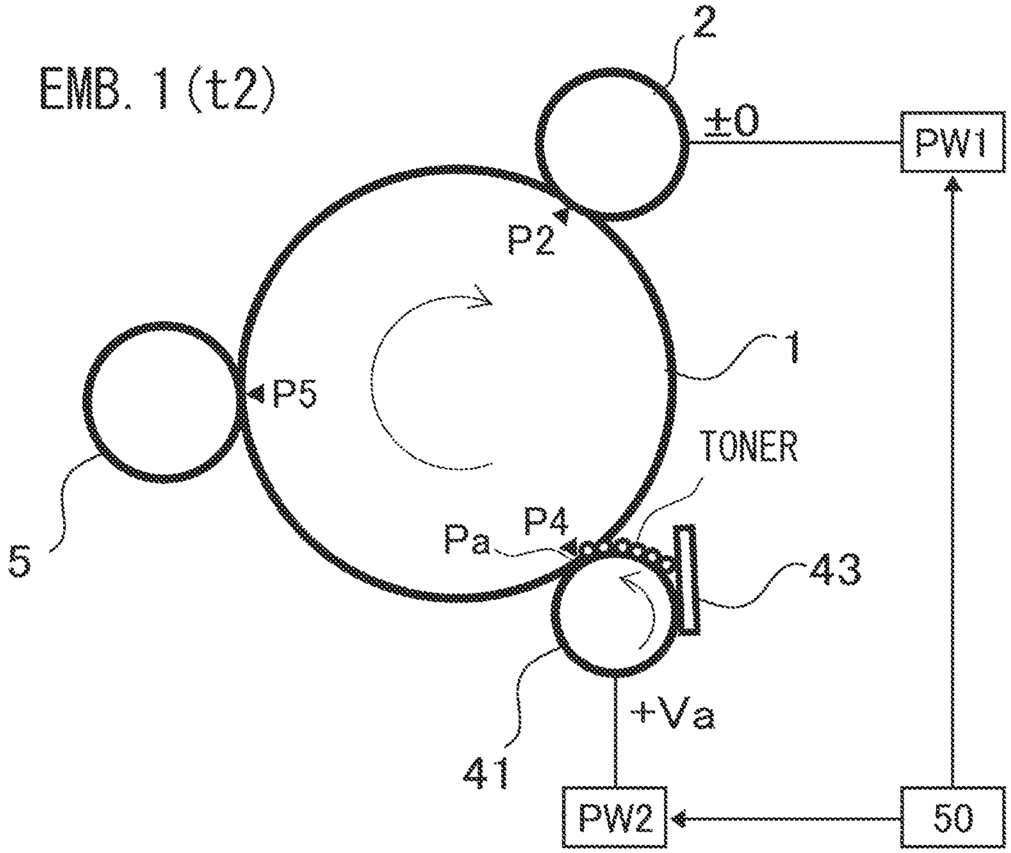
FIG. 8 is a schematic view showing a state of the image forming apparatus at a time (point of time) t2 during the pre-rotation operation in the embodiment 1.
Figure 9:
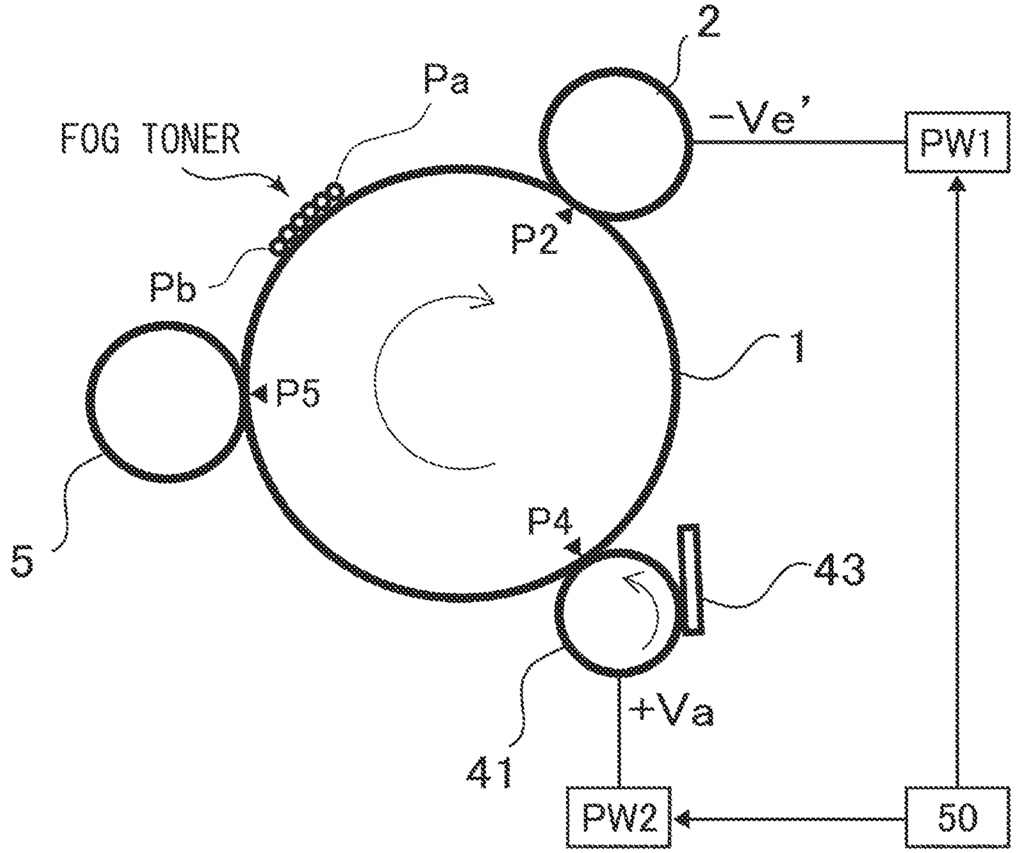
FIG. 9 is a schematic view showing a state of the image forming apparatus at a time t3 during the pre-rotation operation in the embodiment 1.
Figure 10:
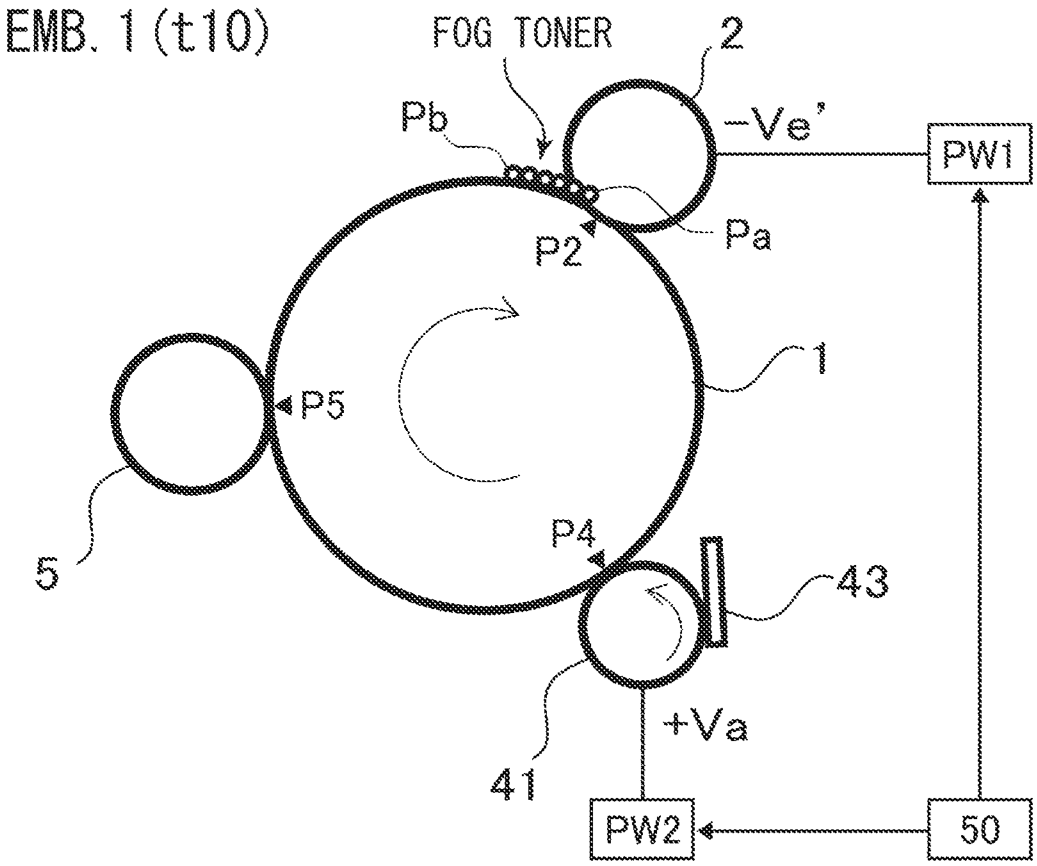
FIG. 10 is a schematic view showing a state of the image forming apparatus at a time t10 during the pre-rotation operation in the embodiment 1.

In the following, using FIGS. 7 to 10, a state of the apparatus at each of the times of the pre-rotation operation will be described. FIG. 7 is a timing chart of the driving motor and the charging voltage in the pre-rotation operation, in which a period (t2 to t10) of movement of a fog start point Pa on the photosensitive drum 1 from the developing portion P4 to the charging portion P2 are shown. FIGS. 8 to 10 are schematic views each showing a state of the image forming apparatus 100 at an associated time of the pre-rotation operation.

The "fog start point Pa" is a start end of a range on the photosensitive drum 1 in which fog during actuation described in the following occurs. Further, a "fog end point Pb" is a terminal end of the range on the photosensitive drum 1 in which the fog during actuation occurs.

FIG. 8 shows the state of the image forming apparatus 100 at a point of time (FIG. 7) when the rotation of the driving motor is started at the time t2. At this time, in the developing portion P4, the toner 44 carried on the developing roller 41 contacts the photosensitive drum 1. When the toner 44 on the developing roller 41 is sufficiently charged to the negative polarity, by the above-described control of the back contrast Vbc, the occurrence of the fog during actuation due to the electrostatic deposition of the toner on the photosensitive drum 1 during the pre-rotation operation is suppressed.

However, in the case where the stand-by state continues for a long time before the pre-rotation operation, the charge amount of the toner 44 on the developing roller 41 attenuates and becomes a low value. In this case, even when the back contrast Vbc is formed in advance at the time (t2) of actuation of the driving motor, the charge amount of the toner 44 is low, and therefore, the toner 44 cannot be electrostatically retained on the developing roller 41, so that a part of the toner 44 is non-electrostatically deposited on the photosensitive drum 1. Thus, when the rotation of the photosensitive drum 1 is started in a state in which the image forming operation is not performed for a long term, the toner 44 low in charge amount is non-electrostatically deposited on the photosensitive drum 1 in the developing portion P4, whereby the fog during actuation (fog during actuation after long-term standing) occurs.

The fog during actuation occurs from a portion, of the surface of the photosensitive drum 1, where the photosensitive drum surface contacts the toner 44 on the developing roller 41 at the time t2 when the rotation of the driving motor is started. That is, the fog start point is the surface region of the photosensitive drum 1 positioned in the developing portion P4 at the time (t2) of the start of the rotation of the photosensitive drum 1.

On the other hand, the fog during actuation ends when a state in which the toner 44 carried on the developing roller 41 and supplied to the developing portion P4 is sufficiently charged. This is because when the charge amount of the toner 44 is large, the toner 44 is electrostatically retained on the developing roller 41 by the control of the back contrast Vbc described above. In this embodiment, the charge amount of the toner 44 is principally increased by friction with the regulating blade 43. For that reason, the fog end point Pb is the surface region of the photosensitive drum 1 contacting the toner 44, in the developing portion P4, positioned in a position immediately after the toner 44 passes through a free end of the regulating blade 43 at the rotation start time (t2) of the photosensitive drum 1.

In other words, the fog during actuation is caused to occur by the deposition, on the photosensitive drum 1, of the toner 44 reaching the developing portion P4 without passing through the regulating blade 43 once after the start of the rotation of the developing roller 41.

FIG. 9 shows a state of the image forming apparatus 100 at the time t3 (FIG. 7) when the application of the charging voltage (−Ve') in the first stage to the charging roller 2 is started after the start of the rotation of the driving motor in the pre-rotation operation. At this time, the fog start point Pa on the photosensitive drum 1 is positioned upstream of the charging portion P2 with respect to the rotational direction of the photosensitive drum 1.

FIG. 10 shows a state of the image forming apparatus 100 at the time t10 when the fog start point Pa on the photosensitive drum 1 reaches the charging portion P2 after the start of the application of the charging voltage to the charging roller 2 in the pre-rotation operation.

As shown in FIGS. 9 and 10, in this embodiment, the application of the charging voltage to the charging roller 2 is started before the fog start point Pa on the photosensitive drum 1 reaches the charging portion P2 after the start of rotation of the driving motor. Tat is, a relationship between the timing (t3) when the application of the charging voltage is started and the timing (t10) when the surface region (Pa) on the photosensitive drum 1 positioned in the developing portion P4 at the time of the start of the rotation of the photosensitive drum 1 is as follows.

t3<t10

Further, the charging voltage in the stage 1 in which the application of the charging voltage to the charging roller 2 is started at the time t3 has a value at which the surface of the photosensitive drum 1 is charged to the potential of −Ve, i.e., a voltage value not less than a discharge start voltage of the charging roller 2. Incidentally, a value of the charging voltage in the stage 1 in this embodiment is −840 V not less than the discharge start voltage of the charging roller 2.

In other words, the controller 50 in this embodiment starts the application of the charging voltage at the voltage value not less than the discharge start voltage of the charging member before the surface region (Pa) of the image bearing member positioned in the developing portion P4 at the time (t2) of the start of the rotation of the image bearing member reaches the charging portion (P2).

Here, in this embodiment, the photosensitive drum 1 is 24 mm in diameter and is rotationally driven at a peripheral speed of 139 mm/sec. Further, a distance from the developing position P4 to the charging portion P2 with respect to a circumferential direction of the photosensitive drum 1 is 54 mm. From this, a time from the time a when the driving motor is actuated in the pre-rotation operation to the time t10 when the fog start point Pa reaches the charging portion P2 ($t$10-$t$2) is calculated as follows.

$$t10-t2=(54/139)\times 1000=388\ [\text{msec}]$$

Further, in the pre-rotation operation, a time from the time t2 when the driving motor is actuated to the time t3 when the application of the charging voltage is started (t3-t2) is represented as follows.

$$t3-t2=250\ [\text{msec}]$$

Figure 11:
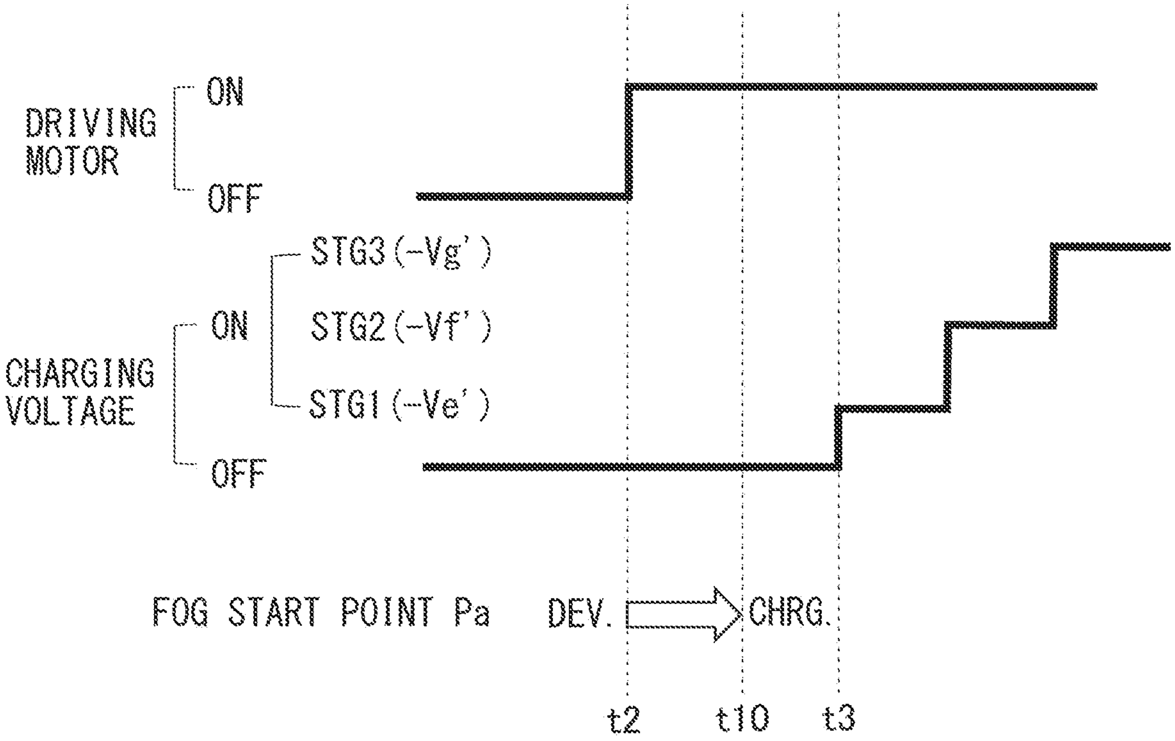
FIG. 11 is a timing chart of a driving motor and a charging voltage in a pre-rotation operation in a comparison example 1.

A comparison example 1 will be described using FIGS. 11 to 13. FIG. 11 is a timing chart of the driving motor and the charging voltage in the pre-rotation operation in the comparison example 1, to which a period in which the fog start point Pa on the photosensitive drum 1 moves from the developing portion P4 to the charging portion P2 is added.

Figure 12:
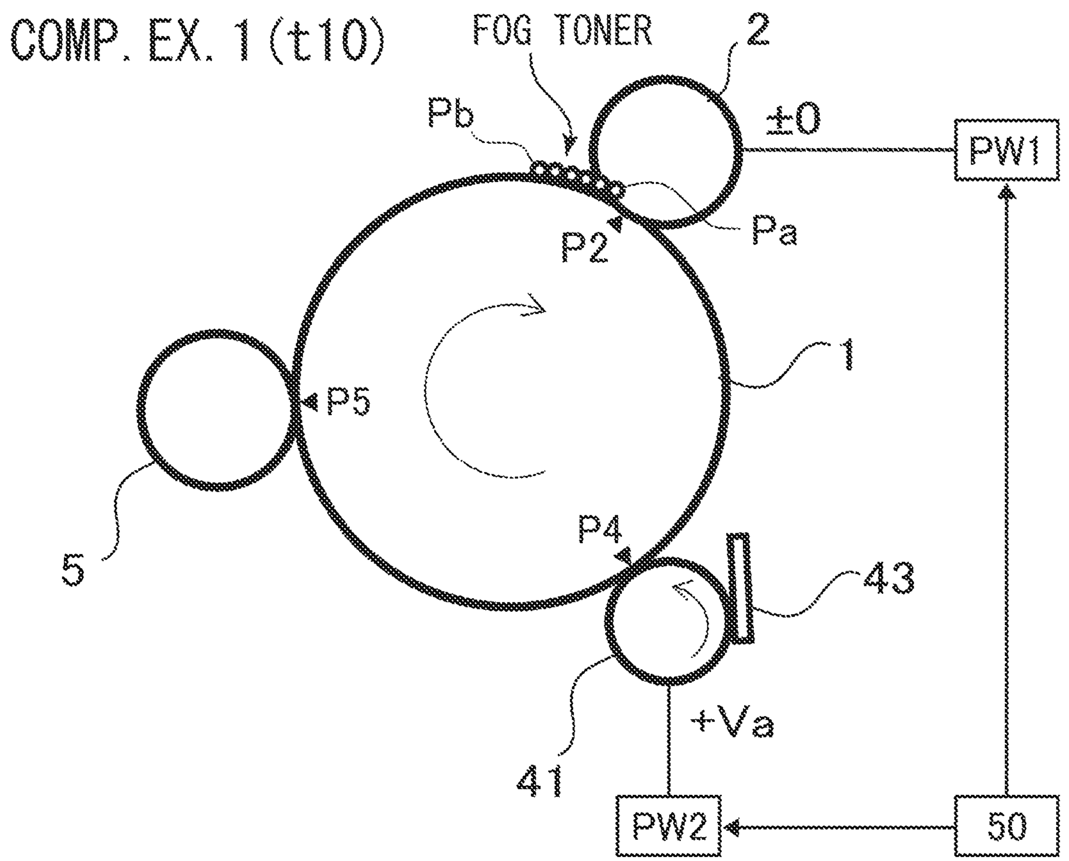
FIG. 12 is a schematic view showing a state of the image forming apparatus at the time t10 during the pre-rotation operation in the comparison example 1.

FIG. 12 shows a state of the image forming apparatus 100 at the time t10 when the fog start point Pa on the photosensitive drum 1 reaches the charging portion P2 in the pre-rotation operation in the comparison example 1. FIG. 13 shows a state of the image forming apparatus 100 at the time t3 when the application of the charging voltage in the stage 1 to the charging roller 2 is started in the pre-rotation operation in the comparison example 1.

Figure 13:
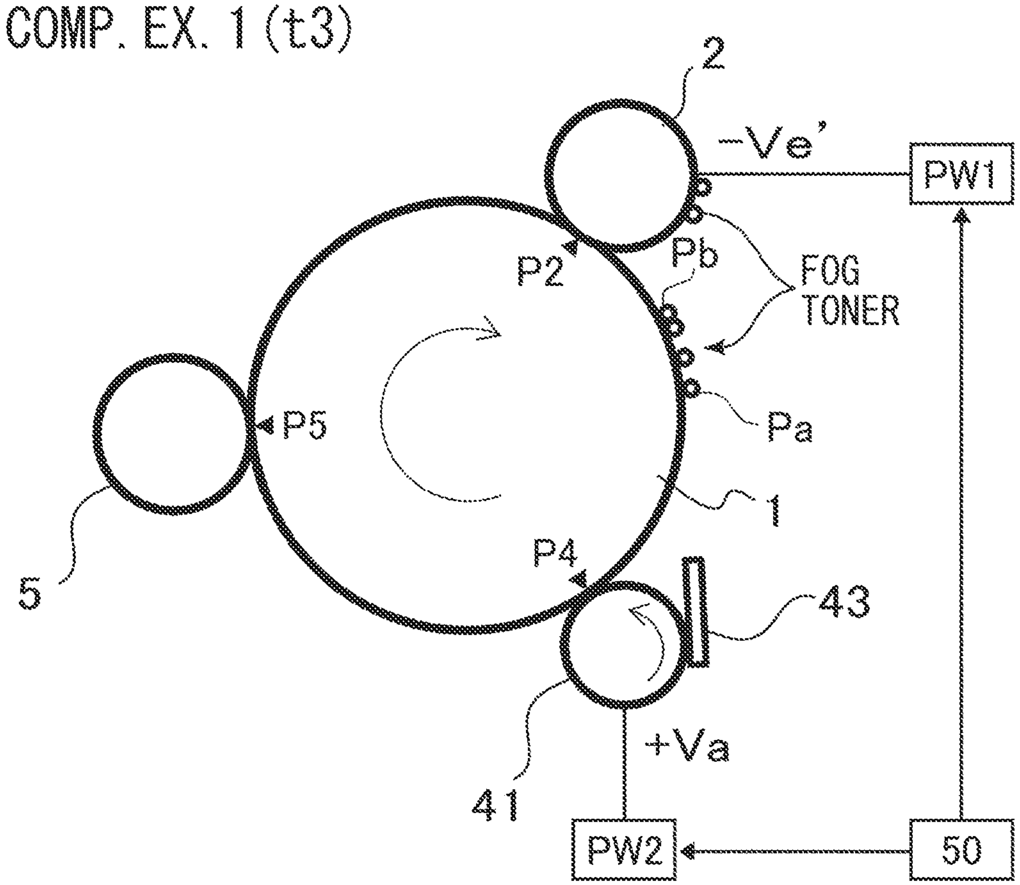
FIG. 13 is a schematic view showing a state of the image forming apparatus at the time t3 during the pre-rotation operation in the comparison example 1.

As shown in FIGS. 11 to 13, in the comparison example 1, the fog start point Pa on the photosensitive drum 1 reaches the charging portion P2 (*t*10) before the start (t3) of the application of the charging voltage to the charging roller 2. That is, a relationship between a timing (t3) when the application of the charging voltage to the charging roller 2 is started and a timing (t10) when the surface region (Pa) on the photosensitive drum 1 positioned in the developing portion P4 at the time of the start of the rotation of the photosensitive drum 1 is as follows.

t10>t3

In other words, in the comparison example 1, at the timing when the fog start point Pa on the photosensitive drum 1 reaches the charging portion P2, the charging voltage not less than the discharge start voltage is not applied to the charging roller 2. As regards other constitutions, the comparison example 1 is substantially the same as the embodiment 1.

Figure 14:
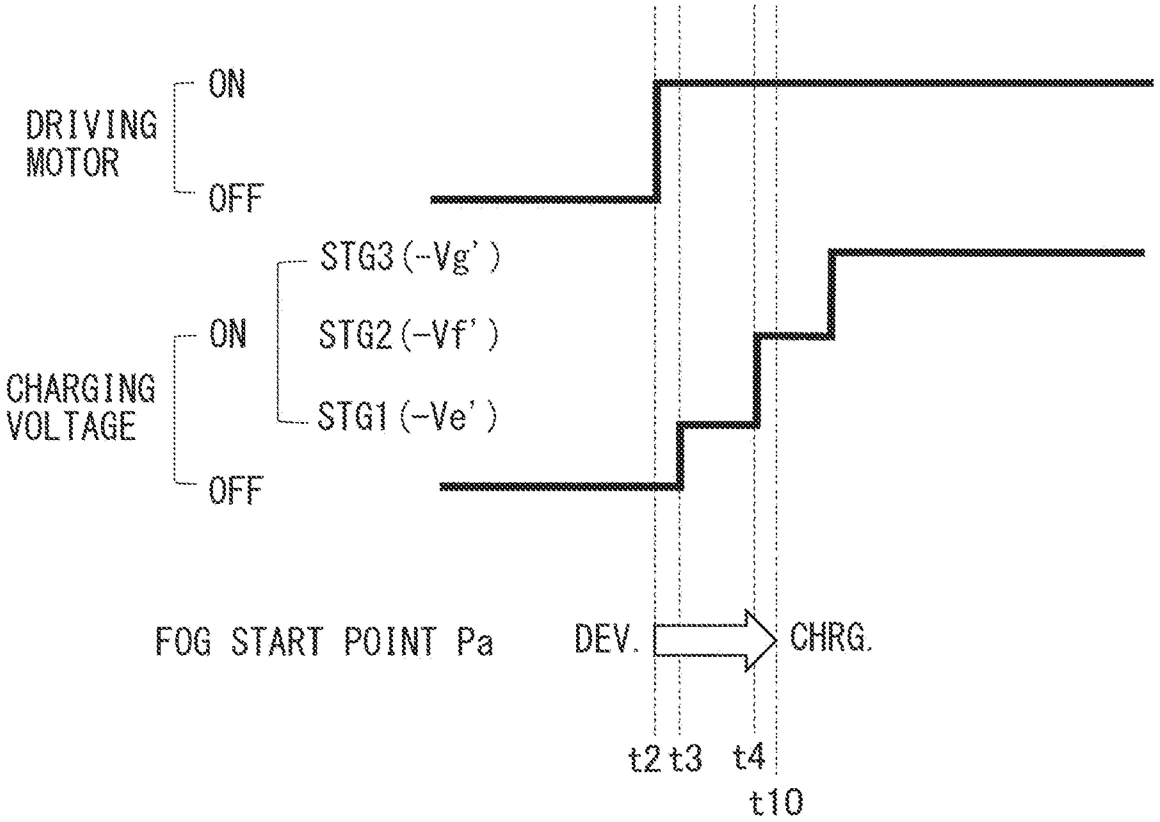
FIG. 14 is a timing chart for a driving motor and a charging voltage in a pre-rotation operation of an image forming apparatus in an embodiment 2.

Next, another embodiment (embodiment 2) will be described using FIG. 14. FIG. 14 is a timing chart of the driving motor and the charging voltage in the pre-rotation operation in the embodiment 2, in which a period (t2 to t10) of movement of the fog start point Pa on the photosensitive drum 1 from the developing portion P4 to the charging portion P2 is shown.

In this embodiment, the increase (rise) in charging voltage applied to the charging roller 2 is earlier than the embodiment 1. Specifically, in this embodiment, a length (t3-t2) of the period from the actuation (t2) of the driving motor to the start (t3) of the application of the charging voltage to the charging roller 2 is set as follows.

$$t3-t2=105 \text{ [msec]}$$

As a result, the charging voltage applied to the charging roller 2 is increased to the stage 2 before the fog start point Pa on the photosensitive drum 1 reaches the charging portion P2 (*t*10). That is, a relationship between the time (t4) when the charging voltage applied to the charging roller 2 is increased to the stage 2 and the time (t10) when the surface region (Pa) on the photosensitive drum 1 positioned in the developing portion P4 at the time of the start of the rotation of the photosensitive drum 1 reaches the charging portion P2 is as follows. Incidentally, t3>t4 holds naturally.

t4<t10

That is, in this embodiment, in the pre-rotation operation (preparatory operation before the image forming operation), before the surface region of the image bearing member positioned in the developing portion at the time of the start of the rotation of the image bearing member, the controller 50 starts application of the charging voltage at a first voltage value not less than the discharge start voltage of the charging member and then further increases the charging voltage to a second voltage value higher than the first voltage value.

Here, in the embodiment 2, the charging voltage in the stage 1 in which the application of the charging voltage to the charging roller 2 is started at the time t3 is set at −840 V not less than the discharge start voltage of the charging roller 2. Further, the charging voltage in the stage 2 in which the application of the charging voltage to the charging roller 2 is started at the time t4 is set at −1060 V higher than the charging voltage in the stage 1.

Figure 15:
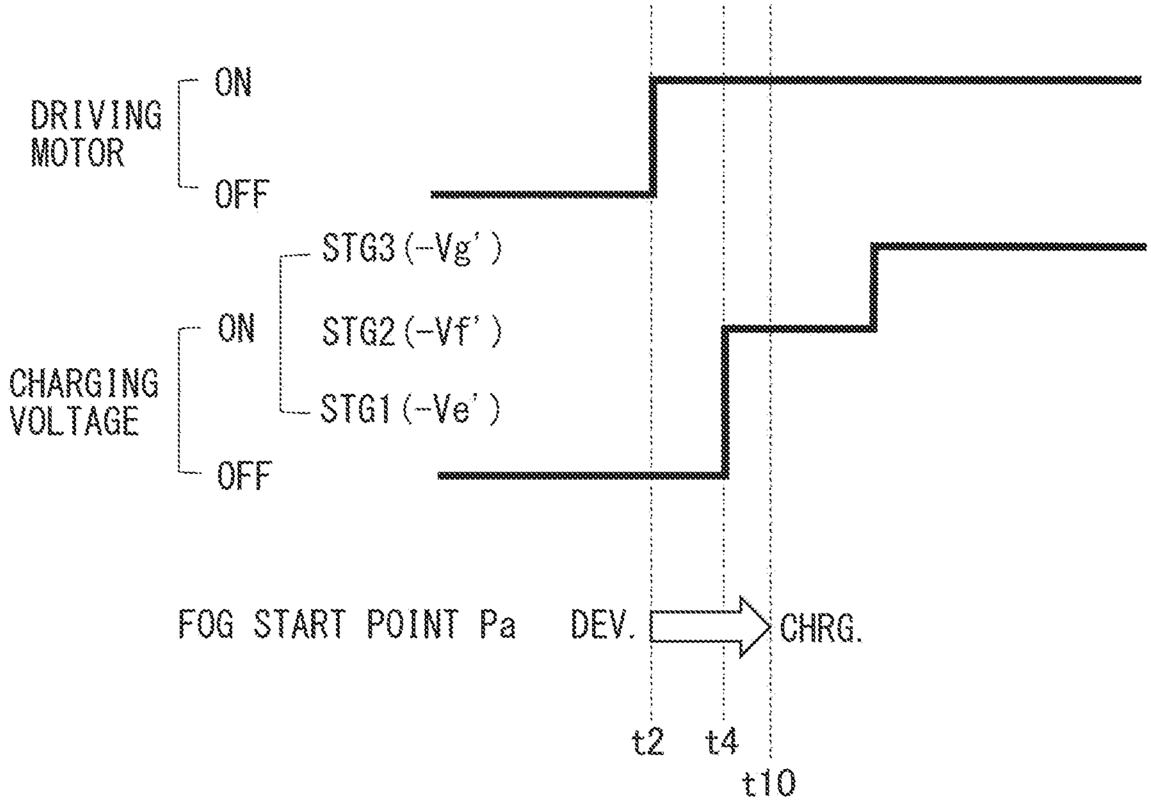
FIG. 15 is a timing chart of a driving motor and a charging voltage in a pre-rotation operation of an image forming apparatus in a comparison example 2.

A comparison example 2 will be described using FIG. 15. FIG. is a timing chart of the driving motor and the charging voltage in the pre-rotation operation in the comparison example 2, in which a period (t2 to t10) of movement of the fog start point Pa on the photosensitive drum 1 from the developing portion P4 to the charging portion P2 is shown.

The comparison example 2 is different from the embodiments 1 and 2 and the comparison example 1, and in the comparison example 2, application of the charging voltage in the stage 2 is started at the time t4, without applying the charging voltage in the stage 1, from a state in which the charging voltage is not applied in the rise control of the charging voltage.

Here, in the comparison example 2, a value (charging voltage immediately after the start of the application) of the charging voltage in the stage 2 is set at −1060 V. Further, the back contrast Vbc in the developing portion P4 at the time when the surface region of the photosensitive drum 1 positioned in the charging portion P2 at the time t4 reaches the developing portion P4 was 620 V.

That is, the comparison example 2 employs a constitution in which the value of the charging voltage at the time of the start of the application is large, and therefore, during the execution of the pre-rotation operation, there is a period in which the value of the back contrast Vx is deviated from the proper range (FIG. 2).

Figure 16:
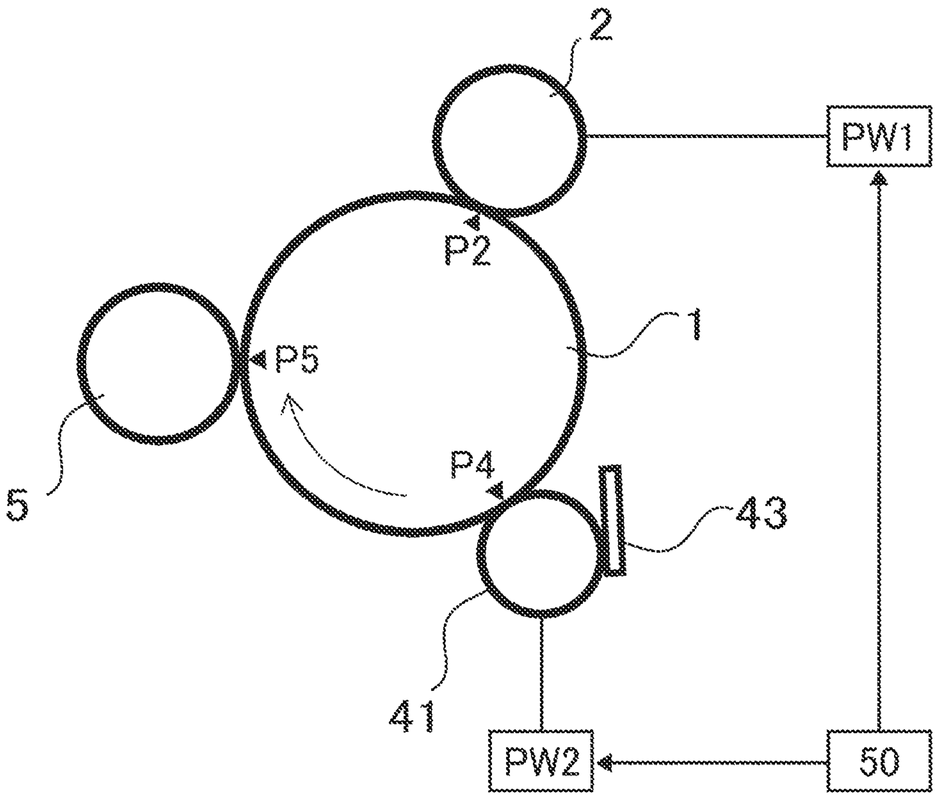
FIG. 16 is a schematic view of a photosensitive drum of the image forming apparatus and a periphery thereof in the embodiment 2.

In the following, the embodiment 2 of the present invention will be described while making reference to FIG. 16. In the following, in the embodiment 2, elements represented by the reference numerals or symbols common to the embodiments 1 and 2 have substantially the same constitutions and functions as the elements in the embodiment 1. In the embodiment 2, a portion different from the embodiment 1 will be principally described.

A difference of the embodiment 2 from the embodiment 1 is that the photosensitive drum 1 is 20 mm in diameter and is rotationally driven at a peripheral speed of 188 mm/sec. Further, a distance from the developing portion P4, which is the contact portion between the developing roller 41 and the photosensitive drum 1, to the charging portion P2 with respect to the circumferential direction of the photosensitive drum 1 is 44 mm.

In this embodiment, compared with the embodiment 1, the diameter of the photosensitive drum 1 is small, and the process speed is fast. That is, this embodiment employs a constitution in which further downsizing of the process cartridge and further speed-up of the image forming apparatus are capable of being realized than the embodiment 1.

A comparison example 3 will be described. The comparison example 3 has a constitution in which in the constitution of the embodiment 2, similarly as in the comparison example 1, the fog start point Pa on the photosensitive drum 1 reaches the charging portion P2 before the start of the application of the charging voltage to the charging roller 2. That is, similarly as the comparison example 1 described using FIGS. 11 to 13, after the actuation (12) of the driving motor, the fog start point Pa on the photosensitive drum 1 reaches the charging portion P2 (t10), and then the application of the charging voltage to the charging roller 2 is started (t3).

In the comparison example 3, a time (t10-*t*2) from the time t2 when the driving motor is actuated in the pre-rotation operation to the time t10 when the fog start point Pa reaches the charging portion P2 is calculated as follows.

$$t10-t2=(44/188)\times 1000=234\ [\mathrm{mm}]$$

In this case,

A relationship between the timing (t3) when the application of the charging voltage to the charging roller 2 is started and the timing (t10) when the surface region on the photosensitive drum 1 positioned in the developing portion P4 at the time of the start of the rotation of the photosensitive drum 1 reaches the charging portion P2 is as follows.

$\mathbf{t10>t3}$

In other words, in the embodiment 3, at the timing when the fog start point Pa on the photosensitive drum 1 reaches the charging portion P2, the charging voltage not less than the discharge start voltage is not applied to the charging roller 2. Incidentally, the value of the charging voltage in the stage 1 is set at −840 V.

Subsequently, an embodiment 3 will be described using FIGS. 17 and 18. This embodiment employs a constitution, in which, in addition to the suppression of the fog during actuation, a possibility of an occurrence of an image defect after jam restoration can be suppressed even in the case where the image forming apparatus is left standing for a long time without performing jam clearance after jam occurrence.

Figure 17:
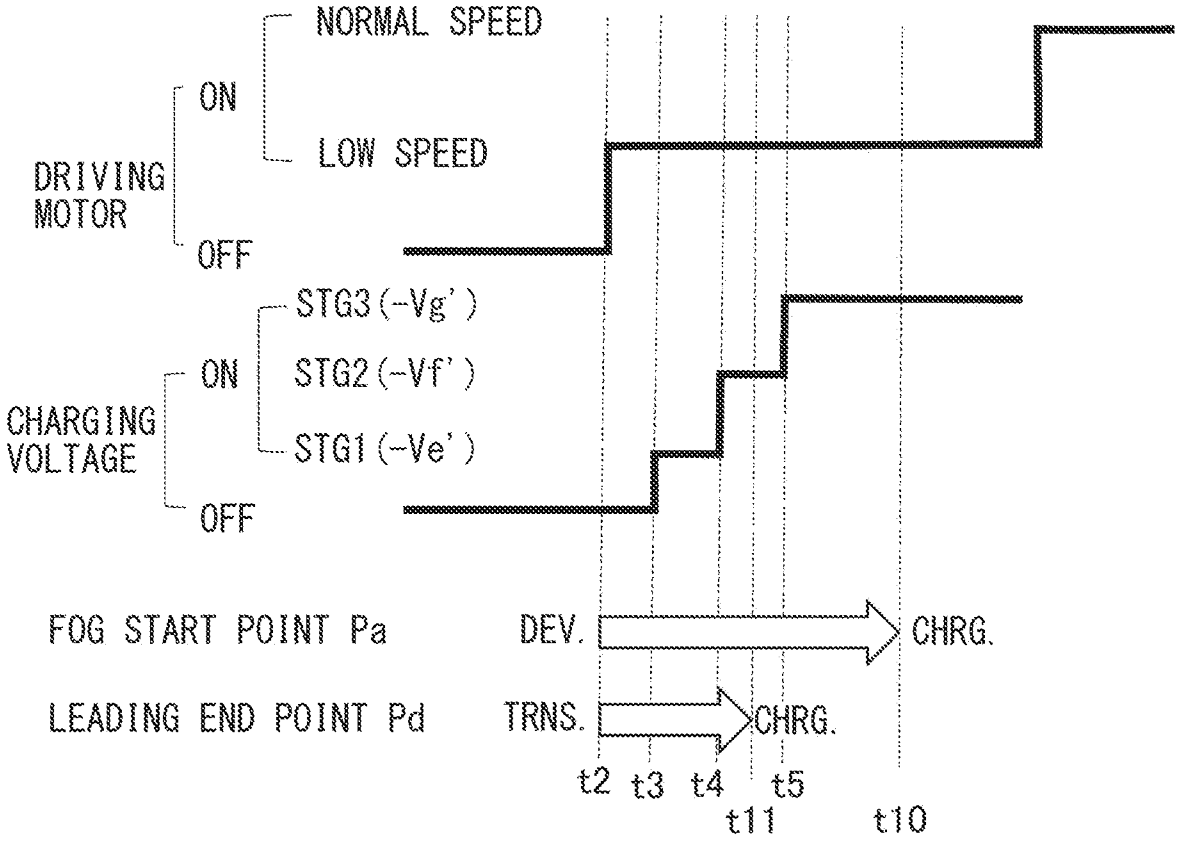
FIG. 17 is a timing chart of a driving motor and a charging voltage in a pre-rotation operation of an image forming apparatus in an embodiment 3.

FIG. 17 is a timing chart of the driving motor and the charging voltage in the pre-rotation operation, in which a period (t2 to t10, t11) of movement of predetermined points (Pa, Pd) on the photosensitive drum 1 from the developing portion P4 to the charging portion P2 is shown. Of the predetermined surface region, the fog start point Pa is a surface region on the photosensitive drum 1 positioned in the developing portion P4 at the time (t2) of the start of the rotation of the photosensitive drum 1 in a jam restoration rotation operation. Further, a point Pd is a surface region on the photosensitive drum 1 positioned at the time (t2) of the start of the rotation of the photosensitive drum 1 in the jam restoration rotation operation.

In the embodiment 3, the rotational speed of the photosensitive drum 1 at the time of the actuation of the driving motor is set at 125 mm/sec lower than the rotational speed during the image formation. Further, after the actuation of the driving motor, the charging voltage is increased to the voltage value which is the same as the voltage value during the image formation and is stabilized, and thereafter, the rotational speed of the photosensitive drum 1 is switched to a speed (normal speed) of 188 mm/sec during the image formation.

That is, by lowering the rotational speed of the driving motor during the actuation, a time (t10-$t2$) from the time (t2) when the rotation of the photosensitive drum 1 is started to the time (t10) when the fog start point Pa reaches the charging portion P2 is as follows and is longer than the time (t10-$t2$) in the comparison example 2.

$$t10-t2=(44/125)\times 100=352\ [\mathrm{mm}]$$

Further, in the embodiment 3, a length (t3-t2) of a period from the actuation (t2) of the driving motor to the start (t3) of the application of the charging voltage to the charging roller 2 is set as follows similarly as in the embodiment 2.

$$t3-t2=105\ [\mathrm{msec}]$$

From above, a period between the start (t3) of the application of the charging voltage to the charging roller 2 and the time (t10) when the surface region (P4) on the photosensitive drum 1 positioned in the developing portion P4 at the time of the start of the rotation of the photosensitive drum 1 reaches the charging portion P2 is as follows.

$\mathbf{t3<t10}$

Further, the charging voltage in the stage 1 in which the application thereof to the charging roller 2 is started at the time t3 has a voltage value not less than the discharge start voltage of the charging roller 2, and is set at −840 V in this embodiment.

Further, a distance from the transfer portion P5 to the charging portion P2 with respect to the circumferential direction of the photosensitive drum 1 is 25 mm. For this reason, a time (t11-$t2$) from the time t2 when the rotation of the photosensitive drum 1 is started to the time t11 when the point Pd positioned in the transfer portion P5 at the time of the start of the rotation of the photosensitive drum 1 reaches the charging portion P2 is as follows.

$$t11-t2=(25/125)\times 1000=200\ [\mathrm{msec}]$$

From this, a relationship between the start (t3) of the application of the charging voltage to the charging roller 2 to the time (t11) when the surface region (Pd) on the photosensitive drum 1 positioned in the transfer portion P5 at the time of the start of the rotation of the photosensitive drum 1 is as follows.

$\mathbf{t3<t11}$

In other words, in the pre-rotation operation (preparatory operation before the image forming operation), the controller 50 in this embodiment starts the application of the charging voltage at the voltage value not less than the discharge start voltage of the charging member before the surface region (Pd) of the image bearing member positioned in the transfer portion P5 at the time (t2) of the start of the rotation of the image bearing member reaches the charging portion P2.

<Evaluation Method of Embodiments and Comparison Examples)

An image evaluation was performed for the embodiments 1 to 3 and the comparison examples 1 to 3. Details of the image evaluation will be described in the following.

(1) Half-Tone Density Non-Uniformity Evaluation

This evaluation was performed after durability sheet passing for outputting images on 20000 sheets, performed after the image forming apparatus 100 was left standing for 24 hours in an evaluation environment and was adapted to the environment. In the durability sheet passing, a test image of a lateral pattern with an image ratio 5% was repetitively outputted. After the durability sheet passing, a half-tone image was outputted on a single sheet, and then an image quality was evaluated. The half-tone image used for evaluation is in a stripe fashion such that an image is formed in a region corresponding to a single line in a main scan direction and then a region corresponding to four lines is made blank, and represents a uniform half-tone image as a whole. This half-tone image for the durability sheet passing and the evaluation was outputted in a single color. Further, the evaluation environment is 32.5° C., and 80% RH.

After the durability sheet passing, the image evaluation was conducted under the following two conditions.

Evaluation (1-a) with no standing: After the durability sheet passing, the half-tone image outputted within one minute is evaluated.

Evaluation (1-b) after long-term standing: After the durability sheet passing, the half-tone image outputted after the image forming apparatus is left standing for 48 hours without executing the image forming operation is evaluated.

(2) Density Non-Uniformity Evaluation after Jam Clearance

After the "(1) Half-tone density non-uniformity evaluation", the charging roller 2 is exchanged to a fresh charging roller 2 (which is not used) and the image forming apparatus 100 is left standing for 24 hours in the evaluation environment, and then the evaluation is started. A whole black image (solid black image on an entire surface of the recording material) is outputted on a single sheet and a door of the image forming apparatus 100 is opened at a timing when a leading end of the recording material is started to be discharged through a discharge opening of the apparatus main assembly, so that the image forming operation is forcedly interrupted. Thereafter, after the recording material in the image forming apparatus 100 was removed (jam clearance), the image forming apparatus 100 was left standing for 48 hours without executing the image forming operation and then the jam restoration rotation operation was executed and the half-tone image was outputted. The half-tone image used for the evaluation is equal to the half-tone image used for the "(1) Half-tone density non-uniformity evaluation".

An evaluation standard of the half-tone image is as follows.

A: A density difference in the half-tone image with respect to the recording material feeding direction (sub-scan direction) cannot be recognized through eye observation.

B: The density difference in the half-tone image with respect to the recording material feeding direction can be recognized in a part of the image through eye observation, but is very slight.

C: The density difference in the half-tone image with respect to the recording material feeding direction can be recognized in a part of the image through eye observation.

D: The density difference in the half-tone image with respect to the recording material feeding direction can be recognized on entirety of the image through eye observation.

In a table 1 below, results of the "(1) Half-tone density non-uniformity evaluation", and the "(2) Density non-uniformity evaluation after jam clearance" in the embodiments 1 to 3 and the comparison examples 1 to 3 are shown.

TABLE 1

| EMB. or | | | HDN*3 | | |
|---|---|---|---|---|---|
| COMP. EX | SRC*1 | RBT*2 | NS*4 | AS*5 | AJ*6 |
| EMB. 1 | YES | t3 < t10 | A | B | C |
| COMP. EX. 1 | YES | t10 < t3 | A | D | D |
| EMB. 2 | YES | t4 < t10 (t3 < t10) | A | A | B |
| COMP. EX. 2 | NO | t4 < t10 (t3 < t10) | D | D | B |
| COMP. EX. 3 | YES | t10 < 13 | A | D | D |
| EMB. 3 | YES | t3 < t10 | A | A | A |

*1 "SRC" is stepwise rise control.
*2 "RBT" is a relationship between a time (t3 or t4) when the charging voltage application is started and a time (t10) when the fog during actuation reaches the charging portion.
*3 "HDN" is the half-tone density non-uniformity.
*4 "RS" is no standing.
*5 "AS" is standing for a long term.
*6 "AJ" is after the jam.

Comparison Between Comparison Example 1 and Embodiments 1 and 2

First, priority of each of the embodiments 1 and 2 to the comparison example 1 will be described. The charging voltage and the developing voltage are stepwise increased while controlling the back contrast Vbc, in a certain range, which is the potential difference between the surface potential of the photosensitive drum 1 and the developing voltage. By this, during a period from the actuation (t2) of the driving motor to the end (t9) of the pre-rotation operation, the back contrast Vbc can be controlled to a proper value, so that it would be considered that the evaluation of the density non-uniformity in the case of the above-described "(1-a) with no standing" was good (A). On the other hand, the evaluation of the density non-uniformity in the case of the above-described "(1-b) after long-term standing" was poor (D).

In the comparison example 1, the reason why the evaluation of the density nonunifonnity is lower in the case of "(1-b) after long-term standing" than in the case of "(1-a) with no standing" will be described using FIG. 8 and FIG. 12.

In the case where the image forming apparatus is left standing for the long term in the stand-by state, the charge amount of the toner 44 carried on the developing roller 41 attenuates with time. In the case where the pre-rotation operation is started in a state in which the charge amount of the toner 44 on the developing roller 41 is very small, as shown in FIG. 8, a part of the toner 44 is non-electrostatically deposited on the photosensitive drum 1, so that the fog during actuation occurs. As described above, even when the back contrast Vbc is formed by applying the voltage Va of the positive polarity to the developing roller 41 before the start of the rotation, if the charge amount of the toner 44 is very small, it is difficult to prevent the fog during actuation.

The fog during actuation occurs in a period from the time (t2) of the start of the rotation of the photosensitive drum 1 to the time when the toner 44 positioned in a position immediately after the photosensitive drum surface passed through the regulating blade 43 at the time (t2) of the start of the rotation of the photosensitive drum 1 reaches the developing portion P4. In subsequent periods, the toner 44 to which the electric field is sufficiently imparted by friction with the regulating blade 43 reaches the developing portion P4, and therefore, the fog can be suppressed by a proper back contrast Vbc.

Figure 18:
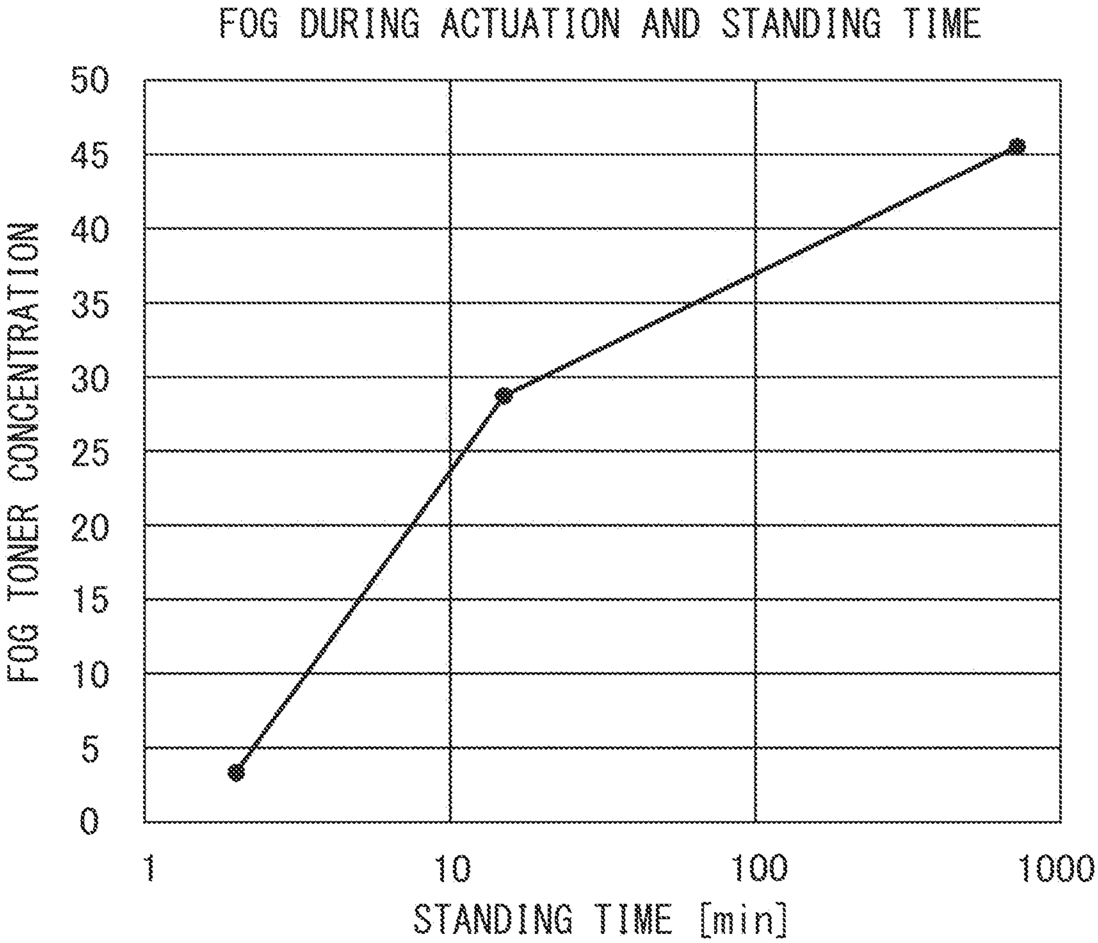
FIG. 18 is a graph showing a relationship between a standing time and toner concentration of a fog during actuation.

FIG. 18 shows a relationship between a standing time of the image forming apparatus in the stand-by state and the toner concentration of the fog during actuation. This evaluation was performed in the environment of 32.5° C. and 80% RH, the fog toner concentration (density) on the photosensitive drum 1 immediately after the start of the rotation was measured by the above-described method of transferring the fog toner onto the Mylar tape. From the result of FIG. 18, it is understood that the fog during actuation is liable to occur abruptly when the standing time becomes longer than 10 minutes and that a degree of the fog during actuation becomes larger with a lapse of the time. On the other hand, in the case where the standing time is very short attenuation of the toner charge amount does not occur and therefore the influence of the fog during actuation is small.

From this, in the case of the "(1-b) after long-term standing", it would be considered that the fog during actuation occurred in the developing portion P4 in the pre-rotation operation and the fog toner in a large amount is deposited on the photosensitive drum 1. Further, as shown in FIG. 12, the toner of the fog during actuation is carried to the charging portion P2 and is deposited on the charging roller 2 when passes through the charging portion P2. It would be considered that by this, the charging non-uniformity occurred and thus the half-tone density non-uniformity.

Next, the reason why the evaluation of the density non-uniformity in the case of the "(1-b) after long-term standing" in the embodiment 1 is good will be described in comparison with the comparison example 1. As shown in 1*o* FIG. 12, in the comparison example 1, at a timing when the fog during actuation reaches the charging portion P2, the charging voltage is not applied to the charging roller 2 (*t*1<t3). On the other hand, as shown in FIG. 10, in the embodiment 1, before the fog during actuation reaches the charging portion P2, the application of the charging voltage not less than the discharge start voltage to the charging roller 2 is started (t3<t10).

Figure 19:
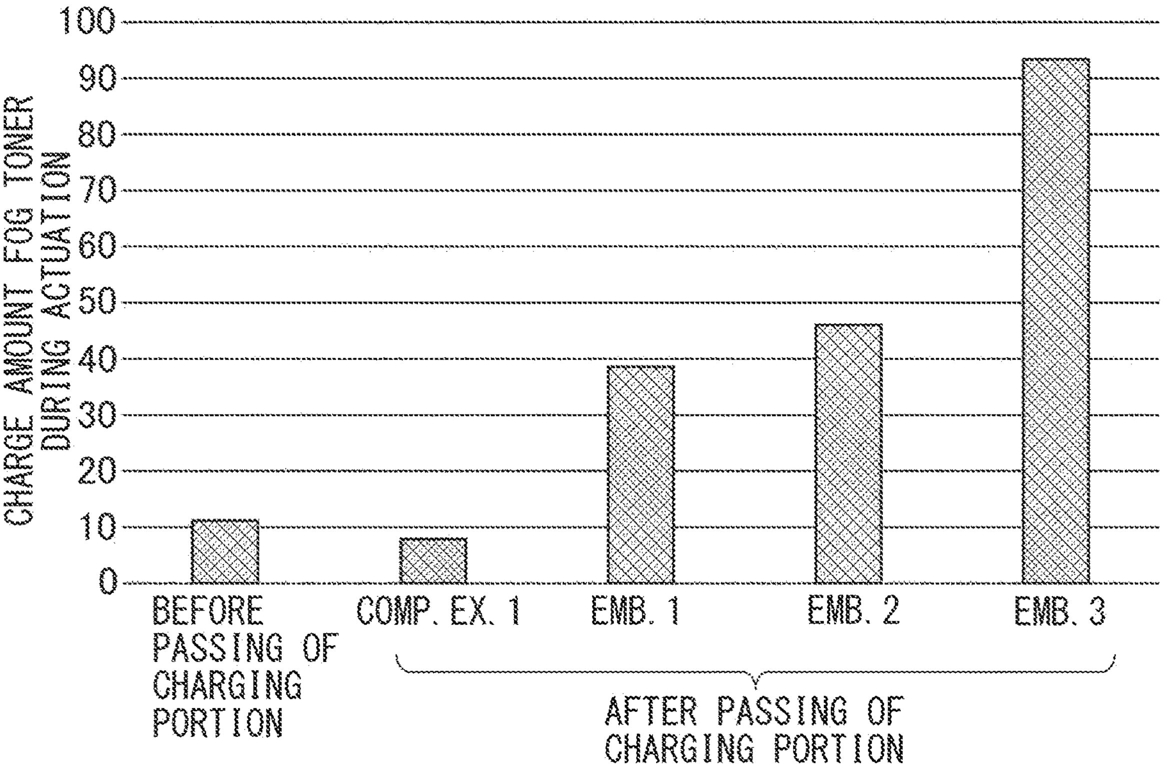
FIG. 19 is a graph showing a relationship with a charging (electric charge) amount of the fog during actuation in the comparison example 1 and in each of the embodiments 1, 2 and 3.

In FIG. 19, a result such that the electric charge of the fog toner during actuation before passing of the charging portion P2 and the electric charges of the fixing during actuation after passing of the charging portion P2 in the comparison example 1 and the embodiments 1 to 3 are compared with each other is shown. Here, a difference between the comparison example 1 and the embodiment 1 will be described. First, it can be confirmed that the fog toner during actuation before passing through the charging portion P2 is very low in charge amount in conformity to the description such that the fog during actuation is caused to occur by the toner attenuated in charge amount by the long-term standing. Next, in the comparison example 1, it is understood that there is no large change in toner electric charge between before and after the passing through the charging portion P2 and that the toner electric charge is kept low even after the passing of the charging portion P2. On the other hand, in the embodiment 1, it is understood that in the embodiment 1, the toner electric charge after the passing through the charging portion P2 becomes considerably larger than the toner electric charge before the passing through the charging portion P2.

Figure 20:
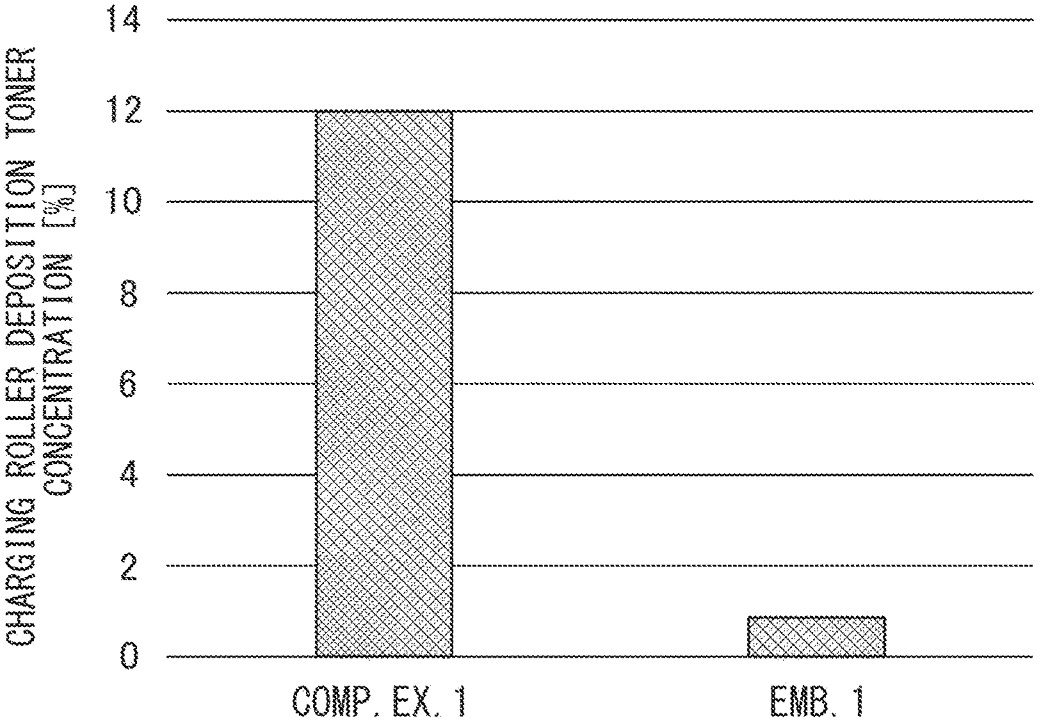
FIG. 20 is a schematic view showing a measurement result of the toner concentration of toner deposited on a charging roller in the comparison example 1 and in the embodiment 1.

FIG. 20 shows a result such that the concentration of the toner deposited on the charging roller 2 at a timing before one full turn of the charging roller 2 after the fog toner during actuation reaches the charging portion P2 is compared between the comparison example 1 and the embodiment 1. It is understood that the concentration of the toner deposited on the charging roller 2 in the comparison example 1 is large, whereas the deposition amount is slight in the embodiment 1.

From above, in the comparison example 1, it would be considered that the electric discharge is not started at the time when the fog during actuation reaches the charging portion P2 and therefore the fog toner passes through the charging portion P2 while the electric charge is low, and therefore, the amount of the toner deposited on the charging roller 2 becomes large. As a result, it would be considered that the density non-uniformity of the half-tone image occurred under a condition of the "(1-b) after long-term standing".

On the other hand, in the embodiment 1, the electric discharge of the charging roller 2 is started before the fog during actuation reaches the charging portion P2. For that reason, the toner electric charge is increased by injecting the electric charge into the fog toner by the electric charge in the charging portion P2, so that by the electric field between the photosensitive drum 1 and the charging roller 2 to which the charging voltage is applied, a force for electrostatically attracting the fog toner to the photosensitive drum 1 acts on the fog toner. As a result, the amount of the toner deposited on the charging roller 2 becomes smaller than the toner amount in the comparison example 1, so that it would be considered that the density non-uniformity is suppressed to a slight level under the condition of the "(1-b) after long-term standing".

Then, as regards the "(2) Evaluation of half-tone density non-uniformity after jam", description can be made similarly as described above. In the stand-by state after the jam occurrence, a residual toner image (the toner image which is developed from the electrostatic latent image until the jam occurrence and during movement to the transfer portion P5) which is a solid black image remains on the photosensitive drum 1.

When the image forming apparatus is left standing for a long term in that state, the toner electric charge of the residual toner image is attenuated, so that the toner charge amount becomes very small. From this state, when the jam restoration operation is performed, the residual toner image on the photosensitive drum 1 passes through the charging portion P2.

In the comparison example 1, it would be considered that the application of the charging voltage to the charging roller 2 is not started at the timing when the residual toner image passes through the charging portion P2, and the transfer residual toner image is deposited on the charging roller 2 to cause the charging non-uniformity, and thus the density non-uniformity of the half-tone image after the jam occurred. On the other hand, in the embodiment 1, at least earlier than the comparison example 1, the application of the charging voltage to the charging roller 2 is started. As a result, as regards at least a part of the transfer residual toner image, the electric charge is injected by the electric discharge in the charging portion P2 when the residual transfer image passes through the charging portion P2, so that the toner charge amount becomes large. As a result, the amount of the toner deposited on the charging roller 2 becomes smaller than the toner amount in the comparison example 1, so that it would be considered that a degree of the density non-uniformity of the half-tone image after the jam becomes smaller than the degree in the comparison example 1.

Further, the above-described description is applied to comparison between the comparison example 1 and the embodiment 2. That is, also in the embodiment 2, the application of the charging voltage not less than the discharge start voltage to the charging roller 2 is started before the fog during actuation reaches the charging portion P2 (*t*3<t10). As a result, it would be considered that the density non-uniformity of the half-tone image under the condition of the "(1-b) after long-term standing" is suppressed and that the "(2) Half-tone density non-uniformity after jam" is also suppressed.

Next, the embodiment 2 will be described. In the embodiment 2, evaluation under both the condition of the "(1-a) with no standing" and the "(1-b) after long-term standing" was good (A). Further, the evaluation of the density non-uniformity in the case of the "(1-b) after long-term standing" was better than the embodiment 1. This reason will be described in the following.

In the embodiment 2, as shown in FIG. 14, the charging voltage is increased to the stage 2 after the start of the rotation of the photosensitive drum 1 and before the fog start point Pa reaches the charging portion P2. That is, a relationship between a switching timing (t4) of the charging voltage to the stage 2 and a timing (t10) when the fog start point Pa reaches the charging portion P2 is as follows.

t4<t10

This is because in the embodiment 2, the application of the charging voltage in the stage 1 is started earlier than in the embodiment 1. As shown in FIG. 19, in the embodiment 2, it is understood that the charge amount of the fog toner after passing through the charging portion P2 is larger than in the embodiment 1. This is because the charging voltage at the time when the fog during actuation reaches the charging portion P2 is −840 V which is the stage 1 in the embodiment 1, whereas the charging voltage is −1060 V which is the stage 2 in the embodiment 2. In the embodiment 2, the charging voltage higher than the charging voltage in the embodiment 1 is applied, and thus a larger electric charge is injected by the fog toner on the photosensitive drum 1, so that the fog toner is strongly attracted to the photosensitive drum 1. As a result, deposition of the fog toner onto the charging roller 2 is further reduced, so that it would be considered that the evaluation of the half-tone image in the case of the "(1-b) after long-term standing" is improved.

Further, the "(2) Evaluation of half-tone image after jam" of (B) in the embodiment 2 was improved more than in the embodiment 1. This would be considered because as a result of the start of the application of the charging voltage to the charging roller 2 earlier than in the embodiment 1, electric charge injection into the transfer residual toner passing through the charging portion P2 is started at an earlier timing than in the embodiment 1. As a result, the amount of the toner deposited on the charging roller 2 becomes smaller than the toner amount in the embodiment 1, so that it would be considered that a degree of the density non-uniformity of the half-tone image after the jam becomes smaller than in the embodiment 1.

Next, the comparison example 2 will be described. In the comparison example 2, as shown in FIG. 15, similarly as in the embodiment 2, the charging voltage is increased to the stage 2 after the start of the rotation of the photosensitive drum 1 and before the fog start point Pa reaches the charging portion P2. That is, a relationship between a switching timing (t4) of the charging voltage to the stage 2 and a timing (t10) when the fog start point Pa reaches the charging portion P2 is as follows.

t4<t10

However, in the comparison example 2, from a state in which the charging voltage is not applied, the application of the charging voltage in the stage 2 is started without applying the charging voltage in the stage 1.

As regards an image evaluation result in the comparison example 2, for all the evaluation items (1-a), (1-b), and (2), the density non-uniformity is a degree in which the density non-uniformity can be visually recognized. This would be considered because a value of the charging voltage at the time of the start of the voltage application is high and therefore there is a period in which a value of the back contrast Vbc is deviated from the proper range (FIG. 2) during execution of the pre-rotation operation. That is, it would be considered because the reverse fog is caused to occur by the excessively large back contrast Vbc and thus the fog toner is deposited on the charging roller 2 in every pre-rotation operation during the durability sheet passing, so that the image evaluation under the condition of the "(I-a) with no standing" becomes low.

As regards the image evaluation in the case of the "(1-b) after long-term standing", although there is a possibility that the fog during actuation due to the toner attenuated in charge amount is suppressed to the same degree as the degree in the embodiment 2, it would be considered that the evaluation result under the condition of the "(1-a) with no standing" becomes poor by the deposition of the fog toner on the charging roller 2 in the last pre-rotation operation during the durability sheet passing. Incidentally, the evaluation of the "(2) Half-tone density non-uniformity after jam" performed after the exchange of the charging roller 2 was equal to the evaluation in the embodiment 2.

Next, the comparison example 3 will be described. The timing (t3) when the application of the charging voltage is started after the start (t2) of the rotation of the photosensitive drum 1 in the comparison example 3 is the same as the timing (t3) in the embodiment 1. However, in the embodiment 2, the photosensitive drum 1 smaller in diameter than the embodiment 1 is used, and the process speed is faster than the process speed in the embodiment 1, and therefore, the fog start point Pa reaches the charging portion P2 (*t*10) before the start of the application of the charging voltage. That is, in the comparison example 3, different from the embodiment 1, a relationship of t10<t3 holds.

From this, in the comparison example 3, the electric discharge is not started at the time when the fog during actuation has reached the charging portion P2, and the fog toner passes through the charging portion P2 while the electric charge thereof is kept low. As a result, the amount of the toner deposited on the charging roller 2 becomes large, so that it would be considered that the density non-uniformity of the half-tone image occurs under the condition of the "(1-b) after long-term standing". Further, in the comparison example 3, the application of the charging voltage to the charging roller 2 is not started at the time when the residual toner image passes through the charging portion P2, so that it would be considered that the residual toner image is deposited on the charging roller 2 and causes the charging non-uniformity and thus the density non-uniformity of the half-tone image after the jam occurs. On the other hand, the image evaluation under the condition of the "(1-a) with no standing" was equal to the image evaluation in the embodiment 1.

Next, the embodiment 3 will be described. In the embodiment 3, as shown in FIG. 17, the rotational speed of the photosensitive drum 1 in the pre-rotation operation is set at a speed slower than the process speed (normal speed), so that the fog start point Pa reaches the charging portion P2 after the start of the application of the charging voltage. That is, in the embodiment 3, similarly as in the embodiment 1, the relationship of t3<t10 holds.

Further, in the embodiment 3, before the fog start point Pa reaches the charging portion P2, the charging voltage is increased to the stage 3 which is the same as the voltage value during the image formation. That is, a relationship between the timing (t5) when the charging voltage is increased to the stage 3 and the timing (t10) when the fog start point Pa reaches the charging portion P2 is as follows.

t5<t10

For this reason, as shown in FIG. 19, in the embodiment 3, it is understood that the electric charge amount of the fog toner after passing through the charging portion P2 is further larger than the electric charge amount in the embodiment 2. In the embodiment 3, under application of the charging voltage higher than the charging voltage in the embodiment 1, a larger electric charge is injected by the fog toner on the photosensitive drum 1, so that the fog toner is strongly attracted to the photosensitive drum 1 more than in the embodiment 1. As a result, the deposition of the fog toner onto the charging roller 2 is further reduced, so that it would be considered that the evaluation of the half-tone image under the condition of the "(1-b) after long-term standing" was good.

Further, in the embodiment 3, before the surface region (Pd) of the photosensitive drum 1 positioned in the transfer portion P5 at the time of the start of the rotation of the photosensitive drum 1 reaches the charging portion P2, the application of the charging voltage is started, and the charging voltage is increased to the stage 2. That is, a relationship between the timing (t4) when the charging voltage is switched to a value of the stage 2 and the timing (t11) when a leading end of the residual toner image reaches the charging portion P2 is as follows.

t4<t11

That is, in the embodiment 3, the application of the charging voltage to the charging roller 2 is started before the leading end of the residual toner image reaches the charging portion P2, with the result that the electric charge is injected into the entirety of the residual toner image passing through the charging portion P2. Further, at this time, the charging voltage applied to the charging roller 2 is increased to at least the stage 2, and therefore, the charge amount of the residual toner image is increased to a larger value than those in the embodiments 1 and 2. For that reason, even when compared with the embodiments 1 and 2, the toner of the residual toner image is made to be harder to be deposited on the charging roller 2. As a result, it would be considered that the evaluation of the "(2) Half-tone image after jam" becomes better than those in the embodiments 1 and 2.

Thus, in the embodiment 3, the charging voltage and the developing voltage are increased stepwise in the pre-rotation operation, so that it is possible to suppress the occurrence of the fog in the stand-by state or under the condition of no long-term standing after the jam occurrence. Further, even after the long-term standing, the charging voltage is increased to a sufficiently high value before the fog during actuation or the residual toner image reaches the charging portion P2, so that the occurrence of the density non-uniformity can be suppressed by effectively suppressing the deposition of the fog toner onto the charging roller 2.

Particularly, in the embodiment 3, in a constitution in which the photosensitive drum 1 with the small diameter and the high process speed are used in combination, the above-described action is achieved by making the rotational speed of the photosensitive drum 1 in the pre-rotation operation low. For this reason, the embodiment 3 is very useful in that the occurrence of the density non-uniformity due to the deposition of the fog toner onto the charging roller 2 is suppressed in the constitution advantageous for the downsizing and the speed-up of the image forming apparatus 100.

OTHER EMBODIMENTS

In the above-described embodiments, the control in the pre-rotation operation or the jam restoration rotation operation before the start of the image forming operation was described. The present invention is not limited to this, and in the case where in the image forming apparatus, rotation of the image bearing member in the rest state is started and the charging voltage and the developing voltage are increased, similar control can be applied.

Further, in the above-described embodiments, a so-called monochromatic image forming apparatus such that the image forming apparatus is provided with only one image bearing member was described. The present invention is not limited thereto, and similar control can be applied to a full-color image forming apparatus in which a plurality of image bearing members are provided and images are formed with a plurality of developers different in toner color. The full-color image forming apparatus may be of an intermediary transfer type in which a single-color toner image formed on each of the plurality of image bearing members is primary-transferred onto an intermediary transfer member and then the resultant color toner images are collectively transferred onto the recording material or a sequential transfer type in which the single-color toner images are sequentially transferred onto the recording material.

In the case of the intermediary transfer type, the "transfer means" refers to, for example, a transfer roller (primary transfer roller) for primary transferring the toner image from the photosensitive drum 1 as the image bearing member onto the intermediary transfer member as a transfer-receiving material. Further, the "transfer portion" refers to a portion where the image bearing member and the intermediary transfer member oppose each other. As the intermediary transfer member, for example, an endless belt member stretched by a plurality of rollers is used. The toner images primary-transferred on the intermediary transfer member are secondary-transferred from the intermediary transfer member onto the recording material by a secondary transfer means such as a secondary transfer roller for forming a secondary transfer nip between itself and the intermediary transfer member. In such a constitution of the intermediary transfer type, an effect similar to those of the above-described embodiments can be obtained by replacing the transfer roller in the above-described embodiments with the primary transfer roller.

With reference to FIG. 1, a general structure of an image forming apparatus according to an embodiment 4 will be described. FIG. 1 is a schematic view showing a cross-sectional constitution of an image forming apparatus 100 according to an embodiment. The image forming apparatus 100 is a monochromatic laser (beam) printer for forming an image on a recording material (recording medium) R on the basis of image information received from an external computer. As the recording material R, it is possible to use paper such as plain paper, thick paper, and the like, a plastic film; a cloth; a surface-treated sheet material such as coated paper; special-shaped sheet materials such as an envelope and index paper; and various sheet materials different in size and material.

The image forming apparatus includes a process cartridge 10 as an image forming unit. The process cartridge 10 includes a photosensitive drum 1 as an image bearing member, a charging roller 2 as a charging member, a developing device 20, and a pre-exposure LED 6 as a pre-exposure device (discharging device). Further, the image forming apparatus 100 includes an exposure unit 3 as an exposure device, a transfer roller 5 as a transfer means, the pre-exposure LED 6 as the pre-exposure device, a fixing device 7 as a fixing means, and a controller 50 as a control means for controlling the image forming apparatus 100.

In the following, in this embodiment, description will be made by using, as a developer, toner 44 of which normal charge polarity is a negative polarity and by employing a reverse development type, but a charge polarity of each of the members is changeable depending on the normal charge polarity of the toner and the development type.

The photosensitive drum 1 is an electrophotographic photosensitive member molded in a cylindrical shape. In a specific example of the photosensitive drum 1, the photosensitive drum 1 includes a drum-like base material molded with aluminum and a photosensitive layer formed on the base material by a negatively-chargeable organic photosensitive member. Further, the photosensitive drum 1 is driven by a driving motor as a driving source mounted in the image forming apparatus 100, so that the photosensitive drum 1 is rotatable in arrow direction (clockwise direction) in FIG. 1.

In this embodiment, the photosensitive drum 1 is 24 mm in diameter and is rotationally driven at a peripheral speed of 139 mm/sec. Further, a distance from a developing portion P4 to a charging portion P2 with respect to a circumferential direction of the photosensitive drum 1 is 54 mm.

The charging roller 2 is a contact charging-type charging member disposed in contact with the photosensitive drum 1 and for forming the charging portion P2 (contact portion between the charging roller 2 and the photosensitive drum 1)

between itself and the photosensitive drum 1. The charging roller 2 in this embodiment is urged by an urging means such as a spring member and thus is press-contacted to the photosensitive drum 1 at a predetermined pressing force. The charging roller 2 generates proximity electric discharge in the charging portion P2 under application of a predetermined charging voltage from a charging power source PW1 which is a voltage generating circuit mounted in the image forming apparatus 100. Incidentally, the "charging roller 2 disposed in contact with the photosensitive drum 1" is not limited to the case where surfaces of the photosensitive drum 1 and the charging roller 2 are in direct contact with each other, but includes the case where these surfaces have a small gap therebetween in which these surfaces are capable of contacting each other through toner 44 carried on one of the photosensitive drum 1 and the charging roller 2.

The exposure unit 3 irradiates the surface of the photosensitive drum 1 with laser light in an exposure portion P3 positioned downstream of the charging portion P2 and upstream of a developing portion P4 (described later) with respect to a rotational direction of the photosensitive drum 1. The exposure unit 3 irradiates the photosensitive drum 1 with the laser light via a polygonal mirror or the like on the basis of an image signal (video signal) transmitted from the controller 50 of the image forming apparatus 100, so that the surface of the photosensitive drum 1 is subjected to scanning exposure. Incidentally, the exposure unit 3 is not limited to a laser scanner device, but may employ, for example, an LED exposure device including an LED array in which a plurality of LEDs are arranged along a longitudinal direction (rotational axis direction, main scan direction).

The developing device 20 includes a developing roller 41 as a developing member or a developer carrying member, a supplying roller 42 as a developer supplying member, a regulating blade 43 as a regulating member, and a developer container 45 as an accommodating portion for accommodating the developer. The developing roller 41 and the supplying roller 42 are rotatably supported by the developing container 45 constituting a frame of the developing device 20. Further, the developing roller 41 is disposed at an opening of the developing container 45 so as to oppose the photosensitive drum 1.

The developing roller 41 is disposed in contact with the photosensitive drum 1 and forms the developing portion P4 (contact portion between the developing roller 41 and the photosensitive drum 1, developing region) between itself and the photosensitive drum 1. Incidentally, the "developing roller 41 disposed in contact with the photosensitive drum 1" is not limited to the case where surfaces of the photosensitive drum 1 and the developing roller 41 are in direct contact with each other, but may include the case where these surfaces have a small gap therebetween in which these surfaces are capable of contacting each other through the toner 44 carried on one of the photosensitive drum 1 and the developing roller 41. The developing roller 41 rotates while carrying the toner 44, and supplies the toner 44 to the developing portion P4. In this embodiment, the developing roller 41 rotates at a rotational speed (peripheral speed) which is 1.4 times the rotational speed (peripheral speed) of the photosensitive drum 1.

The developing device 20 uses the contact development type as a development type. That is, a layer of the toner 44 carried on the developing roller 41 contacts the photosensitive drum 1 in the developing portion P4. To the developing roller 41, a predetermined developing voltage is applied from a developing power source PW2 which is a voltage generating circuit mounted in the image forming apparatus 100. In this embodiment, a DC developing voltage is used.

The developing roller 41 always contacts the photosensitive drum 1 at least during a period of an image forming operation, and a pre-rotation operation and a post-rotation operation which are prior to and subsequent to the image forming operation, respectively, in a state in which the process cartridge 10 is mounted in the image forming apparatus 100. A constitution in which the image forming apparatus 100 is not provided with a contact and separation mechanism for moving the developing roller 41 toward and away from the photosensitive drum 1 may be employed.

The supplying roller 42 is disposed in contact with the developing roller 41 and is rotated in a direction (direction in which peripheral surface movement directions of these rollers are opposite to each other in an opposing portion therebetween) against rotation of the developing roller 41.

Incidentally, when a constitution in which the toner can be sufficiently supplied to the developing roller 41 is employed, the supplying roller 42 is not necessarily needed.

Further, in this embodiment, the toner 44 is 6 μm in average particle size and has a negative polarity as a normal charge polarity. As the toner 44, for example, a polymerization toner formed by a polymerization method is used. The toner 44 is a so-called non-magnetic one-component developer which does not contain a magnetic component and which is carried on the developing roller 41 principally by an intermolecular force or an electrostatic force (mirror (image) force). However, instead of the toner 44, a one-component developer containing the magnetic component may be used. Further, the one-component developer contains, in addition to toner particles, an additive (for example, a wax or silica fine particles) for adjusting flowability or chargeability of the toner in some cases. Further, as the developer, a two-component developer constituted by non-magnetic toner and a magnetic carrier may be used. In the case where the magnetic developer is used, as the developing member (developer carrying member), for example, a cylindrical developing sleeve in which a magnet is provided is used.

The regulating blade 43 is an elastic member and is disposed in contact with the developing roller 41 in a state in which the regulating blade 43 is flexed against a reaction force received from the developing roller 41. The regulating blade 43 not only regulates a layer thickness of the toner 44 carried on the developing roller 41 but also triboelectrically charges the toner 44 by friction with the toner 44 passing through a space between the regulating blade 43 and the developing roller 41.

Inside the developing container 45, a stirring member 45*a* as a stirring means is provided. The stirring member 45*a* is driven by a driving motor and is rotated in interrelation with rotation of the developing roller 41, so that the stirring member 45*a* not only stirs the toner 44 in the developing container 45 but also sends the toner 44 toward the developing roller 41 and the supplying roller 42. Incidentally, the stirring member 45*a* is not limited to a rotating form. For example, a stirring member in a swingable form may be employed.

The transfer roller 5 is disposed opposed to the photosensitive drum 1 in a transfer portion P5 (transfer position) positioned downstream of the developing portion P4 and upstream of a pre-exposure portion P6 (described later) with respect to the rotational direction of the photosensitive drum 1. As a nip between the transfer roller 5 and the photosensitive drum 1, a transfer nip where the toner image is transferred from the image bearing member onto the recording material R (hereinafter, this transfer nip is also referred to as the transfer portion P5) is formed. To the transfer roller 5, a predetermined transfer voltage (transfer bias) is applied from a transfer power source, which is a voltage generating circuit mounted in the image forming apparatus 100.

Incidentally, instead of the constitution in which the transfer voltage is applied to the transfer roller 5 (transfer member), an electric field for transferring the toner image in the transfer portion may be formed by another voltage applying means. For example, the transfer roller 5 is connected to a ground potential, and by the voltage applied to the photosensitive drum 1 by the charging roller 2, to which the voltage of the same polarity as the normal charge polarity of the toner 44 is applied, such an electric field is formed in the transfer portion.

The pre-exposure LED 6 is disposed opposed to the photosensitive drum 1 in the pre-exposure portion P6 positioned downstream of the transfer portion P5 and upstream of the charging portion P2 with respect to the rotational direction of the photosensitive drum 1. The pre-exposure LED 6 irradiates, with light, a region of the surface of the photosensitive drum 1 that has passed through the transfer portion P5.

The fixing device 7 has a constitution of a heat fixing type in which image fixing is performed by heating and melting the toner on the recording material R. The fixing device 7 includes, for example, a cylindrical fixing film having flexibility, a heater such as a ceramic heater for heating the fixing film, a thermistor for measuring a temperature of the heater, and a pressing roller press-contacted to the heater via the fixing film. The controller 50 of the image forming apparatus 100 controls energization to the heater on the basis of a detecting signal of the thermistor. The fixing device 7 is not limited thereto, but for example, a roller pair may be used as a rotatable member pair rotating while nipping the recording material, and a halogen lamp or an induction heating mechanism may be used instead of the ceramic heater as a heating means.

The controller 50 includes at least one processor and a non-transient storing medium readable by a computer in which a program for controlling an operation of the image forming apparatus 100 is stored. The controller 50 includes, for example, a non-volatile memory in which the program is stored, a CPU for executing the program by reading the program from the memory, and a volatile memory which is a working place during execution of the program. Further, the controller 50 includes a driving circuit for driving an actuator (driving motor or the like) for the image forming apparatus 100, and a network interface or the like for connecting the controller 50 to the external computer. The CPU is connected to another element of the controller 50 via a bus, and realizes an operation such as an image forming operation by the image forming apparatus 100 by providing an instruction to the driving circuit or the like in accordance with the program.

(Image Forming Operation)

Next, the image forming operation of the image forming apparatus 100 will be described. When an instruction (print job) of image formation is inputted to the image forming apparatus 100, an image forming process is started in the process cartridge 1B on the basis of image information inputted from the external computer connected to the image forming apparatus 100 or from a reading device.

First, the charging roller 2 uniformly charges the surface of the rotating photosensitive drum 1 to the same polarity (negative polarity in this embodiment) as the normal charge polarity in the charging portion P2. The exposure unit 3 irradiates the exposing portion P3 of the photosensitive drum 1 with the laser light modulated depending on an image signal generated on the basis of the inputted image information. By this, the electrostatic latent image is formed on the photosensitive drum 1. When the electrostatic latent image reaches the developing portion P4, the toner 44 supplied from the developing roller 41 is deposited on the photosensitive drum 1 depending on a potential distribution on the photosensitive drum 1, so that the electrostatic latent image is developed (visualized) as the toner image.

In parallel to preparation of the toner image on the photosensitive drum 1, recording materials R are supplied one by one from a stacking portion of the recording materials R provided at a lower portion of the image forming apparatus 100. The recording material R is conveyed to the transfer portion P5 so that a timing when a leading end of the toner image is caused to reach the transfer portion P5 by an unshown registration roller pair and a timing when a leading end of the recording material R enters the transfer portion P5 become substantially the same. Then, in the transfer portion P5, by the transfer roller 5 to which the transfer voltage is applied, the toner image carried on the photosensitive drum 1 is transferred onto the recording material R.

The recording material R passed through the transfer portion P5 is conveyed to the fixing device 7. The fixing device 7 heats and presses the toner image on the recording material R by the fixing film heated by the heater while nipping and feeding the recording material R in the nip (fixing nip) between the fixing film and the pressing roller. By this, the toner particles are melted and then fixed, so that the toner image is fixed on the recording material R. The recording material R passed through the fixing device 7 is discharged to an outside of the image forming apparatus 100 by a discharging roller pair as a discharging means, so that the recording material R is stacked on a discharge tray as a stacking portion formed at an upper portion of a printer main assembly.

Incidentally, when a surface region of the photosensitive drum 1 passed through the transfer portion P5 reaches the pre-exposure portion P6, the electrostatic latent image on the photosensitive drum 1 is erased by light emitted from the pre-exposure device 6. By this, the surface region is in a state in which the surface region is usable again in the image forming process.

(Cleaner-Less Type)

Next, a cleaner-less type employed in this embodiment will be described. The cleaner-less type is a type such that the developer remaining on the image bearing member without being transferred from the image bearing member onto a transfer-receiving material (the recording material or the intermediary transfer member) in the transfer portion P5 is collected and re-utilized by the developing member without being collected by the cleaning device. In this embodiment, transfer residual toner deposited on the photosensitive drum 1 even passed through the transfer portion P5 is collected into the developing device 20 by the developing roller 41 when the transfer residual toner reaches the developing portion P4 via the pre-exposure portion P6, the charging portion P2, and the exposure portion P3.

During execution of the image forming operation, the transfer residual toner is removed in the following step in general. The transfer residual toner includes toner charged to a positive polarity opposite to the normal charge polarity of the toner and toner which is charged to a negative polarity but which does not have a sufficient electric charge in mixture. Therefore, the transfer residual toner is charged to the negative polarity again by removing the electric charges from the photosensitive drum 1 after the transfer by the pre-exposure device 6 and then by causing the uniform electric discharge by the charging roller 2. The transfer residual toner charged to the negative polarity again in the charging portion P2 reaches the developing portion P4 with rotation of the photosensitive drum 1. Then, the surface region passed through the charging portion P2 is exposed to light by the exposure unit 3 while the transfer residual toner is deposited on the surface of the photosensitive drum 1, so that the electrostatic latent image is formed (written) on the surface region of the photosensitive drum 1.

Here, behavior of the transfer residual toner that has reached the developing portion P4 will be described by dividing the surface region of the photosensitive drum 1 into an exposure region (light-portion region) and a non-exposure region (dark-portion region). The transfer residual toner deposited on the non-exposure region of the photosensitive drum 1 is transferred onto the developing roller 41 by a potential difference between a potential (dark-portion potential) of the non-exposure region of the photosensitive drum 1 and the developing voltage, and then is collected into the developing container 45.

This is because in the case where the normal charge polarity of the toner 44 is the negative polarity, the developing voltage applied to the developing roller 41 is set so as to have the positive polarity relative to the polarity of the potential of the non-exposure region. Incidentally, the toner collected in the developing container 45 is stirred with the toner in the developing container 45 by the stirring member **45*a* and is uniformized by the stirring member 45*a*, and then is carried on the developing roller 41**, so that the toner is used again in the developing step.

On the other hand, the transfer residual toner deposited on the exposure region of the photosensitive drum 1 remains on the drum surface without being transferred from the photosensitive drum 1 onto the developing roller 41. This is because in the case where the normal charge polarity of the toner 44 is the negative polarity, the developing voltage applied to the developing roller 41 becomes a potential higher in absolute value on the negative polarity side than the potential (light-portion potential) of the exposure region. That is, in the case where the surface region of the photosensitive drum 1 on which the transfer residual toner is deposited becomes the exposure region in the exposure portion P3, the transfer residual toner constitutes a new toner image in a cooperation with another toner transferred from the developing roller 41 onto the exposure region, and the toner image is transferred onto the recording material R in the transfer portion P5.

By employing such a cleaner-less type, an installation space for the cleaning member and the collecting container which are used for collecting the transfer residual toner or the like is not needed, so that the image forming apparatus 100 can be further downsized. Further, the transfer residual toner is utilized again for subsequent image formation and later image formation, so that it is also possible to realize reduction (suppression of toner consumption) in operational cost of the image forming apparatus 100.

(1. Voltage Setting During Image Formation)

Next, a potential difference between the photosensitive drum 1 and its peripheral member during execution of the image forming operation in an embodiment (embodiment 1) will be described.

During the image forming operation, the charging voltage of −1240 V is applied to the charging roller 2, so that the surface of the photosensitive drum 1 is charged to a uniform charge potential Vd (dark-portion potential: −740 V) by electric discharge in the charging portion P2. On the surface of the photosensitive drum 1 charged to the charging potential Vd, the exposure region exposed to light by the exposure unit 3 has a potential which changes to a post-exposure potential V1 (light-portion potential: −50 V). In this embodiment, an exposure amount E0 for forming V1 was 0.35 $\mu J/cm^2$. To the developing roller 41, a developing voltage Vdc (developing potential: −380 V) is applied. Incidentally, the exposure region (image forming region) and the non-exposure region (non-image forming region) are formed within an image formable region on the surface of the photosensitive drum 1. The image formable region is a region, with respect to a main scan direction, in which the toner 44 can be supplied from the developing roller 41 to the surface of the photosensitive drum 1. The image formable region can be said to be a region in which the toner 44 can be carried on the surface of the developing roller 41.

By the above-described constitution, a developing contrast Vcont which is a potential difference between the light-portion potential and the developing voltage Vdc on the photosensitive drum 1 is 330 V, and a back contrast Vbc which is a potential difference between the dark-portion potential and the developing voltage Vdc on the photosensitive drum 1 is 360 V. By such a potential setting, it becomes possible to appropriately output images such as a solid black image, a half-tone image, and a solid-white character (letter).

Here, the developing contrast Vcont and the back contrast Vbc are defined by the surface potential of the photosensitive drum 1 in the developing portion P4 and the developing voltage Vdc applied to the developing roller 41. If the image forming operation is performed without making a proper potential setting, an image defect occurs on the recording material R. Specifically, when the developing contrast Vcont is excessively small, the toner amount of the toner deposited on the exposure region (image forming region) of the photosensitive drum 1 becomes small, so that there is a possibility that an image defect (poor image density) such that an image density becomes thin (poor) occurs. Further, when the developing contrast Vcont is excessively large, the toner amount of the toner deposited on the exposure region (image forming region) of the photosensitive drum 1 becomes large, so that there is a possibility that improper transfer such that the toner is not sufficiently melted in the fixing step and thus fixing of the toner (image) on the recording material R becomes insufficient occurs. For that reason, there is a need that the developing contrast Vcont is appropriately adjusted in view of these phenomena.

Further, the voltages in this embodiment are expressed as a potential difference between an associated one of the voltages and a ground (earth) potential (0 V). Accordingly, the developing voltage Vdc=−380 V means that the potential difference between the developing voltage, applied to the core metal of the developing roller 41, and the ground potential is −380 V. This is true for the charging voltage and the like.

(2. Back Contrast and Fog)

Next, the reason why the back contrast Vbc is controlled will be described. By appropriately controlling the back contrast Vbc, it is possible to suppress excessive toner deposited on the non-image forming region (white background portion) which is the surface region of the photosensitive drum 1 where the image is not formed. This excessive toner is referred to as fog toner, and a phenomenon such that the fog toner occurs is referred to as fog.

When the fog occurs, the toner is deposited on the non-image forming region of the photosensitive drum 1 and is transferred onto the recording material R, so that a color tint is caused in a region (white background region) where the image is not originally formed on the recording material R, and therefore, there is a possibility that a quality of a resultant product desired by a user cannot be obtained.

In the case where the back contrast Vbc is excessively small, an electric field for retaining, on the developing roller 41, the toner 44 charged to the negative polarity which is the normal charge polarity in this embodiment is weakened, so that such toner 44 is liable to be deposited as the fog toner on the photosensitive drum 1 in the non-image forming region. On the other hand, if the back contrast Vbc is excessively large, the fog such that the toner 44 on the developing between 41 charged to the positive polarity which is the opposite polarity to the normal charge polarity is deposited on the photosensitive drum 1 in the non-image forming region is liable to occur.

The fog such that the toner 44 charged to the normal charge polarity is deposited on the non-image forming region of the photosensitive drum 1 is referred to as normal fog. Further, the fog such that the toner 44 charged to the opposite polarity to the normal charge polarity is deposited on the non-image forming region of the photosensitive drum 1 is referred to as reverse fog. Accordingly, in order to suppress the normal fog and the reverse fog at the same time, the back contrast Vbc may only be required to be set at a proper range.

Further, in the cleaner-less constitution, in order to efficiently collect the fog toner and the transfer residual toner in the developing portion P4, it is required that a sufficient back contrast Vbc be set. This is because most of the fog toner and the transfer residual toner is charged to the normal charge polarity. When the fog toner and the transfer residual toner which are more charged to the negative polarity have reached the developing portion P4 in a state in which these toners were deposited in the non-image forming region (dark-portion potential), in order to transfer (clean) these toners from the photosensitive drum 1 onto the developing roller 41 by the electric field, it is required that the back contrast Vbc be at a certain level or more. In the case where the collection of the toner in the developing portion P4 is not sufficiently performed, there is a possibility that the fog toner passes through the developing portion P4 while being deposited on the photosensitive drum 1 and results in the image defect (white background contamination) in the transfer portion P5 by being transferred onto the recording material R.

Further, it is known that a one-dot density and a line width change depending on settings of the back contrast Vbc and the developing contrast Vcont. Therefore, while setting the back contrast Vbc suitable for suppressing the fog, the developing contrast suitable for the one-dot density and the line width is set. In order to satisfy this condition, output voltages of the charging power source PW1 and the developing power source PW2 and exposure intensity of the exposure unit 3 are set.

Figure 21:
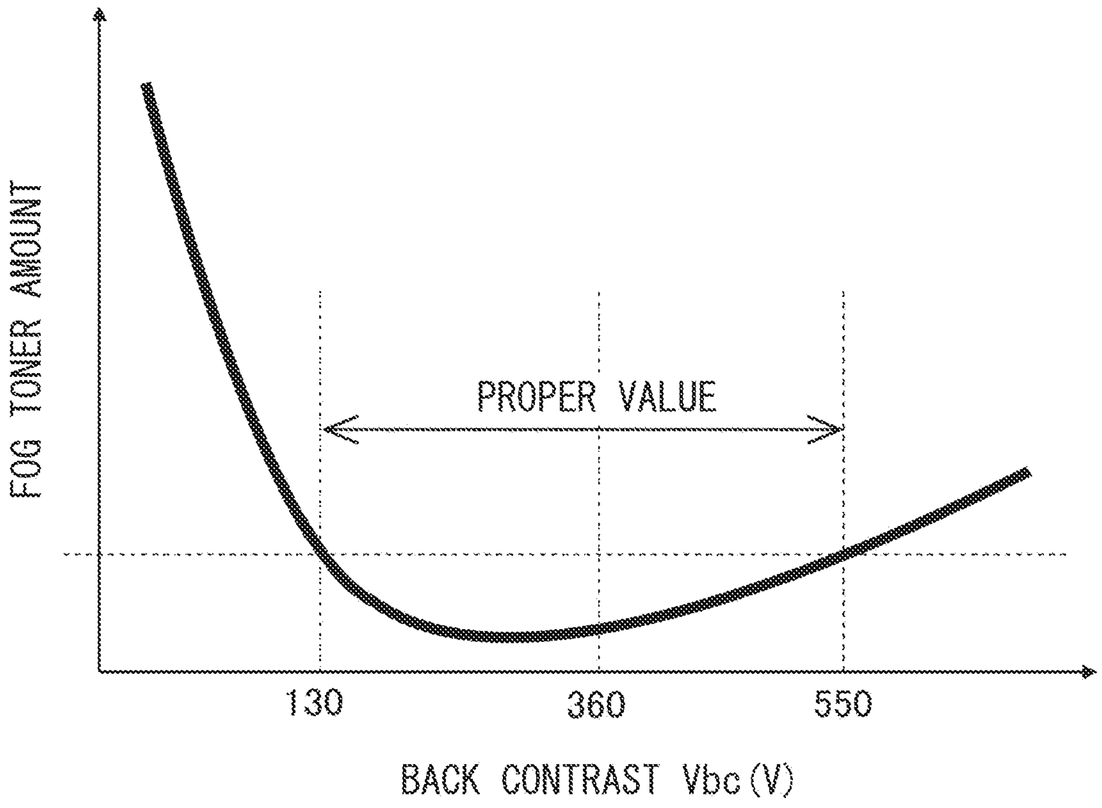
FIG. 21 is a graph showing a relationship between a back contrast and a fog toner amount in an embodiment 4.

In FIG. 21, a relationship between the back contrast Vbc and the fog toner amount is shown. In FIG. 21, the abscissa represents the back contrast Vbc, and the ordinate represents the fog toner amount. The fog toner amount was measured in a manner such that the toner on the photosensitive drum 1 was removed by Mylar tape and the Mylar tape was applied onto reference paper, and density thereof was measured using a reflection densitometer ("TC-6DS/A", manufactured by Tokyo Denshoku, Co., Ltd.). A calculating method of the fog toner amount is as follows. The image forming operation was performed using the image forming apparatus 100. The calculation was made from the toner amount of the toner deposited on the photosensitive drum 1 in the surface region passed through the developing portion P4 when the developing step was executed by changing the back contrast Vbc without using the recording material R.

The fog toner is not visually observed when the fog toner amount is not more than a certain value, and therefore, there is no problem in terms of an image quality. However, when the fog toner amount increases, the fog toner can be visually observed and results in the image defect. A range which is below a threshold which the fog toner can be visually recognized is a range of a proper value of the back contrast Vbc.

In the embodiment 4, employing the cleaner-less type, as described above, it is desired that suppression of the charging non-uniformity due to the deposition of the fog toner on the charging roller 2 and suppression of improper collection of the fog toner in the developing portion P4 are realized by controlling the back contrast Vbc so as to fall within the proper range.

In this embodiment, as shown in FIG. 21, when the back contrast Vbc is set at a range of 130 V or more and 550 V or less, the fog toner amount is in a state in which the fog toner cannot be visually recognized and toner consumption during non-image formation is suppressed, and therefore, such setting is preferable. However, the back contrast Vbc is represented as a positive (+) value when the potential difference results in the polarity of the potential on the photosensitive drum 1 side being the negative polarity. In this embodiment, the back contrast Vbc is set at 360 V which is a value within the above-described range, whereby the fog during the image formation cannot be visually recognized and the toner consumption during the non-image formation is suppressed.

(3. Operation Steps of Image Forming Apparatus)

Figure 22:
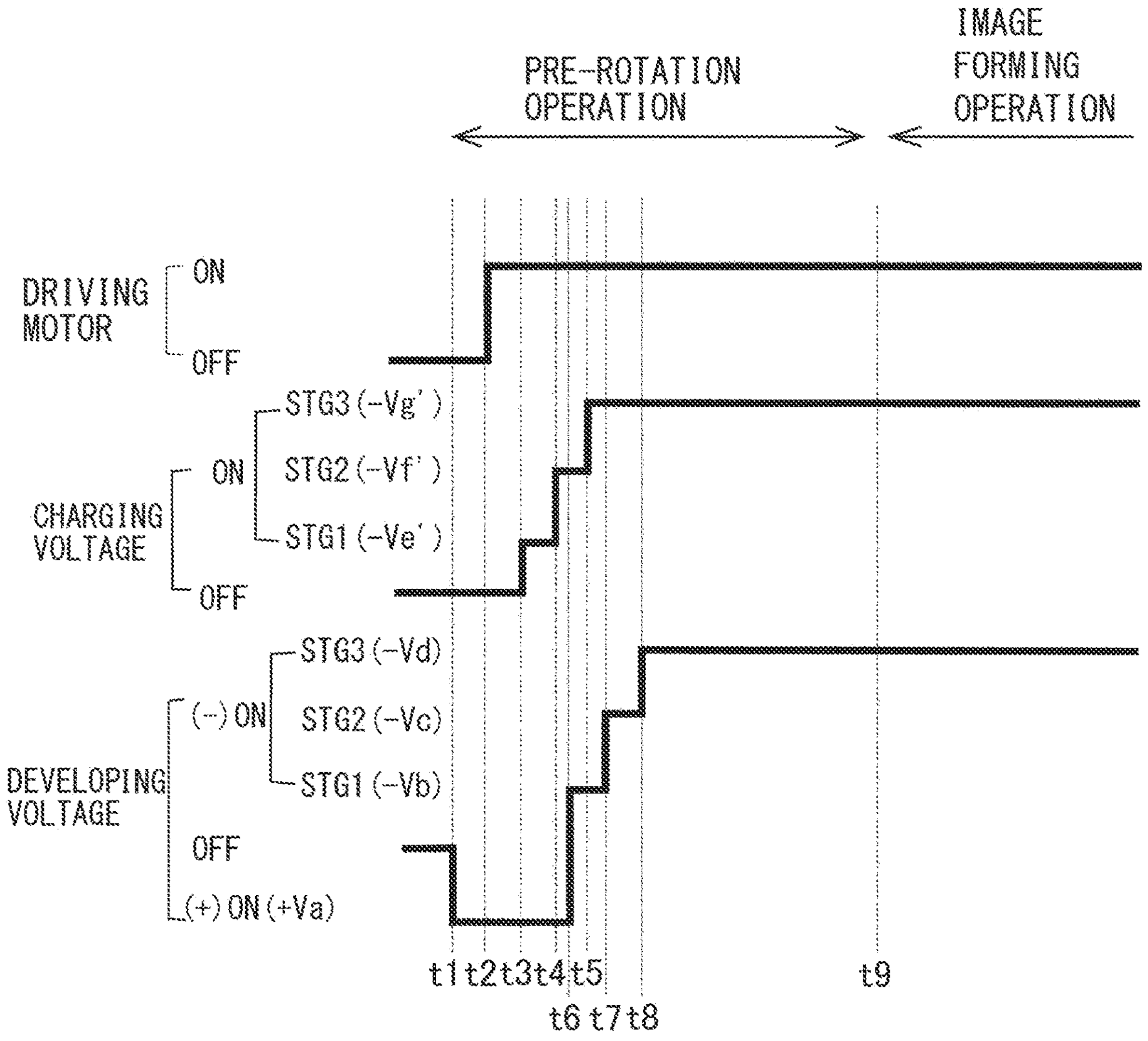
FIG. 22 is a timing chart of a pre-rotation operation in the embodiment 4.

Subsequently, an operation of the image forming apparatus 100 including steps before and after the image forming operation will be described. FIG. 22 is an operation step diagram of the image forming apparatus 100 from a stand-by state before a start of the image forming operation to an end of jam restoration in the case where a jam occurs during execution of the image forming operation.

(4. Rise Control in Pre-Rotation Operation)

Figure 23:
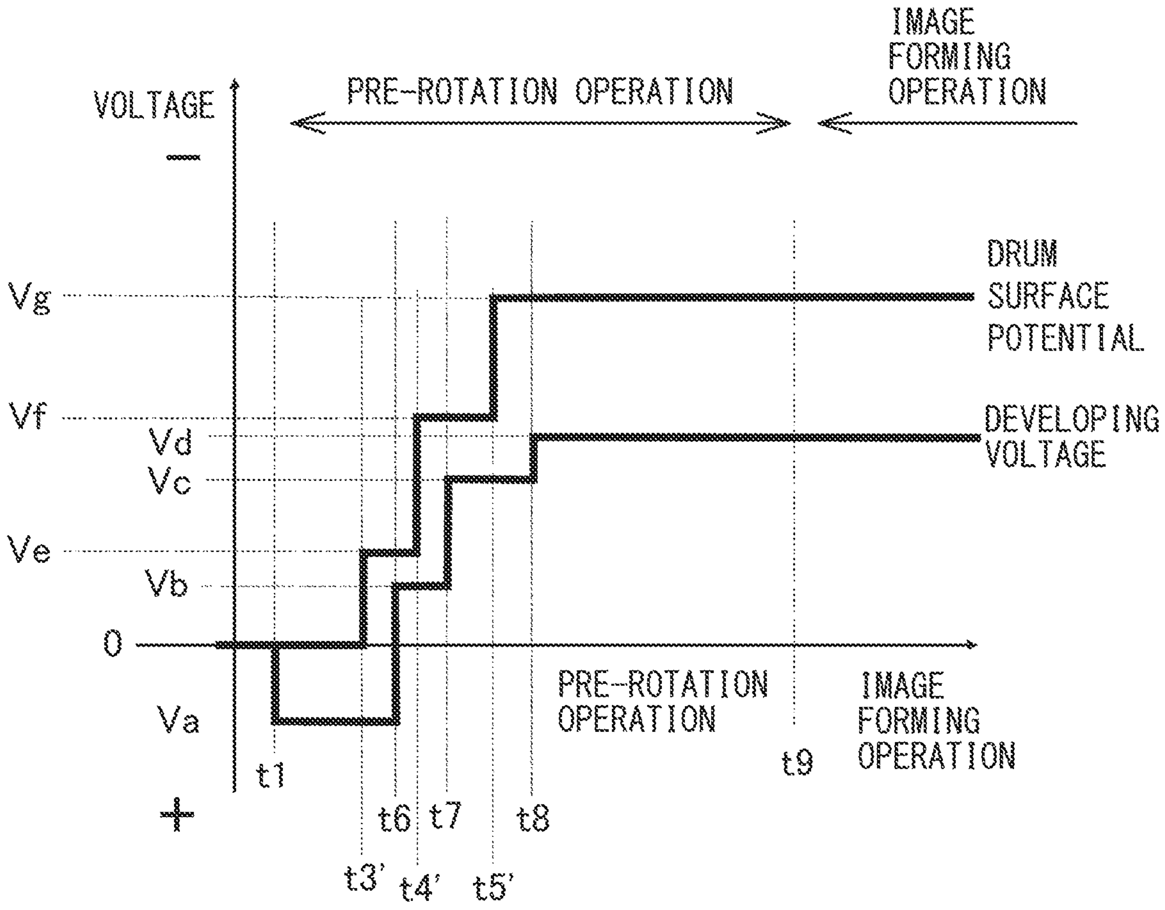
FIG. 23 is a schematic view showing progression of a photosensitive drum surface potential and a developing voltage in a developing portion during the pre-rotation operation in the embodiment 4.

Using FIGS. 22 and 23, the pre-rotation operation and the rise control of the charging voltage and the developing voltage performed in the pre-rotation operation in the embodiment 4 will be specifically described. FIG. 22 is a timing chart of the driving motor, the charging voltage, and the developing voltage in the pre-rotation operation. FIG. 23 is progression of the surface potential of the photosensitive drum 1 in the developing portion P4 and the developing voltage in the pre-rotation operation. Incidentally, between FIG. 22 and FIG. 23, correspondingly to a required time for movement of a point on the photosensitive drum 1 from the charging portion P2 to the developing portion P4, a waveform of the surface potential of the photosensitive drum 1 in FIG. 23 is delayed (shifted rightward in the figure) from a waveform of the charging voltage in FIG. 22.

In the following, the developing voltage and the surface potential of the photosensitive drum 1 are represented by adding a sign indicating the polarity of the voltage (potential) to each of variables (Va to Vg) showing absolute values of the voltages (potentials).

When the image formation start signal S is inputted at a time (point of time) t1 shown in FIGS. 22 and 23, the controller 50 causes the developing power source PW2 to start application of the developing voltage of the positive polarity to the developing roller 41. At this time, the surface potential of the photosensitive drum 1 is substantially 0 V, and therefore, in the developing portion P4, the back contrast Vbc(=+Va) which is the same value as the value of the developing voltage is formed. For this reason, as regards the developing voltage +Va of the positive polarity, the back contrast Vbc is set at a value falling within a proper range (see FIG. 21) relative to the surface potential of 0 V. In this embodiment, the developing voltage (+Va) of the positive polarity used in an initial stage of the pre-rotation operation was set at +150 V.

Thereafter, at a time t2, the controller 50 causes the driving motor to start rotation ("ON"). When the driving motor is turned on, both the photosensitive drum 1 and the developing roller 41 start rotation thereof.

Subsequently, as shown in FIG. 22, at a time t3, the controller 50 causes the charging power source PW1 to start application of the charging voltage to the charging roller 2. The charging voltage applied at this time is a value (−Ve') set so that the surface potential of the photosensitive drum 1 becomes −Ve. Thereafter, at a time t4, the controller 50 switches the voltage applied to the charging roller 2 by the charging power source PW1 from a value (stage (level) 1, −Ve') at which the surface potential of the photosensitive drum 1 is −Ve to a value (stage 2, −Vf') at which the surface potential of the photosensitive drum 1 becomes −Vf higher than −Ve. Further, at a time t5, the controller switches the voltage applied to the charging roller 2 by the charging power source PW1 from a value (stage 2, −Vf) at which the surface potential of the photosensitive drum 1 is −Vf to a value (stage 3, −Vg') at which the surface potential of the photosensitive drum 1 becomes −Vg higher than −Vf. The charging voltage (corresponding to the surface potential −Vg of the photosensitive drum 1) in a final stage (stage 3) in the rise control is equal to the charging voltage in the image forming operation.

Figure 24:
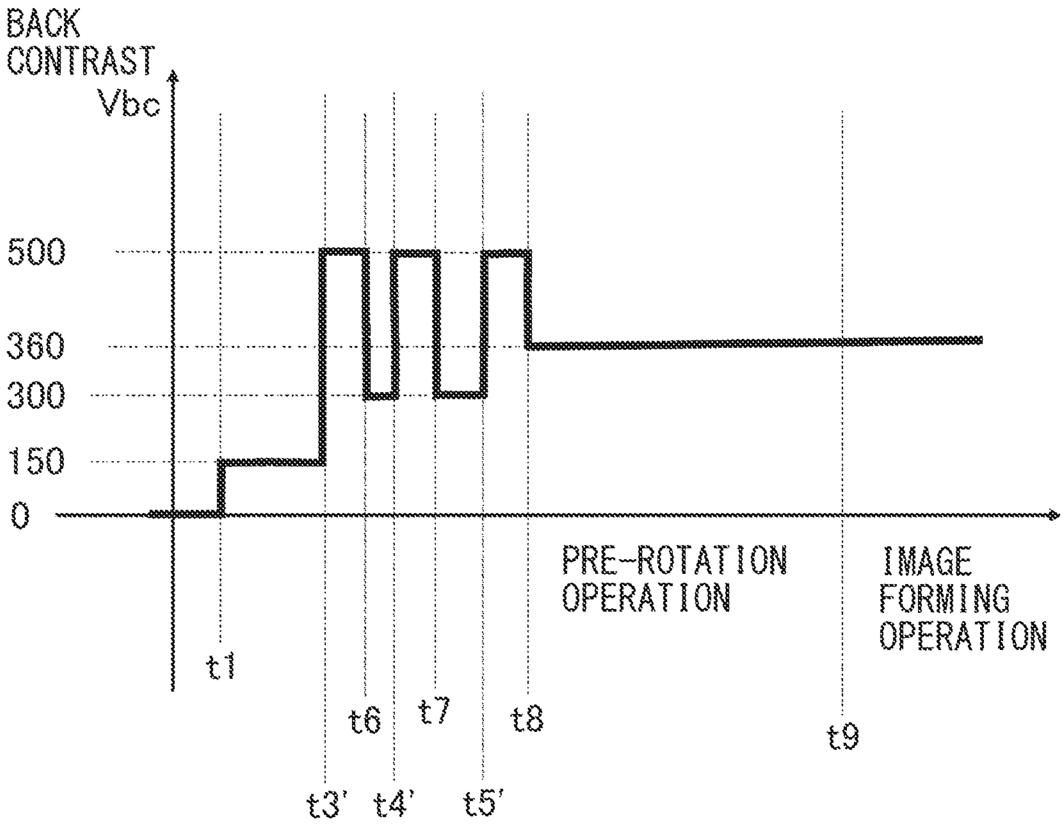
FIG. 24 is a schematic view showing progression of a back contrast during the pre-rotation operation in the embodiment 4.

In parallel to such stepwise rise of the charging voltage, as shown in FIG. 24, the controller 50 increases the developing voltage stepwise. That is, at a time t6 subsequent to a time t3' at which the surface region of the photosensitive drum 1 charged to the surface potential −Ve by the charging voltage in the stage 1 reaches the developing portion P4, the controller 50 switches the developing voltage from a voltage +Va of the positive polarity to a voltage −Vb (stage 1) of the negative polarity. Further, at a time 7 subsequent to a time t4' at which the surface region of the photosensitive drum 1 charged to the surface potential −Vf by the charging voltage in the stage 2 reaches the developing portion P4, the controller 50 switches the developing voltage from the voltage −Vb of the negative polarity to a voltage −Vc (stage 2) which is of the negative polarity and which is higher than the voltage −Vb. Further, at a time t8 subsequent to a time t5' at which the surface region of the photosensitive drum 1 charged to the surface potential −Vg by the charging voltage in the stage 3 reaches the developing portion P4, the controller 50 switches the developing voltage from the voltage −Vc of the negative polarity to a voltage −Vd (stage 3) which is of the negative polarity and which is higher than the voltage −Vc. The developing voltage (−Vd) in the final stage (stage 3) in the rise control is equal to the developing voltage in the image forming operation.

When pre-heating in the fixing device 7 is completed at a time t9, the controller 50 discriminates that the pre-rotation operation is completed, and the operation goes to the image forming operation.

Here, timings (t6, t7, t8) when the developing voltages are switched from Va to Vb, Vb to Vc, and Vc to Vd, respectively, are set so that the surface potential of the photosensitive drum 1 in the developing portion P4 is increased to and stabilized at Ve, Vf, and Vg, respectively. Similarly, timings (t3, t4, t5) when the charging voltages are switched from 0 V to Ve', Ve' to Vf, and Vf to Vg', respectively, are set so that the surface potentials of the photosensitive drum 1 in the developing portion P4 are switched to Ve, Vf, and Vg, respectively after the developing voltage is switched to an associated stage and the resultant voltage value is stabilized. Specifically, in response to a voltage value switching instruction, the timings are set in consideration of rise characteristics (response times) of the charging power source PW1 and the developing power source PW2, a required time for moving a point of the surface of the photosensitive drum 1 from the charging portion P2 to the developing portion P4, and the like.

Incidentally, in this embodiment, three-stage control such that the charging voltage and the developing voltage are increased to voltage values (stage 3) which are the same as the voltage values during the image formation through two intermediary values (stages 1 and 2) is carried out, but the number of the stages may be less than three or larger than three, further, the charging voltage and the developing voltage in the final stage in the rise control during the pre-rotation operation may be different from the voltage values in the image forming operation. For example, in the rise control, the charging voltage and/or the developing voltage may be increased to a voltage value lower (in absolute value) than the voltage value for the image formation and then may be increased to the voltage value for the image formation in the case where the image forming operation is started. Further, the charging voltage and/or the developing voltage may be increased to a voltage value higher (in absolute value) than the voltage value for the image formation and then may be lowered to the voltage value for the image formation in the case where the image forming operation is started.

Using FIG. 24, a change in back contrast Vbc during execution of the pre-rotation operation in this embodiment will be described.

When an image formation start signal S is inputted at the time (t1), output of the developing voltage (Va) of the positive polarity is started. At this time, Vbc becomes 150 V. Then, Vbc changes to 500 V at the time t3' when the surface region of the photosensitive drum 1 charged to the surface potential Ve by the start of the application of the charging voltage. Thereafter, when the developing voltage is changed from the voltage value of the positive polarity to the voltage value (Vb) of the negative polarity at the time t6, Vbc becomes 300 V. Thereafter, at the time t4' when the surface region of the photosensitive drum 1 charged to the surface potential of Vf by the charging voltage in the stage 2 reaches the developing portion P4, Vbc becomes 500 V. Then, when the developing voltage is switched to the voltage value (Vc) in the stage 2 at the time t7, Vbc becomes 300 V. Thereafter, at the time t5' when the surface region of the photosensitive drum 1 charged to the surface potential of Vg by the charging voltage in the stage 3 reaches the developing portion P4, Vbc becomes 500 V. Thereafter, when the developing voltage is switched to the voltage value (Vd) in the stage 3 at the time t8. Vbc becomes 360 V. At the time t8 and later, Vbc (360 V) is equal to Vbc during the image formation.

Thus, the charging voltage and the developing voltage are switched stepwise so that the back contrast Vbc which is a difference between the surface potential of the photosensitive drum 1 and the developing voltage falls within a certain range, and an increase in one voltage or potential is waited and then an increase in the other voltage or potential is made. This operation is repeated.

In each of stages of rise control of the charging voltage and the developing voltage, the charging voltage and the developing voltage are set so that the surface potentials (Ve to Vg) of the photosensitive drum 1 charged by the charging voltage have the negative polarity relative to the developing voltages (Vb to Vd). For this reason, as shown in FIG. 23, at each of points of time from the time t1 when the application of the developing voltage (Va) of the positive polarity is started before the start of the rotation of the photosensitive drum 1 to the time t9 when the pre-rotation operation is completed, in the developing portion P4, the back contrast V be in which the voltage on the photosensitive drum 1 side has the negative polarity is formed. That is, in the developing portion P4, the polarity on the photosensitive drum 1 side is the same as the normal charge polarity of the toner 44 and the polarity on the developing roller 41 side becomes the polarity opposite to the normal charge polarity, so that an electric field for electrostatically retaining the normally charged toner 44 on the developing roller 41 is continuously formed.

Further, it is desirable that values (Va to Vd, Ve' to Vg') of the charging voltage and the developing voltage in each of the stages of the rise control fall within a proper range shown in FIG. 21 in a process in which the charging voltage an the developing voltage are increased stepwise. In other words, in the period of the pre-rotation operation (preparatory operation before the image forming operation), the controller 50 controls the charging voltage and the developing voltage so that the surface potential of the image bearing member in the developing portion relative to the developing voltage has the same polarity as the normal charge polarity of the toner and so that the potential difference between the developing voltage and the surface potential of the image bearing member is maintained in the predetermined range.

By this, the occurrence of the fog due to the electrostatic deposition of the toner particles charged to the negative polarity on the developing roller 41, on the photosensitive drum 1 during the pre-rotation operation can be suppressed. Further, toner consumption due to the occurrence of the fog during the pre-rotation operation can be suppressed.

In the embodiment 4, in the pre-rotation operation, the charging voltage and the developing voltage are controlled so that a back contrast Vbc larger than the back contrast Vbc (360 V) during the image formation and a back contrast Vbc smaller than the back contrast during the image formation appear alternately (FIG. 24).

(5. State of Apparatus During Pre-Rotation Operation)

In the following, using FIGS. 25 to 28, control of the back contrast Vbc in the pre-rotation operation in this embodiment will be described. FIG. is a timing chart of the driving motor and the back contrast Vbc in the pre-rotation operation, in which a period (t2 to t10) in which a fog start point Pa on the photosensitive drum 1 moves from the developing portion P4 and reaches again the developing portion P4 after one full turn of the photosensitive drum 1 are shown. FIGS. 26 to 28 are schematic views each showing a state of the image forming apparatus 100 at an associated time of the pre-rotation operation.

The “fog start point Pa” is a start end of a range on the photosensitive drum 1 in which fog during actuation described in the following occurs. Further, a “fog end point Pb” is a terminal end of the range on the photosensitive drum 1 in which the fog during actuation occurs.

Part (a) of FIG. 26 shows the state of the image forming apparatus 100 at a point of time (FIG. 25) when the rotation of the driving motor is started at the time t2. At this time, in the developing portion P4, the toner 44 carried on the developing roller 41 contacts the photosensitive drum 1. When the toner 44 on the developing roller 41 is sufficiently charged to the negative polarity, by the above-described control of the back contrast Vbc, the occurrence of the fog during actuation due to the electrostatic deposition of the toner on the photosensitive drum 1 during the pre-rotation operation is suppressed.

However, in the case where the stand-by state continues for a long time before the pre-rotation operation, the charge amount of the toner 44 on the developing roller 41 attenuates and becomes a low value. In this case, even when the back contrast Vbc is formed in advance at the time (t2) of actuation of the driving motor, the charge amount of the toner 44 is low, and therefore, the toner 44 cannot be electrostatically retained on the developing roller 41, so that a part of the toner 44 is non-electrostatically deposited on the photosensitive drum 1. Thus, when the rotation of the photosensitive drum 1 is started in a state in which the image forming operation is not performed for a long term, the toner 44 low in charge amount is non-electrostatically deposited on the photosensitive drum 1 in the developing portion P4, whereby the fog during actuation (fog during actuation after long-term standing) occurs.

As shown in part (a) of FIG. 26, the fog during actuation occurs from a portion, of the surface of the photosensitive drum 1, where the photosensitive drum surface contacts the toner 44 on the developing roller 41 at the time t2 when the rotation of the driving motor is started. That is, the fog start point is the surface region of the photosensitive drum 1 positioned in the developing portion P4 at the time (t2) of the start of the rotation of the photosensitive drum 1.

On the other hand, as shown in part (b) of FIG. 26, the fog during actuation ends when a state in which the toner 44 carried on the developing roller 41 and supplied to the developing portion P4 is sufficiently charged. This is because when the charge amount of the toner 44 is large, the toner 44 is electrostatically retained on the developing roller 41 by the control of the back contrast Vbc described above. In this embodiment, the charge amount of the toner 44 is principally increased by friction with the regulating blade 43. For that reason, the fog end point Pb is the surface region of the photosensitive drum 1 contacting the toner 44, in the developing portion P4, positioned in a contact portion 43*a* between a free end of the regulating blade 43 and the developing roller 41 at the rotation start time (t2) of the photosensitive drum 1.

In other words, the fog during actuation is caused to occur by the deposition, on the photosensitive drum 1, of the toner 44 reaching the developing portion P4 without passing through the regulating blade 43 once after the start of the rotation of the developing roller 41.

FIG. 27 shows a state of the image forming apparatus 100 at the time t3 (FIG. 25) when the application of the charging voltage (−Ve') in the first stage to the charging roller 2 is started after the start of the rotation of the driving motor. At this time, the fog start point Pa on the photosensitive drum 1 is positioned upstream of the charging portion P2 with respect to the rotational direction of the photosensitive drum 1.

FIG. 28 shows a state of the image forming apparatus 100 at the time t3' when the leading end of the surface region of the photosensitive drum 1 charged to the surface potential of −Ve by the start of the application of the charging voltage to the charging roller 2 reaches the developing portion P4. At this time, the back contrast Vbc in the developing portion P4 becomes 500 V by the change in surface potential of the photosensitive drum 1 in the developing portion P4 to −Ve.

FIG. 29 shows a state of the image forming apparatus 100 at the time t10 when the fog start point Pa reaches the developing portion P4 again. The back contrast Vbc in the developing portion P4 at this time is kept at 500 V.

FIG. 30 shows a state of the image forming apparatus 100 at the time t11 when the fog end point Pb reaches the developing portion P4 again. The back contrast Vbc in the developing portion P4 at this time is kept at 500 V.

As shown in FIG. 29, in this embodiment, at the time when at least the leading end (fog start point Pa) of the fog during actuation reaches the developing portion P1 again, the value of the back contrast Vbc becomes a value (500 V) larger than the value during the image formation. That is, the charging voltage and the developing voltage are controlled so that the value of Vbc at the time when the surface region (fog start point Pa) of the image bearing member positioned in the developing portion P4 at the time of the start of the rotation of the image bearing member reaches the developing portion P4 again becomes larger than the value of Vbc in the image forming operation.

Here, as shown in FIG. 27, before the fog start point Pa reaches the charging portion P2, the application of the charging voltage to the charging roller 2 as the charge imparting means at the voltage value not less than the discharge start voltage is started. By this, the fog during actuation that has reached the developing portion P4 again at the time t10 is in a state in which the electric charge is imparted (injected) by the electric discharge in the charging portion P2. Then, by the back contrast Vbc which is formed in the developing portion P4 and which is larger than the back contrast Vbc during the image formation, the fog during actuation is efficiently collected by the developing roller 41.

Preferably, as shown in FIGS. 29 and 30, during passing of the fog during actuation through the developing portion P4 again from the leading end to the trailing end (from the fog start point Pa to the fog end point Pb), a state in which the back contrast Vbc is larger than the value during the image formation is maintained. That is, the charging voltage and the developing voltage are controlled so that a value of Vbc becomes larger than Vbc in the image forming operation over a period from the time when the surface region (P) of the image bearing member positioned in the developing portion P4 at the time of the start of the rotation of the image bearing member reaches the developing portion P4 again to a lapse of a time of d/Vd. Here, the peripheral speed of the image bearing member is Vd (mm/sec), and a distance of movement of the surface of the developing member from the contact portion (43*a*) between the developing member and the regulating member to the developing portion is d (mm).

In this embodiment, the photosensitive drum 1 is 24 mm in diameter and is rotationally driven at a speed of 139 mm/sec. From this, a circumference of the photosensitive drum 1 is 24×π=75.36 [mm], and a time (t10-*t*2) from the start (t2) of the rotation of the photosensitive drum 1 in the pre-rotation operation to the time (t10) when the fog start point Pa reaches the developing portion P4 again is as follows.

$$t10-t2=(75.36/139)\times 1000=542 \text{ [msec]}$$

Further, a movement distance (d) of the surface of the developing roller 41 from the contact portion 43*a* between the regulating blade 43 and the developing roller 41 to the developing portion P4 shown in part (a) of FIG. 26 is 12 mm. Further, the peripheral speed (Vd) of the developing roller 41 in this embodiment is 195 mm/sec which is 1.4 times the peripheral speed of the photosensitive drum 1. A time (t11-*t*10) required for passing of the fog during actuation through the developing portion P4 again from the leading end to the leading end (fog start point Pa to the fog end point Pb) is equal to the time in which the fog during actuation is formed, and therefore, can be represented as follows.

$$t11-t10=d/Vd=(12/195)\times 1000=62 \text{ [msec]}$$

Figure 25:
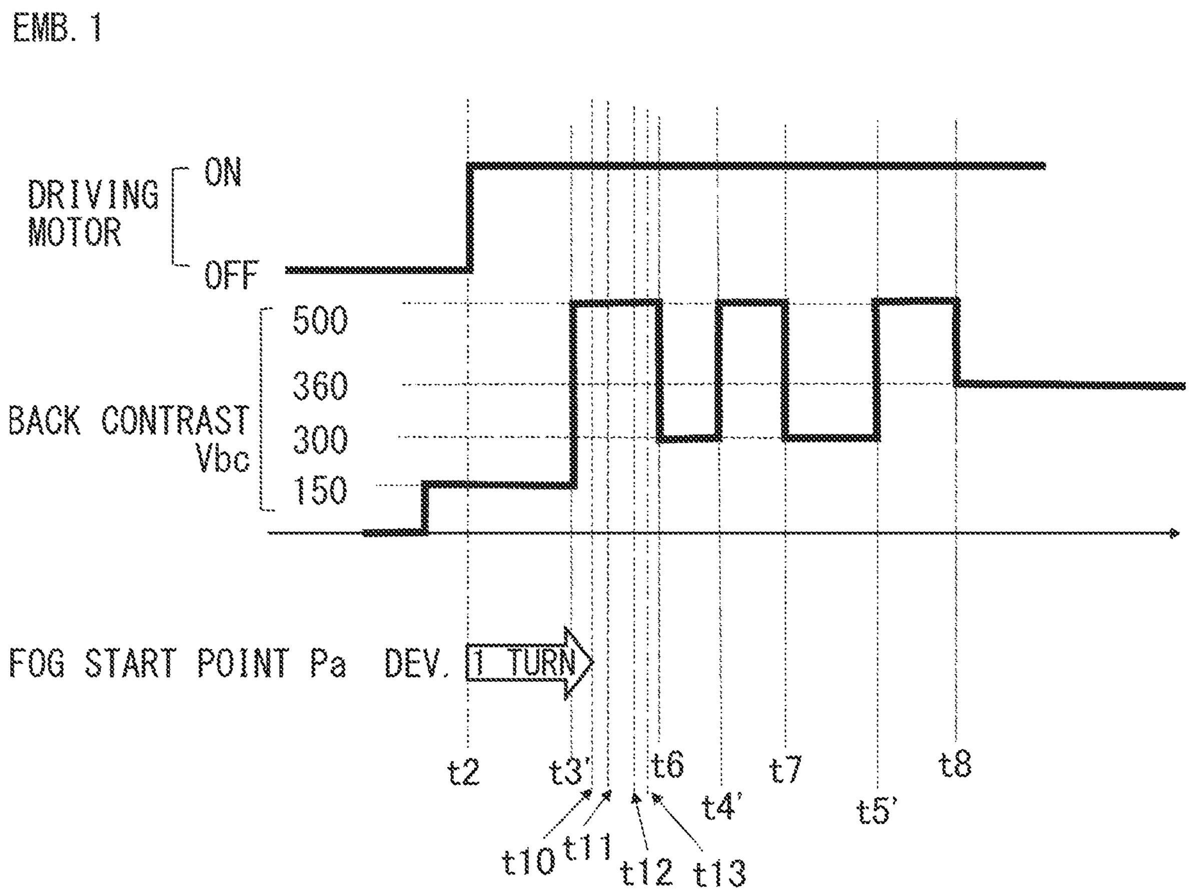
FIG. 25 is a timing chart of a driving motor and the back contrast in the pre-rotation operation of an image forming apparatus in the embodiment 4.

From the above, the period from t10 to t11 is a period from the time of a lapse of 542 msec from the actuation (t2) of the driving motor to the time after a lapse of 604 (=542+62) msec. As shown in FIG. 25, in this embodiment, during at least this period, a state in which the value of the back contrast Vbc in the developing portion P4 is larger than the value (360 V) during the image formation is maintained.

A comparison example 4 will be described using FIG. 31. FIG. 31 is a timing chart of the developing motor and the charging voltage in the pre-rotation operation in the comparison example 4, in which a period until the fog start point Pa on the photosensitive drum 1 reaches the developing portion P4 again is shown.

The comparison example 4 is different from the embodiment 4 in that the value of the back contrast Vbc in the developing portion P4 is maintained at 360 V which is the same as the value during the image formation over an entire period of the pre-rotation operation. That is, the charging voltage and the developing voltage in the pre-rotation operation are controlled so that a change in surface potential of the photosensitive drum 1 and a change in developing voltage are synchronized with each other. Other constitutions are common to the embodiment 4 and the comparison example 4.

Then, a comparison example 5 will be described using FIG. 32. FIG. 32 is a timing chart of the developing motor and the charging voltage in the pre-rotation operation in the comparison example 5, in which a period until the fog start point Pa on the photosensitive drum 1 reaches the developing portion P4 again is shown.

In the comparison example 5, similarly as in the embodiment 4, the charging voltage and the developing voltage in the pre-rotation operation are controlled so that a back contrast Vbc larger than the back contrast Vbc (360 V) during the image formation and a back contrast Vbc smaller than the back contrast Vbc (360 V) during the image formation appear alternately. However, different from the embodiment 4, in the period (t10 to t11) in which the fog during actuation passes through the developing portion P4 again, the value of the back contrast Vbc is a value (300 V) smaller than the value during the image formation. Other constitutions are common to the embodiment 4 and the comparison example 5.

Then, a comparison example 6 will be described using FIG. 33. FIG. 33 is a timing chart of the developing motor and the charging voltage in the pre-rotation operation in the comparison example 6, in which a period until the fog start point Pa on the photosensitive drum 1 reaches the developing portion P4 again is shown.

In the comparison example 6, the back contrast Vbc is 150 V until the time t3' when the surface region of the photosensitive drum 1 charged to the surface potential of −Ve by the start of the application of the charging voltage reaches the developing portion, and at the time t3' and later, the back contrast Vbc is kept constant at 500 V. Here, in the comparison example 6, including during execution of the image forming operation, at the time t3' and later, the back contrast Vbc is kept constant at 500 V. Other constitutions are common to the embodiment 4 and the comparison example 6.

Subsequently, an embodiment 5 will be described using FIG. 34. FIG. 34 is a timing chart of the driving motor and the charging voltage in the pre-rotation operation in the embodiment 5, in which a period until the fog start point Pa on the photosensitive drum 1 reaches the developing portion P4 again and a period required for one full turn of the developing roller 41 are shown.

In the embodiment 5, similarly as in the embodiment 4, the charging voltage and the developing voltage in the pre-rotation operation are controlled so that a back contrast Vbc larger than the back contrast Vbc (360 V) during the image formation and a back contrast Vbc smaller than the back contrast Vbc (360 V) during the image formation appear alternately. Further, in the period (t10 to t11) in which the fog during actuation passes through the developing portion P4 again, the value of the back contrast Vbc is a value (500 V) larger than the value during the image formation.

However, in the embodiment 5, in a period from the time t12 after the time t1, when the fog end point Pb of the fog during actuation passes through the developing portion P4, to the time t13, the back contrast Vbc has a value (300 V) smaller than the value during the image formation.

The times t12 and t13 will be described using FIGS. 29, 30, 35 and 36.

As shown in FIG. 29, the surface region of the developing roller 41 positioned in the developing portion P4 at the time (t10) when the fog start point Pa of the fog during actuation reaches the developing portion again is referred to as Pa'. Further, as shown in FIG. 30, the surface region of the developing roller 41 positioned in the developing portion P4 at the time (t11) when the fog end point Pb of the fog during actuation reaches the developing portion again is referred to as Pb'. That is, a range from the point Pa' to the point Pb' on the developing roller 41 is a range of deposition of the fog toner collected from the photosensitive drum 1 by the developing roller 41 in the period in which the fog during actuation passes through the developing portion P4 again.

The time t12 is, as shown in FIG. 35, a time when the point Pa' which is the leading end of the range of deposition of the fog toner on the developing roller 41 reaches the developing portion P4 again through one-full turn of the developing roller 41. Further, the time t13 is, as shown in FIG. 36, a time when the point Pb', which is the trailing end of the range of deposition of the fog toner on the developing roller 41, reaches the developing portion P4 again through one-full turn of the developing roller 41. That is, the period from the time t12 to the time t13 is a period in which there is a possibility that the fog toner of the fog during actuation collected by the developing roller 41 passes through the developing portion P4 again through one-full turn of the developing roller 41.

In the embodiment 5, a constitution in which in such a period (t12 to t13), the back contrast Vbc becomes the value (300 V) smaller than the value during the image formation is employed.

In other words, in the embodiment 5, the following constitution is employed. A value of Vbc at a first point of time (t10) when the surface region (Pa) of the image bearing member positioned in the developing portion P4 at the time of the start of the rotation of the image bearing member reaches the developing portion P4 again is referred to as Vk1. A value of Vbc at a second point of time (t12) when the surface region (Pa') of the developing member positioned at the first point of time (t10) in the developing portion P4 reaches the developing portion P4 again through one-full turn of the developing member is referred to as Vk2. Further, the control means controls the charging voltage and the developing voltage in the preparatory operation so that Vk2 is smaller than Vk1. In this embodiment, Vk1 is set at 500 V, and Vk2 is set at 300 V.

Further, preferably, the following constitution is employed. The peripheral speed of the developing member is Vd (mm/sec), and a movement distance when the surface of the developing member moves from the contact portion between the developing member and the regulating member to the developing portion is d (mm). Further, the control means controls the charging voltage and the developing voltage so that the value of Vbc becomes Vk1 in the period (t10 to t11) from the first point of time to a lapse of the time d/Vd and so that the value of Vbc becomes Vk2 in the period (t12 to t13) from the second point of time to a lapse of the time d/Vd. An advantage of such an embodiment will be described later.

The process cartridge 10 in this embodiment is not provided with the supplying roller 42 (FIG. 1).

The supplying roller 42 is not used, so that downsizing and cost reduction of the developing container 45 are capable of being realized. In this embodiment, the stirring member 45*a* is rotated at a predetermined speed in interrelation with rotation of the developing roller 41, so that the stirring member 45*a* not only stirs the toner 44 in the developing container 45 but also directly supplies the toner 44 to the developing roller 41.

The supplying roller 42 has action of refreshing the toner 44 on the developing roller 41 by scraping off the toner remaining on the developing roller 41 without being used for image formation by relative movement of the peripheral surface and a voltage difference. However, in this embodiment, there is no supplying roller 41, and therefore, in the case where the toner 44 on the developing roller 41 is large in amount and the case where a degree of deposition of the toner 44 on the developing roller 41 is strong, a regulating action of the toner amount by the regulating blade 43 lowers, with the result that there is a tendency that the charge amount of the toner 44 becomes low.

That is, this embodiment has a tendency that action of increasing again the charge amount of the fog toner during actuation collected by the developing roller 41 is relatively low and thus the collected toner causes the fog again when the collected toner subsequently reaches the developing portion P4, compared with the embodiment 4. That is, in this embodiment, compared with the embodiment 4, although the downsizing and the cost reduction can be realized, under a severe condition, it can be said that improper collection of the fog toner during actuation by the developing roller 41 is liable to occur.

As regards this embodiment, an embodiment in which the same control as the control in the embodiment 4 is applied for the control of the charging voltage and the developing voltage in the pre-rotation operation is an embodiment 4-2. An embodiment in which the same control as the control in the embodiment 5 is applied for the control of the charging voltage and the developing voltage in the pre-rotation operation is an embodiment 5-2. Similarly, comparison examples in which the same pieces of control as those in the comparison examples 4, 5 and 6 for the control of the charging voltage and the developing voltage in the pre-rotation operation are comparison examples 4-2, 5-2 and 6-2, respectively.

In the above-described embodiments, in order to satisfactorily collect the fog toner during actuation, the electric charge is imparted to the fog toner during actuation by applying the voltage not less than the discharge start voltage to the charging roller 2 of the contact charging type in the charging portion P2. That is, the charging roller 2 also functions as a charge imparting means for imparting the electric charge to the toner deposited on the photosensitive drum 1 during the pre-rotation operation.

However, a method of imparting the electric charge to the fog toner during actuation is not limited thereto, but for example, constitutions shown in parts (a) and (b) of FIG. 37 may be used.

In an example shown in part (a) of FIG. 37, a charging device 2A of a corona discharge type is used instead of the charging roller 2.

The charging device 2A is not only a charging member but also a charge imparting means. In this case, similarly as in the embodiment 4, the application of the charging voltage at the voltage value not less than the discharge start voltage may only be required to be started before the fog start point Pa reaches the charging portion P2 (discharge position of the charging device 2A).

In an example shown in part (b) of FIG. 37, in addition to the charging roller 2, an electroconductive brush 2B contacting the photosensitive drum 1 is provided. The electroconductive brush 2B is an example of the charge imparting means provided separately from the charging member. In this case, before the fog start point Pa reaches a contact portion of the electroconductive brush 2B, the voltage of the same polarity as the normal charge polarity of the toner is applied to the electroconductive brush 2B, so that it is possible to impart the electric charge to the fog toner during actuation.

As another example, in the embodiment 4 and the embodiment 5, in order to impart the electric charge to the fog toner during actuation, the voltage applied to the charging roller 2 of the contact charging type may be changed to a voltage value which is of the same polarity as the normal charge polarity as the toner and which is not less than the discharge start voltage. This is because even in a state in which the voltage lower than the discharge start voltage is applied, the electric charge is imparted from the charging roller 2 to the fog toner during actuation on the photosensitive drum 1.

Further, as another example, the transfer roller 5 may be used as the charge imparting means. In this case, before the fog start point Pa reaches the transfer portion P5 in the pre-rotation operation, the transfer voltage is applied to the transfer roller 5 at a voltage value not less than the discharge start voltage of the transfer roller 5. That is, before the surface region (fog start point Pa) of the image bearing member positioned in the developing portion P4 at the time of the start of the rotation of the image bearing member, the application of the transfer voltage is started at the voltage not less than the discharge start voltage of the transfer member.

Incidentally, the transfer voltage during the image formation has the opposite polarity to the normal charge polarity of the toner, but the transfer voltage applied to the transfer roller 5 as the charge imparting means in the pre-rotation operation has the same polarity as the normal charge polarity of the toner.

Other than this, a constitution in which irrespective of the voltage application, the electric charge of the same polarity as the normal charge polarity is imparted to the toner on the photosensitive drum 1 may also be employed. For example, as the charge imparting means, a sheet-like member contacting the surface of the photosensitive drum 1 may be provided downstream of the transfer portion P5 and upstream of the charging portion P2 with respect to the rotational direction of the photosensitive drum 1. In this case, the fog toner on the photosensitive drum 1 is rubbed with the sheet-like member, so that the electric charge can be imparted to the fog toner in a larger amount by triboelectric charging.

Evaluation Method of Embodiments and Comparison Examples

An image evaluation was performed for the embodiments 4 and 5 and the comparison examples 4, 5 and 6. Details of the image evaluation will be described in the following.

(1) Evaluation of Fog after Standing

The fog in this evaluation refers to an image defect (white background contaminant) which generates by the fog on the photosensitive drum 1 and which appears like a background contamination by deposition of the toner in a small amount on a white background portion where the image is not originally formed on the recording material. An evaluation method of a fog amount is as follows.

During formation of a whole white image (image based on image information such that an entire surface of the recording material), drive of the image forming apparatus 100 is stopped. A door of the image forming apparatus 100 is opened, and the toner deposited on the surface region of the photosensitive drum 1 positioned between the developing portion P4 and the transfer portion P5 is collected by a transparent adhesive tape. The adhesive tape is applied onto recording paper. Onto this recording paper, a transparent adhesive tape on which the toner is not deposited is also applied. From above the tape applied on the recording paper, an optical reflectance through a green filter was measured by an optical reflectance measuring machine ("TC-6DS", manufactured by Tokyo Denshoku Co., Ltd.). The resultant optical reflectance is subtracted from an optical reflectance of the tape on which the toner is not deposited, and an optical reflectance of a sample corresponding to the fog toner is acquired and is determined as a fog amount. This fog amount was determined by measuring the reflectance at three or more points on the tape and then by acquiring an average of the resultant reflectances. The thus acquired fog amount and a check result of the image defect through eye observation were evaluated in the following standards.

A: The fog amount is less than 1.0%, and the image defect cannot be visually recognized.

B: The fog amount is 1.0% or more and less than 3.0%, and the image defect cannot be visually recognized.

C: The fog amount is 3.0% or more and less than 5.0%, and the white background contamination can be visually observed at a part of the image.

D: The fog amount is 5.0% or more, and the white background contamination can be visually observed at the entirety of the image.

This evaluation was performed after durability sheet passing for outputting images on 20000 sheets, performed after the image forming apparatus 100 was left standing for 24 hours in an evaluation environment of 32.5° C., and 80% RH and was adapted to the environment. In the durability sheet passing, a test image of a lateral pattern with an image ratio 5% was repetitively outputted. After the durability sheet passing, a whole white image was outputted (formed) on a single sheet, and then image evaluation was performed. Here, the lateral pattern with the image ratio of 5% is specifically a pattern such that a line image corresponding to one dot and a blank region corresponding to 19 dots are repetitively formed. After an end of the durability sheet passing, the image forming apparatus was left standing for 48 hours without executing the image forming operation, and then the image evaluation was performed.

(2) E-Character Evaluation

In an E-character evaluation, the image forming apparatus 100 was left standing for 24 hours in the test environment of 32.5° C., and 80% RH and was adapted to this test environment, and therefore, lateral images are outputted on 100 sheets. The lateral image is an image consisting of a lateral line pattern with the image ratio of 5%. Thereafter, an evaluation image was outputted and was evaluated.

The evaluation image was such that "E" characters (letters) were formed on an entire image surface. Specifically, an image such that a character "E" which is an alphabet letter with a point size of 4 was repetitively arranged so that a coverage thereof to an area of A4-size paper was 4%. FIG. 38 is a schematic view showing the evaluation image. This evaluation image was observed and was evaluated with the following standard. The lateral image and the evaluation image were a single color, and were outputted in an operation in a normal paper mode (139 mm/sec) with 400 dpi×400 dpi.

A: The "E" character is clear and no lack is observed at all even when observed through a microscope.

B: The "E" character is clear and no lack is observed through eye observation, but lack of a part of the "E" character was observed through eye observation.

C: The "E" character is not clear through eye observation, and lack is observed in the "E" character through the microscope.

D: The "E" character is not clear and lack is observed in the "E" character through eye observation.

In a table 2 below, results of the "(1) Fog evaluation after standing", and the "(2) E-character evaluation" in the embodiments 4, 4-2, 5 and 5-2 and the comparison examples 4,4-2, 5, 5-2, 6 and 6-2 are shown.

TABLE 2

| | Vk1*1 | Vk2*2 | Vbc*3 | FEAS*4 | ECE*5 |
|---|---|---|---|---|---|
| EMB. 4 | 500 | 500 | 360 | A | A |
| EMB. 4-2 | 500 | 500 | 360 | B | A |
| COMP. EX. 4 | 360 | 360 | 360 | C | A |
| COMP. EX. 4-2 | 360 | 360 | 360 | D | A |
| COMP. EX. 5 | 300 | 500 | 360 | C | A |
| COMP. EX. 5-2 | 300 | 500 | 360 | D | A |
| COMP. EX. 6 | 500 | 500 | 500 | A | D |
| COMP. EX. 6-2 | 500 | 500 | 500 | B | D |
| EMB. 5 | 500 | 300 | 360 | A | A |
| EMB. 5-2 | 500 | 300 | 360 | A | A |

*1"Vk1" is the back contrast Vk1 in the period (t10 to t11).
*2"Vk2" is the back contrast Vk2 in the period (t12 to t13).
*3"Vbc" is the back contrast during the image formation,
*4"FEAS" is the fog evaluation after standing.
*5"ECE" is the "E" character evaluation.

Superiority to Comparison Example 4

First, superiority of each of the embodiments to the comparison example 4 will be described. The charging voltage and the developing voltage are stepwise increased while controlling the back contrast Vbc, in a certain range, which is the potential difference between the surface potential of the photosensitive drum 1 and the developing voltage in the developing portion P4. Thus, although the back contrast Vbc is controlled to a proper range (FIG. 21) for fog suppression on the photosensitive drum 1 through the pre-rotation operation, in the comparison example 4, the fog evaluation after standing was low (C).

The reason why the fog evaluation after standing was low will be described using FIG. 26 and FIG. 30.

In the case where the image forming apparatus is left standing for the long term in the stand-by state, the charge amount of the toner 44 carried on the developing roller 41 attenuates with time. In the case where the pre-rotation operation is started in a state in which the charge amount of the toner 44 on the developing roller 41 is very small, as shown in FIG. 26, a part of the toner 44 is non-electrostatically deposited on the photosensitive drum 1, so that the fog during actuation occurs. As described above, even when the back contrast Vbc is formed by applying the voltage Va of the positive polarity to the developing roller 41 before the start of the rotation, if the charge amount of the toner 44 is very small, it is difficult to prevent the fog during actuation.

The fog during actuation occurs in a period from the time (t2) of the start of the rotation of the photosensitive drum 1 to the time when the toner 44 positioned in a position immediately after the photosensitive drum surface passed through the regulating blade 43 at the time (t2) of the start of the rotation of the photosensitive drum 1 reaches the developing portion P4. In subsequent periods, the toner 44 to which the electric field is sufficiently imparted by friction with the regulating blade 43 reaches the developing portion P4, and therefore, the fog can be suppressed by a proper back contrast Vbc.

FIG. 39 shows a relationship between a standing time of the image forming apparatus in the stand-by state and the toner concentration of the fog during actuation. This evaluation was performed in the environment of 32.5° C. and 80% RH, and the fog toner concentration (density) on the photosensitive drum 1 immediately after the start of the rotation was measured by the above-described method of transferring the fog toner onto the Mylar tape. From the result of FIG. 39, it is understood that the fog during actuation is liable to occur abruptly when the standing time becomes longer than 10 minutes and that a degree of the fog during actuation becomes larger with a lapse of the time. On the other hand, in the case where the standing time is very short, attenuation of the toner charge amount does not occur and therefore the influence of the fog during actuation is small.

From this, in the pre-rotation operation after long-term standing, it would be considered that the fog during actuation occurred in the developing portion P4 and the fog toner in a large amount is deposited on the photosensitive drum 1. Further, as shown in FIG. 29, when the fog toner during actuation reaches the developing portion P4 by the rotation of the photosensitive drum 1 and passes through the developing portion 4, in the comparison example 4, a sufficient back contrast Vbc is not formed (t10 to t11 in FIG. 31). Here, the back contrast Vbc in the comparison example 4 is constant at 360 V, which is the same as the back contrast Vbc during the image formation. For this reason, it would be considered that in the comparison example 4, due to the fog during actuation after long-term standing, the toner deposited on the photosensitive drum 1 cannot be sufficiently collected and thus white background contamination was caused during subsequent image formation by the fog toner remaining on the photosensitive drum 1.

In the case of the comparison example 4 in which the supplying roller 42 is provided, the fog evaluation after standing was C. On the other hand, in the case of the comparison example 4-2 in which the supplying roller 42 is not provided, the fog evaluation after standing was D. This would be considered because in the comparison example 4-2 in which the reset action by the supplying roller 42 cannot be obtained, improper collection of the fog toner during actuation is more liable to occur.

Next, the reason why the fog evaluation after standing of the embodiment 4 is good will be described in comparison with the comparison example 4. As shown in FIG. 31, in the comparison example 4, the back contrast Vbc in the period (t10 to t11) in which the fog during actuation passes through the developing portion P4 was 36) V which is the same as the back contrast Vbc during the image formation. On the other hand, as shown in FIG. 25, in the embodiment 4, the back contrast Vbc in the period (t10 to t11) was 500 V larger than the back contrast Vbc during the image formation.

As described above, in the pre-rotation operation after long-term standing, the toner charge amount of the toner on the developing roller 41 is attenuated, so that the fog during actuation occurs in both of the comparison example 4 and the embodiment 4. Here, in FIG. 40, the toner charge amount of the toner on the photosensitive drum 1 before and after passing through the charging portion P2 (charging roller) is shown. The charge amount "BEFORE PASSING OF CHARGING ROLLER" in FIG. 40 shows the charge amount of the fog during actuation at the timing (t3) shown in FIG. 27. On the other hand, the charge amount "AFTER PASSING OF CHARGING ROLLER" in FIG. 40 shows the charge amount of the fog during actuation at the timing (3') shown in FIG. 28. As shown in a result of FIG. 40, it is understood that the electric charge is imparted to the fog toner during actuation when the fog toner passes through the charging portion P2.

Next, when the toner amount (fog amount) of the toner deposited on the surface region on the photosensitive drum 1 where the fog during actuation occurs was checked in a state after the surface region passes through the developing portion P4, the fog amount in the embodiment 4 was smaller than the fog amount in the comparison example 4. From this, it is understood that in the embodiment 4, the back contrast Vbc when the fog during actuation reaches the developing portion P4 again (t10) has the value (500 V) larger than the back contrast Vbc during the image formation and therefore the fog toner can be efficiently collected by the developing roller 41. In addition, it would be considered that the amount of the fog toner remaining on the photosensitive drum 1 is reduced and thus the white background contamination is suppressed.

On the other hand, it would be considered that in the comparison example 4, the back contrast Vbc when the fog toner during actuation reaches the developing portion P4 again (t10) has the value (360 V) which is the same as the back contrast Vbc during the image formation and therefore is insufficient to efficiently collect the fog toner during actuation. Particularly, it would be considered that compared with the fog occurring during the image formation, the toner amount of the toner deposited on the photosensitive drum 1 due to the fog during actuation becomes very large in some cases and therefore the collection of the fog toner becomes insufficient at the back contrast Vbc which is the same as the back contrast Vbc during the image formation. In addition, it would be considered that the fog during actuation remains on the photosensitive drum 1 without being collected by the developing roller 41, with the result that the white background contamination occurred. Similar descriptions are also applied to the embodiment 4-2 and the comparison example 4-2.

Superiority to Comparison Examples 5 and 6

Next, each of the comparison examples 5 and 6, and the embodiment 4 are compared with each other.

In the fog evaluation after standing, the white background contamination in the comparison example 5 was more conspicuous than that in the embodiment 4. The reason therefor will be described.

In the comparison example 5, as shown in FIG. 32, in the period (t10 to t11) in which the leading end (Pa) to the trailing end (Pb) of the fog during actuation pass through the developing portion P4 again, the back contrast Vbc was set at the value (300 V) lower than the back contrast Vbc during the image formation. That is, in the comparison example 5, the back contrast Vbc in the period (t10 to t11) is further lower than the back contrast Vbc in the comparison example 4 in which the collection of the fog during actuation becomes insufficient. For this reason, it would be considered that a collection ratio of the fog toner during actuation becomes lower, and thus the white background contamination was caused by the fog toner remaining on the photosensitive drum 1 without being collected by the developing roller 41.

On the other hand, in the embodiment 4, the fact that the occurrence of the white background contamination can be suppressed through suppression of the improper collection of the fog toner by making the back contrast Vbc in the above-described period (t10 to t11) larger than the back contrast Vbc during the image formation is as described above. This is also true for the embodiment 4-2 and the comparison example 5-2.

Next, the comparison example 6 will be described. Between the embodiment 4 and each of the comparison examples 4 and 5, a conspicuous difference in E-character evaluation was not observed, whereas in the comparison example 6, the E-character evaluation was lowered. The reason therefor will be described.

In the comparison example 6, as shown in FIG. 33, the back contrast Vbc was set at 500 V in the period (t10 to t11) in which the leading end (Pa) and the trailing end (Pb) of the fog during actuation pass through the developing portion P4 again. Further, the back contrast Vbc was controlled at a certain value (500 V) in a period, including during the execution of the image forming operation, on or after the timing (t3') when the surface region on the photosensitive drum 1 was charged by the start of the application of the charging voltage.

As described above, the back contrast Vbc in the period (t10 to t11) in which the fog toner during actuation passes through the developing portion P4 again is sufficiently large, and therefore, it would be considered that in the comparison example 6, the improper collection of the fog toner did not occur and thus the white background contamination was capable of being suppressed to the same degree as in the embodiment 4.

On the other hand, in the E-character evaluation, in the comparison example 6, the character was not clear and the lack of the character was observed. This would be considered because the developing property was lowered by setting the high back contrast Vbc also during the image formation similarly as in the pre-rotation operation and therefore the electrostatic latent image formed in a thin line was not sufficiently developed.

On the other hand, in the embodiment 4, the back contrast Vbc in the period (t10 to t11) in which the fog toner during actuation passes through the developing portion P4 again is set high, and the back contrast Vbc is set low. By this, it would be considered that the thin-line image can be clearly developed while suppressing the white background contamination due to the improper collection of the fog toner after standing and thus good results were able to be obtained in both the fog evaluation after standing and the E-character evaluation. The above description is also true for the comparison example 6-2 and the embodiment 4-2.

Next, the embodiment 5 will be described. The fog evaluation after standing is at a level such that the white background contamination cannot be visually recognized and was good. The same is also applied to the embodiment 5-2 in which the reset action by the supplying roller 42 cannot be obtained and thus an effect better than the embodiment 4-2 can be obtained. This reason will be described in the following.

As described above, a range from a point Pa' to a point Pb' on the developing roller 41 shown in FIGS. 29 and 30 is a range in which the fog toner collected from the photosensitive drum 1 onto the developing roller 41 is deposited on the developing roller 41 in the period in which the fog during actuation passes through the developing portion P4 again. The time t12 is a time when, as shown in FIG. 35, the point Pa', which is the leading end of the range in which the fog toner is deposited on the developing roller 41, reaches the developing portion P4 again by one-full turn of the developing roller 41. Further, the time t13 is a time when, as shown in FIG. 36, the point Pb', which is the trailing end of the range in which the fog toner is deposited on the developing roller 41, reaches the developing portion P4 again by one-full turn of the developing roller 41. That is, the period from the time 112 to the time t13 is a period in which there is a possibility that the fog toner of the fog during actuation collected by the developing roller 41 passes through the developing portion P4 again by one-full turn of the developing roller 41.

In the constitution (constitution with no supplying roller) relating to the embodiments 4-2 and 5-2, compared with the constitution including the supplying roller, a part of the fog toner collected by the developing roller 41 is continuously held and thus is liable to reach the developing portion P4 again. For that reason, the toner amount (coating amount) of the toner deposited on the region from the point Pa' to the point Pb' on the developing roller 41 on which the collected fog toner is deposited becomes larger than the toner amount in another region. When the coating amount of the toner deposited on the developing roller 41 is large, it becomes difficult to impart a sufficient electric charge to the toner only by passing through the regulating blade 43 once, so that a proportion of the toner small in sheet amount and the toner having the electric charge of the opposite polarity to the normal charge polarity becomes large.

As a result, in the period (t12 to t13) in which the fog toner collected by the developing roller 41 passes through the developing portion P4 again, a state in which reverse fog is liable to occur is formed. That is, as shown in FIG. 41, a fog characteristic of the toner deposited on the surface region (collecting region) in which collection of the fog toner is performed on the developing roller 41 is different from a fog characteristic (same as FIG. 21) of the toner deposited on the surface region (non-collecting region) in which the collection of the fog toner is not performed on the developing roller 41.

A threshold of the back contrast Vbc at which the image defect (white background contamination) capable of being visually recognized by the reverse fog occurs is lower in the case of the toner deposited on the collecting region than in the case of the toner deposited on the non-collecting region.

In other words, in the period (t12 to t13) in which the collecting region on the developing roller 41 in which the fog toner is collected passes through the developing portion P4 again, compared with other periods, even at a lower back contrast Vbc, the image defect due to the reverse fog is liable to occur. As a result, it would be considered that the fog evaluation after standing became lower than the fog evaluation after standing in the embodiment 4.

Here, in the embodiment 4-2, the fog evaluation after standing is improved more than the embodiment 5-2, so that the evaluation similar to those in the embodiments 4 and 5 was obtained.

In the embodiment 5-2, in the period (t10 to t11) in which the fog during actuation passes through the developing portion P4, the back contrast Vbc has the value (500 V) higher than the back contrast Vbc during the image formation. Thereafter, in the period (t12 to t13) in which the collecting region on the developing roller 41*n* which the fog toner is collected passes through the developing portion P4, the back contrast Vbc is made the value (300 V) lower than the back contrast Vbc in the above-described period (t10 to t11) (see, FIG. 2).

Thus, in the period (t10 to t11) in which the fog during actuation passes through the developing portion P4, by making the back contrast Vbc the value (500 V) higher than the back contrast Vbc during the image formation, similarly as in the embodiment 4-2, it is possible to suppress the occurrence of the image defect due to the improper collection in the developing portion P4.

In addition, in the embodiment 5-2, by lowering the back contrast Vbc 1*o* in the period (t12 to t13) in which the collecting region on the developing roller 41 in which the fog toner is collected passes through the developing portion P4, the occurrence of the reverse fog can be suppressed. That is, according to this embodiment, the occurrence of the image defect can be further effectively suppressed.

In the above-described embodiments, the control in the pre-rotation operation or the jam restoration rotation operation before the start of the image forming operation was described. The present invention is not limited to this, and in the case where in the image forming apparatus, rotation of the image bearing member in the rest state is started and the charging voltage and the developing voltage are increased, similar control can be applied.

Further, in the above-described embodiments, a so-called monochromatic image forming apparatus such that the image forming apparatus is provided with only one image bearing member was described. The present invention is not limited thereto, and similar control can be applied to a full-color image forming apparatus in which a plurality of image bearing members are provided and images are formed with a plurality of developers different in toner color. The full-color image forming apparatus may be of an intermediary transfer type in which a single-color toner image formed on each of the plurality of image bearing members is primary-transferred onto an intermediary transfer member and then the resultant color toner images are collectively transferred onto the recording material or a sequential transfer type in which the single-color toner images are sequentially transferred onto the recording material.

In the case of the intermediary transfer type, the "transfer means" refers to, for example, a transfer roller (primary transfer roller) for primary transferring the toner image from the photosensitive drum 1 as the image bearing member onto the intermediary transfer member as a transfer-receiving material. Further, the "transfer portion" refers to a portion where the image bearing member and the intermediary transfer member oppose each other. As the intermediary transfer member, for example, an endless belt member stretched by a plurality of rollers is used. The toner images primary-transferred on the intermediary transfer member are secondary-transferred from the intermediary transfer member onto the recording material by a secondary transfer means such as a secondary transfer roller for forming a secondary transfer nip between itself and the intermediary transfer member. In such a constitution of the intermediary transfer type, an effect similar to those of the above-described embodiments can be obtained by replacing the transfer roller in the above-described embodiments with the primary transfer roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-172210 filed on Oct. 21, 2021, and No. 2021-172211 filed on Oct. 21, 2021, which are hereby incorporated by reference herein in their entirety.

What is claimed is:

1. An image forming apparatus for executing an image forming operation for forming an image on a recording material, the image forming apparatus comprising:

a rotatable image bearing member;

a charging member configured to electrically charge a surface of the image bearing member at a charging portion where the charging member is provided in contact with the image bearing member;

a developing member configured to form a toner image on the image bearing member by supplying a developer to a developing portion where the developing member is provided in contact with the image bearing member;

a transfer member configured to transfer the toner image from the image bearing member onto a transfer-receiving material in a transfer portion;

an exposure unit configured to expose, to light, the surface of the image bearing member at a position downstream of the transfer portion and upstream of the charging portion with respect to a rotational direction of the image bearing member; and a controller configured to control a charging voltage applied to the charging member and a developing voltage applied to the developing member, wherein during execution of the image forming operation, toner remaining on the surface of the image bearing member without being transferred in the transfer portion is collected by the developing member, wherein the controller executes a preparatory operation in which, before the image forming operation, rotation of the image bearing member is started and the charging voltage and the developing voltage are increased stepwisely, and wherein in the preparatory operation, the controller carries out control so as to start application of the charging voltage at a voltage value not less than a discharge start voltage of the charging member before a surface region of the image bearing member positioned in the developing portion at a time of a start of the rotation of the image bearing member reaches the charging portion in a state in which the surface of the image bearing member is exposed to the light by the exposure unit.

2. The image forming apparatus according to claim 1, wherein the controller controls the charging voltage and the developing voltage so that during a period of the preparatory operation, a surface potential of the image bearing member in the developing portion has the same polarity as a normal charge polarity of the toner relative to the developing voltage and a potential difference between the developing voltage and the surface potential of the image bearing member is maintained within a predetermined range.

3. The image forming apparatus according to claim 2, wherein the predetermined range is a range of 130 V or more and 550 V or less.

4. The image forming apparatus according to claim 1, wherein a rotational speed of the image bearing member in the preparatory operation is slower than a rotational speed of the image bearing member in the image forming operation.

5. The image forming apparatus according to claim 1, wherein in the preparatory operation, the controller carries out control so as to start the application of the charging voltage at the voltage value not less than the discharge start voltage of the charging member positioned in the transfer portion where transfer of the toner image in the transfer portion is made at the time of the start of the rotation of the image bearing member reaches the charging portion.

6. The image forming apparatus according to claim 1, wherein in the preparatory operation, the controller carries out control so as to start the application of the charging voltage at a first voltage value not less than the discharge start voltage of the charging member and then to increase the charging voltage to a second voltage value higher than the first voltage value before the surface region of the image bearing member positioned in the developing portion at the time of the start of the rotation of the image bearing member reaches the charging portion.

7. The image forming apparatus according to claim 1, wherein the controller carries out control so as to start the application of the charging voltage at the voltage value not less than the discharge start voltage of the charging member and then to increase the charging voltage to a voltage value in the image forming operation before the surface region of the image bearing member positioned in the developing portion at the time of the start of the rotation of the image bearing member reaches the charging portion.

8. The image forming apparatus according to claim 1, wherein in the preparatory operation, the controller carries out control so as to increase the developing voltage stepwisely to a voltage value, in the image forming operation, having the same polarity as a normal charge polarity of the toner, and application of the developing voltage is started at a voltage value having an opposite polarity to the normal charge polarity of the toner before the start of the rotation of the image bearing member.

9. The image forming apparatus according to claim 1, wherein the developing member is always in contact with the image bearing member.

10. The image forming apparatus according to claim 1, wherein the developer is a one-component developer consisting of the toner, and wherein the image forming apparatus further comprises a regulating member provided in contact with the developing member and configured to triboelectrically charge the toner while regulating an amount of the toner conveyed to the developing portion while being carried on the developing member.

11. The image forming apparatus according to claim 1, wherein the transfer-receiving material is the recording material.

12. The image forming apparatus according to claim 1, further comprising:

an intermediary transfer member; and a secondary transfer portion configured to transfer the toner image from the intermediary transfer member onto the recording material, wherein the transfer-receiving material is the intermediary transfer member.

* * * * *